(12) United States Patent  
Obrecht et al.

(10) Patent No.: US 9,098,333 B1  
(45) Date of Patent: Aug. 4, 2015

(54) MONITORING COMPUTER PROCESS RESOURCE USAGE

(75) Inventors: Mark E. Obrecht, Austin, TX (US); Robert P. Myers, Austin, TX (US); Alfred C. Hartmann, Round Rock, TX (US); Nick F. Alagna, Austin, TX (US); Kevin N. Pyle, Austin, TX (US); Scott D. Sullivan, Austin, TX (US); Michael W. Little, Austin, TX (US)

(73) Assignee: Ziften Technologies, Inc., Austin, TX (US)

( * ) Notice: Subject to any disclaimer, the term of this patent is extended or adjusted under 35 U.S.C. 154(b) by 1042 days.

(21) Appl. No.: 13/102,924

(22) Filed: May 6, 2011

Related U.S. Application Data

(60) Provisional application No. 61/332,629, filed on May 7, 2010.

(51) Int. Cl.  
    *G06F 9/46*     (2006.01)  
    *G06F 9/50*     (2006.01)

(52) U.S. Cl.  
    CPC ........................................ *G06F 9/50* (2013.01)

(58) Field of Classification Search  
    None  
    See application file for complete search history.

(56) References Cited

U.S. PATENT DOCUMENTS

| | | | |
|---|---|---|---|
| 4,727,487 A | 2/1988 | Masui et al. | |
| 4,890,227 A | 12/1989 | Watanabe et al. | |
| 5,084,816 A | 1/1992 | Boese et al. | |
| 5,121,345 A | 6/1992 | Lentz | |
| 5,333,319 A | 7/1994 | Silen | |
| 5,398,196 A | 3/1995 | Chambers | |
| 5,440,723 A | 8/1995 | Arnold et al. | |
| 5,452,442 A | 9/1995 | Kephart | |
| 5,537,540 A | 7/1996 | Miller et al. | |
| 5,802,277 A | 9/1998 | Cowlard | |
| 5,838,968 A * | 11/1998 | Culbert ........................ | 718/104 |
| 5,919,257 A | 7/1999 | Trostle | |

(Continued)

FOREIGN PATENT DOCUMENTS

| | | |
|---|---|---|
| WO | 99/00720 | 1/1999 |
| WO | 99/50734 | 10/1999 |

(Continued)

OTHER PUBLICATIONS

Triumfant Resolution Manager, A Close Look at Triumfant's Patented, Innovative Technology, http://www.triumfant.com/Triumfant_Resolution_Manager.asp, © 2012, 2 pages. [Retrieved May 30, 2013].

(Continued)

*Primary Examiner* — Kenneth Tang  
(74) *Attorney, Agent, or Firm* — Meyertons, Hood, Kivlin, Kowert & Goetzel, P.C.

(57) ABSTRACT

Techniques are disclosed relating to improving resource usage on a computer system. In one embodiment, a computer system identifies a plurality of processes running on the computer system and determines an importance value and a resource consumption value. In such an embodiment, the importance value is indicative of an importance of an identified process, and the resource consumption value is indicative of a resource consumption of the identified process. The computer system evaluates the importance value and the resource consumption value relative to a usage policy, and takes a corrective action with respect to the identified process based on the evaluating to reconcile resource consumption with process importance value.

20 Claims, 26 Drawing Sheets

(56) References Cited

U.S. PATENT DOCUMENTS

| | | |
|---|---|---|
| 5,956,481 A | 9/1999 | Walsh et al. |
| 5,960,170 A | 9/1999 | Chen et al. |
| 5,970,405 A | 10/1999 | Kaplan et al. |
| 5,974,549 A | 10/1999 | Golan |
| 6,003,061 A | 12/1999 | Jones et al. |
| 6,006,328 A | 12/1999 | Drake |
| 6,059,842 A | 5/2000 | Dumarot et al. |
| 6,088,804 A | 7/2000 | Hill et al. |
| 6,161,130 A | 12/2000 | Horvitz et al. |
| 6,182,227 B1 | 1/2001 | Blair et al. |
| 6,266,774 B1 | 7/2001 | Sampath et al. |
| 6,269,456 B1 | 7/2001 | Hodges et al. |
| 6,272,641 B1 | 8/2001 | Ji |
| 6,298,445 B1 | 10/2001 | Shostack et al. |
| 6,324,538 B1 | 11/2001 | Wesinger, Jr. et al. |
| 6,330,588 B1 | 12/2001 | Freeman |
| 6,347,375 B1 | 2/2002 | Reinert et al. |
| 6,357,008 B1 | 3/2002 | Nachenberg |
| 6,360,263 B1 | 3/2002 | Kurtzberg et al. |
| 6,393,568 B1 | 5/2002 | Ranger et al. |
| 6,442,631 B1 | 8/2002 | Neufeld et al. |
| 6,477,651 B1 | 11/2002 | Teal |
| 6,523,120 B1 | 2/2003 | Strasnick |
| 6,560,632 B1 | 5/2003 | Chess et al. |
| 6,584,488 B1 | 6/2003 | Brenner et al. |
| 6,584,489 B1 | 6/2003 | Jones et al. |
| 6,671,812 B1 | 12/2003 | Balasubramaniam et al. |
| 6,725,377 B1 | 4/2004 | Kouznetsov |
| 6,725,454 B1 | 4/2004 | Nagel et al. |
| 6,772,346 B1 | 8/2004 | Chess et al. |
| 6,775,780 B1 | 8/2004 | Muttik |
| 6,775,825 B1 | 8/2004 | Grumann et al. |
| 6,792,543 B2 | 9/2004 | Pak et al. |
| 6,799,208 B1 | 9/2004 | Sankaranarayan et al. |
| 6,802,028 B1 | 10/2004 | Ruff et al. |
| 6,836,272 B2 | 12/2004 | Leung et al. |
| 6,842,861 B1 | 1/2005 | Cox et al. |
| 6,873,966 B2 | 3/2005 | Babbitt et al. |
| 6,901,446 B2 | 5/2005 | Chellis et al. |
| 6,944,772 B2 | 9/2005 | Dozortsev |
| 6,947,987 B2 | 9/2005 | Boland |
| 6,963,978 B1 | 11/2005 | Muttik et al. |
| 6,968,461 B1 | 11/2005 | Lucas et al. |
| 6,973,577 B1 | 12/2005 | Kouznetsov |
| 7,010,698 B2 | 3/2006 | Sheymov |
| 7,043,641 B1 | 5/2006 | Martinek et al. |
| 7,058,704 B1 | 6/2006 | Mangipudi et al. |
| 7,058,947 B1 | 6/2006 | Raja et al. |
| 7,089,591 B1 | 8/2006 | Chi |
| 7,116,782 B2 | 10/2006 | Jackson et al. |
| 7,137,118 B2 | 11/2006 | Jahnke |
| 7,137,119 B1 | 11/2006 | Sankaranarayan et al. |
| 7,162,649 B1 | 1/2007 | Ide et al. |
| 7,165,174 B1 | 1/2007 | Ginter et al. |
| 7,174,566 B2 | 2/2007 | Yadav |
| 7,203,841 B2 | 4/2007 | Jackson et al. |
| 7,210,168 B2 | 4/2007 | Hursey et al. |
| 7,228,434 B2 | 6/2007 | Zisowski |
| 7,237,265 B2 | 6/2007 | Reshef et al. |
| 7,287,279 B2 | 10/2007 | Bertman et al. |
| 7,290,266 B2 | 10/2007 | Gladstone et al. |
| 7,328,453 B2 | 2/2008 | Merkle, Jr. et al. |
| 7,331,062 B2 | 2/2008 | Alagna et al. |
| 7,437,728 B2 | 10/2008 | Stackhouse et al. |
| 7,441,273 B2 | 10/2008 | Edwards et al. |
| 7,457,823 B2 | 11/2008 | Shraim et al. |
| 7,480,683 B2 | 1/2009 | Thomas et al. |
| 7,493,403 B2 | 2/2009 | Shull et al. |
| 7,509,679 B2 | 3/2009 | Alagna et al. |
| 7,533,131 B2 | 5/2009 | Thomas et al. |
| 7,624,110 B2 | 11/2009 | Alagna et al. |
| 7,739,337 B1 | 6/2010 | Jensen |
| 7,739,687 B2 * | 6/2010 | Newport .......... 718/104 |
| 7,748,039 B2 | 6/2010 | Obrecht et al. |
| 7,765,553 B2 | 7/2010 | Douceur et al. |
| 7,832,011 B2 | 11/2010 | Obrecht et al. |
| 7,930,751 B2 | 4/2011 | Obrecht et al. |
| 7,934,216 B2 * | 4/2011 | Taylor et al. .......... 718/105 |
| 8,103,664 B2 | 1/2012 | Hooks |
| 8,104,087 B2 | 1/2012 | Quinn et al. |
| 8,141,087 B2 * | 3/2012 | Chauvet et al. .......... 718/103 |
| 8,156,552 B2 | 4/2012 | Alagna et al. |
| 8,185,903 B2 * | 5/2012 | Fulton et al. .......... 718/103 |
| 8,205,217 B2 | 6/2012 | Kennedy et al. |
| 8,296,770 B2 | 10/2012 | Ohno |
| 8,341,744 B1 | 12/2012 | Obrecht et al. |
| 8,365,178 B2 | 1/2013 | Laor et al. |
| 8,387,058 B2 | 2/2013 | Fellenstein et al. |
| 2002/0010640 A1 | 1/2002 | Dutta et al. |
| 2002/0019767 A1 | 2/2002 | Babbitt et al. |
| 2002/0066024 A1 | 5/2002 | Schmall et al. |
| 2002/0116635 A1 | 8/2002 | Sheymov |
| 2002/0135611 A1 | 9/2002 | Deosaran et al. |
| 2002/0150243 A1 | 10/2002 | Craft et al. |
| 2002/0152305 A1 | 10/2002 | Jackson et al. |
| 2002/0162015 A1 | 10/2002 | Tang |
| 2002/0174137 A1 | 11/2002 | Wolff et al. |
| 2003/0033536 A1 | 2/2003 | Pak et al. |
| 2003/0046396 A1 | 3/2003 | Richter et al. |
| 2003/0046558 A1 | 3/2003 | Teblyashkin et al. |
| 2003/0051026 A1 | 3/2003 | Carter et al. |
| 2003/0061260 A1 | 3/2003 | Rajkumar |
| 2003/0065926 A1 | 4/2003 | Schultz et al. |
| 2003/0069928 A1 | 4/2003 | Hidesawa |
| 2003/0079145 A1 | 4/2003 | Kouznetsov et al. |
| 2003/0120947 A1 | 6/2003 | Moore et al. |
| 2003/0149888 A1 | 8/2003 | Yadav |
| 2003/0159070 A1 | 8/2003 | Mayer et al. |
| 2003/0174137 A1 | 9/2003 | Leung et al. |
| 2003/0177397 A1 | 9/2003 | Samman |
| 2003/0234808 A1 | 12/2003 | Huang et al. |
| 2004/0054917 A1 | 3/2004 | Obrecht et al. |
| 2004/0064736 A1 | 4/2004 | Obrecht et al. |
| 2004/0088570 A1 | 5/2004 | Roberts et al. |
| 2004/0098607 A1 | 5/2004 | Alagna et al. |
| 2004/0123157 A1 | 6/2004 | Alagna et al. |
| 2004/0187010 A1 | 9/2004 | Anderson et al. |
| 2004/0187023 A1 | 9/2004 | Alagna et al. |
| 2004/0243699 A1 | 12/2004 | Koclanes et al. |
| 2004/0266533 A1 | 12/2004 | Gentles et al. |
| 2005/0081059 A1 | 4/2005 | Bandini et al. |
| 2005/0137980 A1 | 6/2005 | Bullock et al. |
| 2006/0047815 A1 | 3/2006 | Hamadi |
| 2006/0190944 A1 * | 8/2006 | Moon et al. .......... 718/104 |
| 2006/0195847 A1 * | 8/2006 | Amano et al. .......... 718/103 |
| 2008/0313639 A1 * | 12/2008 | Kumar et al. .......... 718/104 |
| 2009/0007101 A1 * | 1/2009 | Azar et al. .......... 718/1 |
| 2010/0014432 A1 | 1/2010 | Durfee et al. |
| 2011/0247071 A1 | 10/2011 | Hooks et al. |
| 2012/0324464 A1 | 12/2012 | Slater et al. |

FOREIGN PATENT DOCUMENTS

| | | |
|---|---|---|
| WO | 02/03178 | 1/2002 |
| WO | 02/095553 | 11/2002 |
| WO | 02/103533 | 12/2002 |
| WO | 2004/021197 | 3/2004 |
| WO | 2004/055632 | 7/2004 |
| WO | 2004/072777 | 8/2004 |

OTHER PUBLICATIONS

Neil Stratford and Richard Mortier, "An Economic Approach to Adaptive Resource Management," University of Cambridge Computer Laboratory, Nov. 1998, pp. 1-5.

John R. Douceur and William J. Bolosky, "Progress-based regulation of low-importance processes," 17th ACM Symposium on Operating Systems Principles (SOSP'99), published as Operating Systems Review 34(5), Dec. 1999, pp. 247-260.

Detecting and Remediating Malicious Attacks, A Triumfant White Paper, Version 1.0, Aug. 10, 2011, pp. 1-16.

Cristian Tapus, et al., "Active Harmony: Towards Automated Performance Tuning," IEEE, 2002, pp. 1-11.

(56) References Cited

OTHER PUBLICATIONS

Jeffrey S. Vetter and Daniel A. Reed, "Real-time Performance Monitoring, Adaptive Control, and Interactive Steering of Computational Grids," published in International Journal of High Performance Computing Applications archive, vol. 14 Issue 4, Nov. 2000, pp. 357-366.

Morris Jette and Mark Grondona, "SLURM: Simple Linux Utility for Resource Management," Lawrence Livermore National Laboratory, 2003, pp. 1-25.

Windows System Resource Manager Overview, Applies to: Windows Server 2008 R2, http://technet.microsoft.com/en-us/library/cc731995.aspx, 5 pages. [Retrieved May 30, 2013].

Oracle Corporation, Using Dynamic Resource Management Policies, Logical Domains 1.3 Administration Guide, http://docs.oracle.com/cd/E19604-01/821-0406/usingdynamicresourcemanagementpolicies/index.html, © 2010, 2 pages. [Retrieved May 30, 2013].

Checkpoint: Software Technologies LTD., Endpoint Policy Management, http://www.checkpoint.com/products/endpoint-policy-management/, © 2013, 3 pages. [Retrieved May 30, 2013].

SingularLabs, System Ninja Process Manager, http://singularlabs.com/software/system-ninja/process-manager/, © 2013, 3 pages. [Retrieved May 30, 2013].

Daniel A. Menasce, et al., "Business-oriented resource management policies for e-commerce servers," Performance Evaluation 42, 2000, pp. 223-239.

Bitsum: Applied software engineering, Process Lasso—Automatically optimize your processes, cores, and power consumption, http//bitsum.com/processlasso/, © 2013, 4 pages. [retrieved Jun. 27, 2013].

Web Upd8: Ubuntu / Linux blog, Optimize Your Computer's CPU with Process Lasso, http://www.webupd8.org/2009/03/optimize-your-computers-cpu-with.html, Mar. 30, 2009, 4 pages. [Retrieved Jul. 22, 2013].

K. Thompson and D.M. Ritchie, "Unix Programmer's Manual," Bell Telephone Laboratories, Inc., Jun. 1974, pp. 82 and 151.

Communication Pursuant to Article 94(3) European in Application No. 04707408.3 issued Jun. 2, 2008, 6 pages.

Vaccaro, et al., "Detection of Anomalous Computer Session Activity," IEEE, 1989, pp. 280-289.

Kruegel, et al., "Service Specific Anomaly Detection for Network Intrusion Detection," Technical University of Vienna, TUV-1841-2002-28, Apr. 30, 2002, pp. 1-9.

Shieh, et al., "A Pattern-Oriented Intrusion-Detection Model and its Applications," IEEE, 1991, pp. 327-342.

Frans Veldman, "Combating Viruses Heuristically," Virus Bulletin Conference, Virus Bulletin Ltd., Sep. 1993, XP002444153, pp. 67-75.

Carey Nachenberg, "Behavior Blocking: the Next Step in Anti-Virus Protection," http://www.securityfocus.com/infocus/1557, last updated Mar. 19, 2002, XP002444153, pp. 1-5. [Retrieved Jul. 26, 2007].

Automated Program Analysis for Computer Virus Detection, IBM Technical Disclosure Bulletin, IBM Corp., vol. 34, No. 2, Jul. 1991, XP000211158, pp. 415-416.

* cited by examiner

MONITORING COMPUTER PROCESS RESOURCE USAGE

RELATED APPLICATION

The present application claims the benefit of U.S. Provisional Application No. 61/332,629, filed May 7, 2010, the disclosure of which is incorporated by reference herein in its entirety.

BACKGROUND

1. Technical Field

This disclosure relates generally to improving resource usage on a computer system, and, in some embodiments, to classifying processes and taking corrective actions in response thereto.

2. Description of the Related Art

Computer systems typically have numerous processes that share system resources (one or more processors, memory space, network bandwidth, etc.). A potential problem with having multiple processes is that they may be inefficient in sharing system resources. In many instances, processes are completely unnecessary to system operation, yet contend with high-value processes for limited system resources.

Developers of software that corresponds to these processes generally have little motivation to address this issue, because they are more often concerned with providing a maximal feature set to users. These processes typically consume a large amount of resources, without regard for the needs of other processes on the system. This disregard often results in a "tragedy of the commons," in which processes are ultimately starved or severely impaired. Operating system designers also have not addressed this issue. While most operating systems provide a mechanism for analyzing resource usage, they usually do not attempt to favor particular processes over other processes, providing an impartial "best efforts" paradigm to all processes.

The problem of resource usage is further magnified as the size of the computing environment increases. Consider an environment that includes many thousands of computer systems (such as an enterprise environment). At a given time in such an environment, millions of processes may be running, all of which are competing for limited resources. The execution of these processes may correspond to a significant investment in cost and resources on the part of the enterprise. Power consumption is but one example of a cost/resource.

To address the issue of resource consumption, information technology (IT) departments commonly inventory software (e.g., for compliance reasons in enterprise environments). Additionally, IT departments commonly deploy security software programs to identify malicious software running in the enterprise environment. Still further, a given desktop (i.e., client machine) might be manually reconfigured/optimized by an IT department employee. These approaches have certain limitations, however. For example, these approaches do not enable entities to gain insight into (and informed control over) what non-malicious or benign processes are running on end-user systems at a given time. (Non-malicious processes include those processes not flagged or classified by security software as harmful and those processes not intended to harm a computer system; examples of malicious processes include viruses, worms, keyloggers, adware, etc.) Because the vast majority of processes in an enterprise are benign, this lack of insight is a huge blind spot that creates cost inefficiencies and security problems, and prevents entities from being able to appropriately prioritize and direct their computing resources.

SUMMARY

Techniques for identifying, classifying, and prioritizing processes are disclosed. These techniques permit entities to assess or reconcile process resource cost with the importance of these processes. In one embodiment, a client program executing on a computer system can identify and classify processes that are running, including non-malicious processes. The processes may be scored based on information defining a resource usage policy. An entity (e.g., a company) may define a resource usage policy, and thus cause processes running on its client systems to be scored (e.g., using behavioral assessment) based on the extent to which particular processes align with business goals of the company. The score for a particular process may be compared with its resource usage to make a determination whether the process deviates from the resource usage policy. Various corrective actions may then be taken if a violation or significant process inefficiency is determined. One or more server computers may also collect and aggregate information from a plurality of client computer systems. The one or more server computers can generate reports regarding entity-wide resource usage by processes, as well as generate an updated resource usage policy for dissemination to the client computer systems.

Additional techniques relating to evaluating processes are also disclosed. In one embodiment, a client program may evaluate processes by classifying them into different application genres. A client program may classify a user associated with a computer system into one of a set of user types according to a user's role within an entity. The client program may then evaluate processes based on the classified user's user type. A client program may determine provenance information of processes and evaluate these processes based on the determined information. In one embodiment, a client program may take one or more corrective actions based on the evaluating, and, in response to receiving an indication of one or more negative consequences associated with the corrective actions, may then automatically undo the corrective action.

Techniques relating to evaluating browser activity are also disclosed. In one embodiment, a resource usage analysis program identifies browser sessions running on a computer system and analyzes sessions using a set of information defining a resource usage policy. The resource usage analysis program determines whether the analyzed browser sessions include the use of content that deviates from the resource usage policy, and takes a corrective action with respect to at least one of the browser sessions determined to be deviating from the resource usage policy.

Techniques relating to evaluating processes based on network session activity (or other in-focus user activities) are also disclosed. In one embodiment, a computer system may establish a network session with another computer system, and analyze processes running on the computer system during the network session. The computer system may accelerate processes that are determined to be relevant to the network session. The computer system may also terminate, suspend, or restrict processes that cannot be determined to be relevant to the network session.

DETAILED DESCRIPTION

Figure 1A:
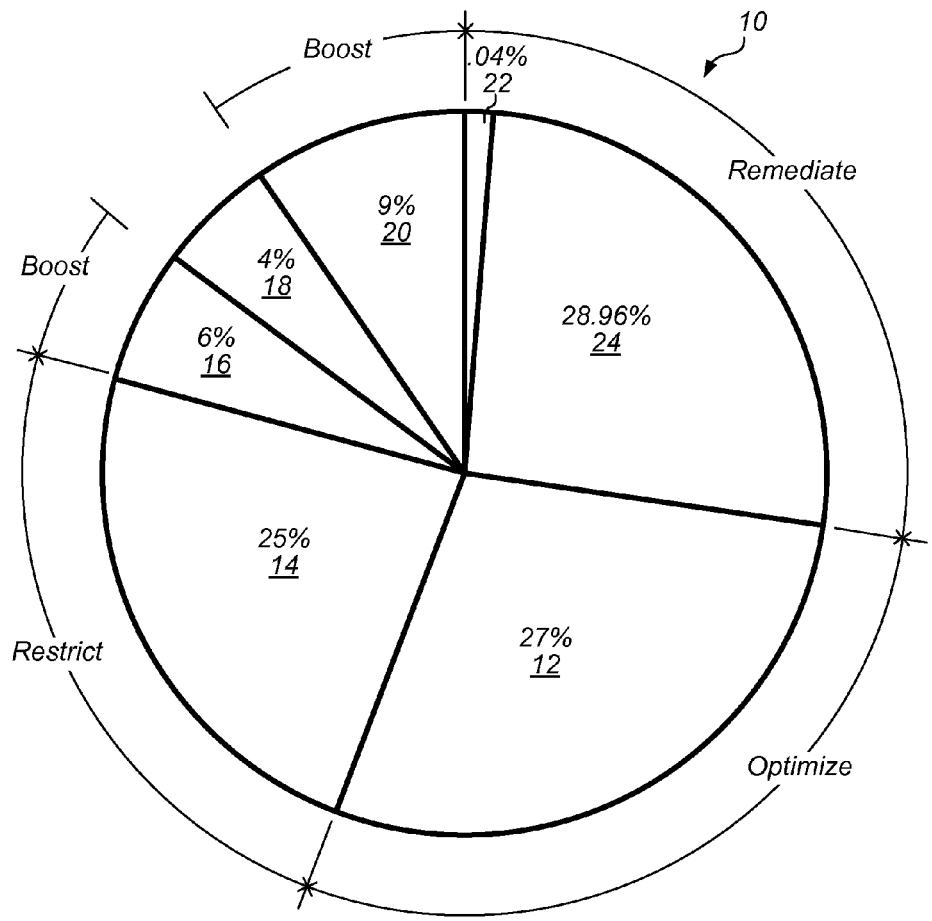
FIG. 1A is a pie chart illustrating a typical process distribution on a computer system.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising one or more processor units . . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component.

"Automatically." As used herein, when an action is described as being performed "automatically" by a program, this term connotes that the program, once initiated, performs instructions that are executable to perform the action without requiring user authorization to perform/complete the action. For example, in an instance where an individual manually determines all of the processes executing on a machine, tracks each of the processes down to categorize them, and then manually terminates one or more of these processes, these actions are not performed "automatically." An example of automatic execution is a program that, when running, performs identification, categorization, and remediation without requiring user intervention (although information regarding these steps could certainly be provided to a user in some embodiments).

"Based On." As used herein, this term is used to describe one or more factors that affect a determination. This term does not foreclose additional factors that may affect a determination, nor does it affect the particular weighting of factors affecting a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Entity." As used herein, this term broadly refers to a person or organization that owns, controls, or otherwise directs usage of one or more computer systems (e.g., an enterprise user desktop pool). An entity can refer, for example, to a corporate, governmental, educational, or other type of organization. References herein to computer systems of an entity or computer systems associated with an entity include not only those systems owned, leased, or otherwise used by the entity, but also those systems used to access computing resources of the entity. Thus, a user's home computer used to access company computing resources can be considered a computer system of the company or associated with the company for purposes of this disclosure.

"Process." As used herein, this term refers to an instance of a program or application software running on a computer system.

In order to address the problem of resource consumption, the inventors have recognized that answers to at least the following questions may be beneficial to an entity that has computer systems:

1. What processes are running on my systems (e.g., within an enterprise user desktop pool, which is simply the collection of user systems within the enterprise)?
2. What is their value to the entity (e.g., the business value or other contribution to the productivity or mission of the entity)?
3. What is their resource demand?
4. Is their resource consumption justified by their value?

This problem is particularly acute when the number of processes (e.g., from thousands of end-user systems in an enterprise environment) is in the hundreds of thousands or millions.

Turning now to FIG. 1A, a pie chart 10 illustrating an exemplary distribution of processes on a computer system (e.g., an enterprise desktop system) is depicted, as determined by the inventors. Seven broad categories of processes are shown in chart 10, each of which is labeled with an approximate percentage of the total number of processes. Thus, operating system processes 12 are 27% of the process total in this illustration, security, backup, and management processes 14 are 25% of the total, office productivity applications 16 (e.g., word processing and spreadsheet applications) are 6% of the total, IT and support tools 18 are 4% of the total, business-critical applications 20 are 9% of the total. Furthermore, the inventors have recognized that it is not atypical for almost 29% (e.g., 28.96%) of all processes on a typical computer system to be "extraneous" (as indicated by reference numeral 24) (e.g., not relevant to an entity's business, mission, or productivity).

Malware & adware-related processes 22 are indicated by a small sliver of pie chart 10 as being far less than 1% of all active processes. Companies routinely make large investments in security software to help ensure the safety of their systems. Security software companies, in turn, make large investments in attempting to identify malware as accurately as possible (avoiding false positives). Pie chart 10 suggests, however, that despite the expense and complexity, such software may do little, if anything, to improve the overall efficiency and performance of a typical desktop system. (In many cases, such software can unduly burden a system.) When considered in the context of the overall process count shown in FIG. 1A, security software, while serving a valuable purpose, is too limited in scope to address the most pressing questions facing IT departments and Chief Information Officers in companies today: wasted cycles. Wasted computer cycles, especially in enterprise environments with thousands of desktops, represent an enormous cost to companies. Many entities have no idea what processes are running on their collective desktop pool, and thus have no way to effectively prioritize or cull these processes.

Techniques described in this disclosure seek to ameliorate these problems. As shown in FIG. 1A, different actions may be taken with respect to different categories of processes in various embodiments. For example, extraneous processes 24 and malware/adware 22 may be remediated (e.g., terminated, suspended, etc.). On the other hand, processes 12 related to the operating system (which are essential and cannot be terminated) may be optimized. Furthermore, certain non-extraneous processes 14 may have their performance restricted. For example, a security scan running on a system during the middle of the day may be suspended until a more suitable time. Other processes 16 and 20, which may be deemed important to the goals of an entity, may have their performance boosted. For example, in an engineering department in a company, processes relating to a computer-aided design (CAD) program may have their performance boosted. In the embodiment, no action is taken with respect to certain IT processes 18. By identifying processes in these high-level categories and taking appropriate actions, system performance (e.g., boot and logon time, power consumption, stability) may be greatly improved. Various techniques to achieve these ends are discussed in great detail below.

Embodiments of the present disclosure perform an analysis through various techniques and take appropriate actions to improve system performance, user experience, and value to the entity. Such an approach may permit entities to manage end-user processes centrally (e.g., en masse at an enterprise scale), thereby avoiding wasted computer cycles, potential points of failures, underutilized software licenses, wasted electrical costs, increased support costs, etc. This approach may also lead to advantages over a time-consuming approach requiring each end-user system to be tuned manually (e.g., by an IT professional).

Figure 1B:
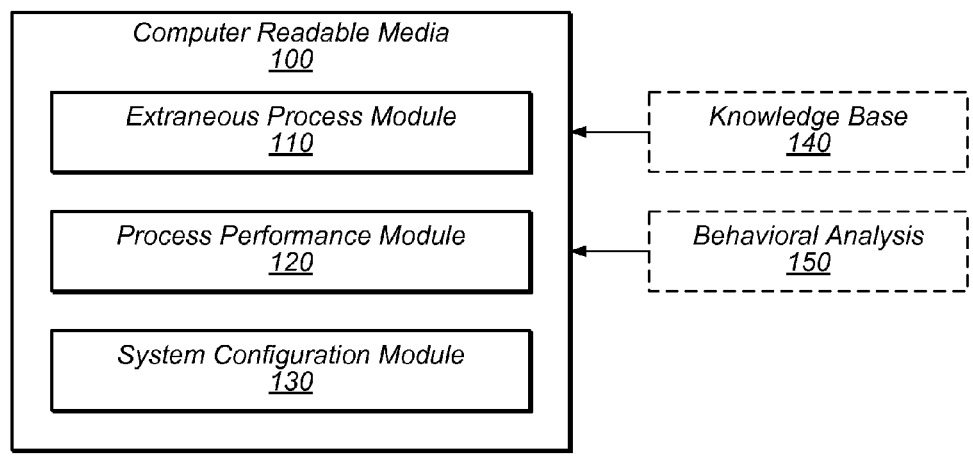
FIG. 1B is a block diagram of software modules that improve resource usage on a computer system according to one embodiment of the present disclosure.

Turning now to FIG. 1B, one embodiment of software modules 110-130 in accordance with the present disclosure is depicted. In the illustrated embodiment, program instructions for an extraneous process module 110, process performance module 120, and system configuration module 130 are stored on computer readable media 100. Note that the various modules shown in FIG. 1 are grouped for sake of explanation and can be arranged differently in various embodiments (in some embodiments, certain modules may not be present). As will be described below, program instructions of these modules may be executed on one or more computer systems to improve resource usage.

Extraneous process module 110, in one embodiment, is executable to identify "extraneous" processes on computer systems and remediate the effects of those processes. An "extraneous" process from the perspective of a given module 110 is a process that satisfies a set of extraneous process criteria. This set of criteria may be established for a particular entity (e.g., a company) and/or a particular client computer system according to the needs of that entity. In many cases, the set of extraneous process criteria is configured to identify those processes that are not needed for the particular client computer system to operate (e.g., to accomplish the business goals of an entity).

Extraneous processes may include malicious processes (e.g., viruses, adware, etc.) as well as non-malicious processes that provide little or no value to an entity that has set the extraneous process criteria. One example of a non-malicious, low-value extraneous process is realupdate.exe, the update agent for realplayer.exe, a media streaming application. This application periodically checks for software updates, which may be provided approximately once a month. The application typically loads at startup of the client and continues to reside in system memory while using processor and network resources. In most instances, this application provides little or no benefit to the computer user and the entity in question. In some cases, many thousands of enterprise systems may be redundantly checking for updates independently, wasting expensive wide-area network (WAN) bandwidth.

To remediate the effects of extraneous processes, module 110 may take one or more corrective actions. In some embodiments, these actions may include terminating identified extraneous processes and removing load points of those processes to prevent them from reloading unnecessarily. In some embodiments, extraneous process criteria can be used as the basis for performing corrective actions on processes regardless of the current actual system resources those processes are consuming. Various techniques for identifying and remediating extraneous processes are described in further detail below.

Process performance module 120 is executable to identify and control process performance, particularly of non-extraneous processes, such as processes not identified as extraneous by module 110. These processes include those that cannot be terminated outright (i.e., are not extraneous), but whose computer system resource consumption is not justified by its current importance—for example, because they are currently in contention with higher-value processes. Module 120 may also identify non-extraneous processes that should be given greater priority with respect to computing resources.

Security software is one example of a non-extraneous process that may need to be controlled by module 120. This type of software typically uses a significant amount of disk and processor resources, often slowing a computer system dramatically. Thus, performing a scan in the middle of the day may not be the best use of computing resources for an entity, particularly when a user is currently using the system to run business applications. Accordingly, in various embodiments, module 120 may idle, suspend, or restrict the security software until an appropriate time is available to scan the system more intensively (e.g., late at night).

Further, consider video-editing software in the context of a movie-producing entity. In such a scenario, module 120 may determine that such software is underperforming and cause additional resources to be dedicated to improve its performance. Various techniques for identifying and remediating such processes, to better align resource allocations with enterprise goals, are described in further detail below.

System configuration module 130 is executable in one embodiment to optimize the configuration of a computer system including its system settings, configuration parameters, and operating conditions. Computers typically have numerous configuration settings, which may impede system performance if non-optimally configured (as is typically the case). These settings may include various operating system settings, driver settings, network settings, etc. These settings may impede performance because they include errors, are generalized for multiple systems (a one-size-fits-all approach), were determined for dated technology (e.g., computer systems developed a decade ago), were not targeted for enterprise deployments, etc. Various techniques for optimizing a computer system are described in further detail below.

Modules 110-130 may use information collected from a variety of sources including knowledge base 140 and behavioral analysis information 150. Knowledge base 140, in one embodiment, is a database of information collected from customers, human testers, and web-generated content. For example, customers may indicate particular business goals for their enterprises such as identifying software suites that have particular value and would benefit from improved performance. Human testers may provide results generated from performing laboratory experimentation, statistical analysis, anomaly detection, genetic learning, contextual analysis, etc. Forums and websites may be periodically scanned (e.g., by web crawlers) to collect information about known resource consumption levels for particular processes, the value of particular processes, problematic updates for processes, user community experiences, etc. Behavioral analysis information 150, in one embodiment, is information collected using behavioral technology and heuristics in real time. In various embodiments, this information may be collected by an agent running on a computer system to track attributes of processes including memory consumption, processor usage, startup characteristics, version updates, etc. Accordingly, knowledge base 140 and behavioral analysis 150 may be processed to develop techniques usable by modules 110-130.

Figure 2:
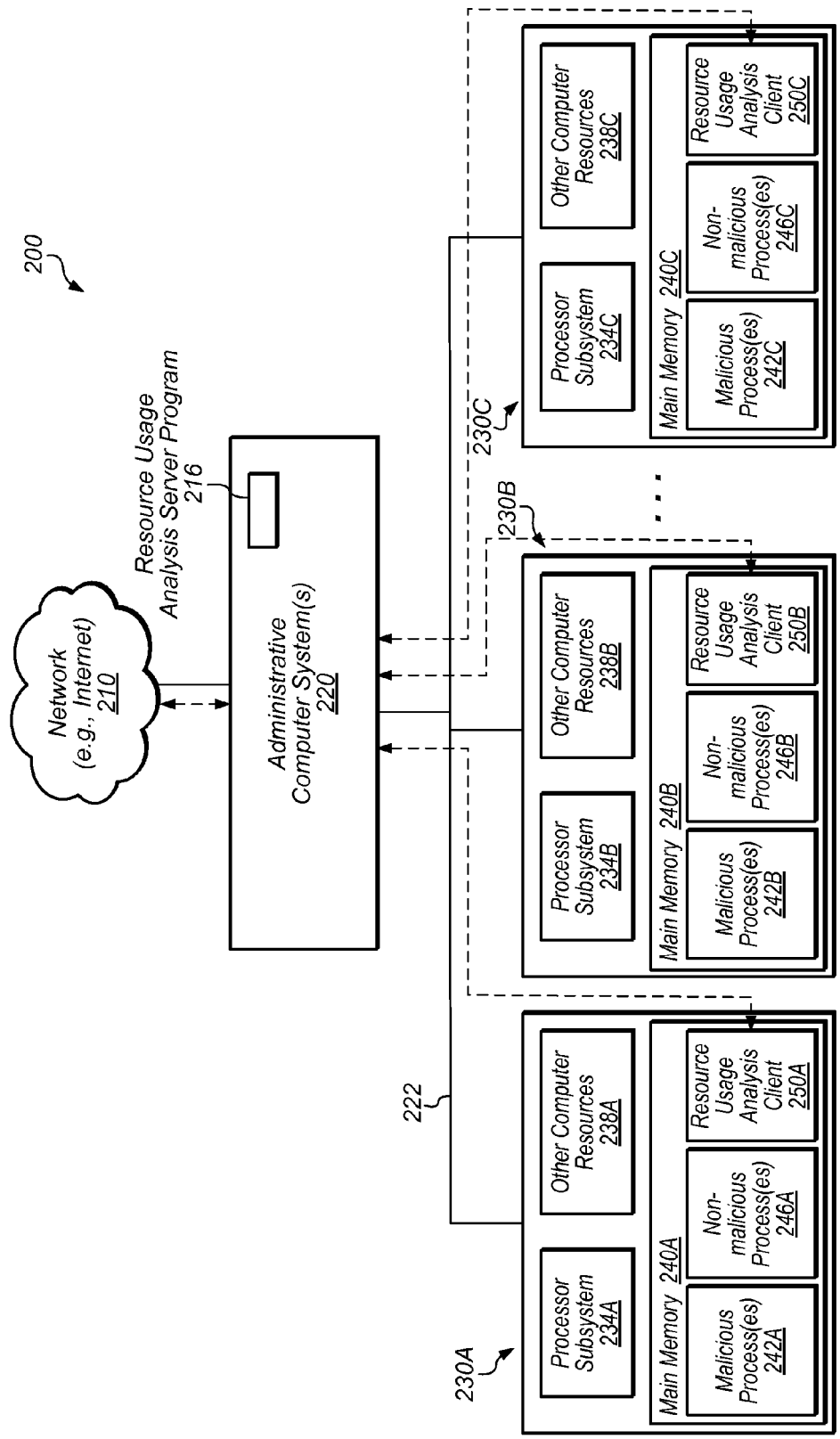
FIG. 2 is a block diagram of a distributed computing environment according to one embodiment of the present disclosure.

Turning now to FIG. 2, one embodiment of a computing environment in accordance with the present disclosure is depicted. In various embodiments, computer systems in a computing environment may execute program instructions from modules 110-130. As shown, computing environment 200 includes network 210, administrative computer system 220, and client computer systems 230. Network 210 (which may be an intranet, the Internet, etc.) is connected to system 220 by any suitable network connection (e.g., LAN, WAN, wired, wireless, combinations thereof, etc.). Similarly, system 220 is connected to systems 230 by any suitable network connection.

Computer systems 230A-C are computer systems that are monitored according to techniques disclosed herein, according to various embodiments of the present disclosure. Each system 230 is shown as having a processor subsystem 234 (e.g., one or more processors), main memory 240 (memory that is used during execution to store processes, other application information, client 250, and associated information), and other computer resources 238 (network, peripherals, etc.). In one embodiment, systems 230 represent all (or any subset) of the end-user systems of an entity (e.g., a company) that are to be monitored. Systems 230A-C are depicted to illustrate that, in some embodiments, each system 230 has its own set of resources. Systems 230 may be situated in any suitable configuration. In one embodiment, all of the systems are on a local-area network. In enterprise systems, system 230 may be situated in numerous geographically-diverse locations connected by a wide-area network. Systems 230 can all be located within an intranet in one embodiment; in other embodiments, systems 230 can be coupled through a public network such as the Internet. Systems may also be virtualized, with the primary system images executed by a virtual desktop infrastructure (VDI) server within a data center, and connected with user thin or thick client devices via a network.

As will be described below, resource usage analysis clients 250 can be executed on respective ones of systems 230 to monitor resource usage according to various algorithms, including those described above (e.g., detection of extraneous processes, detection of underperforming processes, optimization of system configurations, etc.).

In one embodiment (client-level implementation), clients 250 operate using information garnered from the corresponding system 230 on which they are operating. As will be described below, examples of such information may include files under WINDOWS File Protection, the particular paths of active process images, the presence or absence of a registry key (i.e., an autostart key) that causes an operating system to load a process during a startup sequence for particular processes (as used herein, the term "startup sequence" refers to both the boot process of a computer system and the loading of software (e.g., background processes) subsequent to a user's login), etc. In another embodiment (server-level implementation), clients 250 operate using information from a server (e.g., resource usage analysis server (e.g., control) program 216 executing on system 220). The use of a server allows data to be processed in bulk and to set and dynamically adjust resource usage in real time throughout an entity. (The term "domain" is also used herein to refer to a group of systems that are controlled or under the direction of an entity. Thus, all of the systems of XYZ Corporation might be considered to be within a single domain, which could be geographically distributed in some embodiments. Also, a "domain" need not correspond to a single "top-level domain" on the World Wide Web, but may refer also to organization sub-domains.) For example, a determination by one client 250 that a particular process deviates from a resource usage policy of an entity may be sent to program 216, and subsequently disseminated to other clients 250 in the form of an updated resource usage policy. Conversely, a resource usage policy rule may be established (either automatically or manually) in the first instance by program 216 and then disseminated to clients 250 for implementation at the end-user level. The server-level approach may allow, for example, comparisons of application behavior across systems 230, detection of anomalous configurations or unusual versions, identification of statistical outliers, determination of commonly installed applications, etc. One or both of the client-level and server-level approaches may be used in various embodiments.

In another embodiment (Internet-level implementation), information gleaned from one or more Internet sources (e.g., websites, user forums, blogs, etc.) may be used to automatically determine the nature of a process executing on system 230. For example, client 250 and/or server program 216 may interrogate knowledge library websites, expert forums, etc. to determine whether discussion exists regarding particular applications, their resource demands, configuration properties, application vulnerabilities, or version and update availability. Additionally, it can be determined whether "chatter" about application issues exists, such as performance impacts or stability problems. Various data mining techniques may be employed to this end. This information may be used to assess (e.g., score) a particular process, either by itself or in combination with other attributes such as those discussed below. The Internet-level implementation referred to above may be used in conjunction with one or both of the client- and server-level implementations. In one embodiment, the client-level, server-level, and Internet-level implementations are combined into a higher-level algorithm that, in one embodiment, analyzes and classifies a process based on all available inputs across the three information tiers. Each implementation level provides a different analysis and decision-making context with distinct capabilities. The higher-level "correlational" (or orchestration) algorithm may be variously implemented in client 250 and/or program 216.

As described above, client 250 may be executable to assess the nature of various processes residing in main memory 240 and executing on the processor subsystems 234 of the respective client systems 230. In FIG. 2, these processes are shown as malicious processes 242 and non-malicious processes 246. The concept of malicious processes is known in the art, and includes unauthorized processes, typically running without a user's informed consent. Viruses, worms, trojans, keyloggers, and adware are just some examples of malicious processes. Such processes may be handled (e.g., terminated or quarantined) by security software (not shown in FIG. 2), with the result that client 250 may analyze those processes not flagged by the security software (of course, certain malicious process may escape detection by security software, and thus may be analyzed by client 250). Note that the vast majority of processes running on a typical computer system are non-malicious, and thus are not affected by security software. Accordingly, from a resource usage standpoint, security software may be ineffectual with regard to the vast number of processes executing on enterprise desktops. Client 250, however, advantageously analyzes these non-malicious processes as described below.

Figure 3:
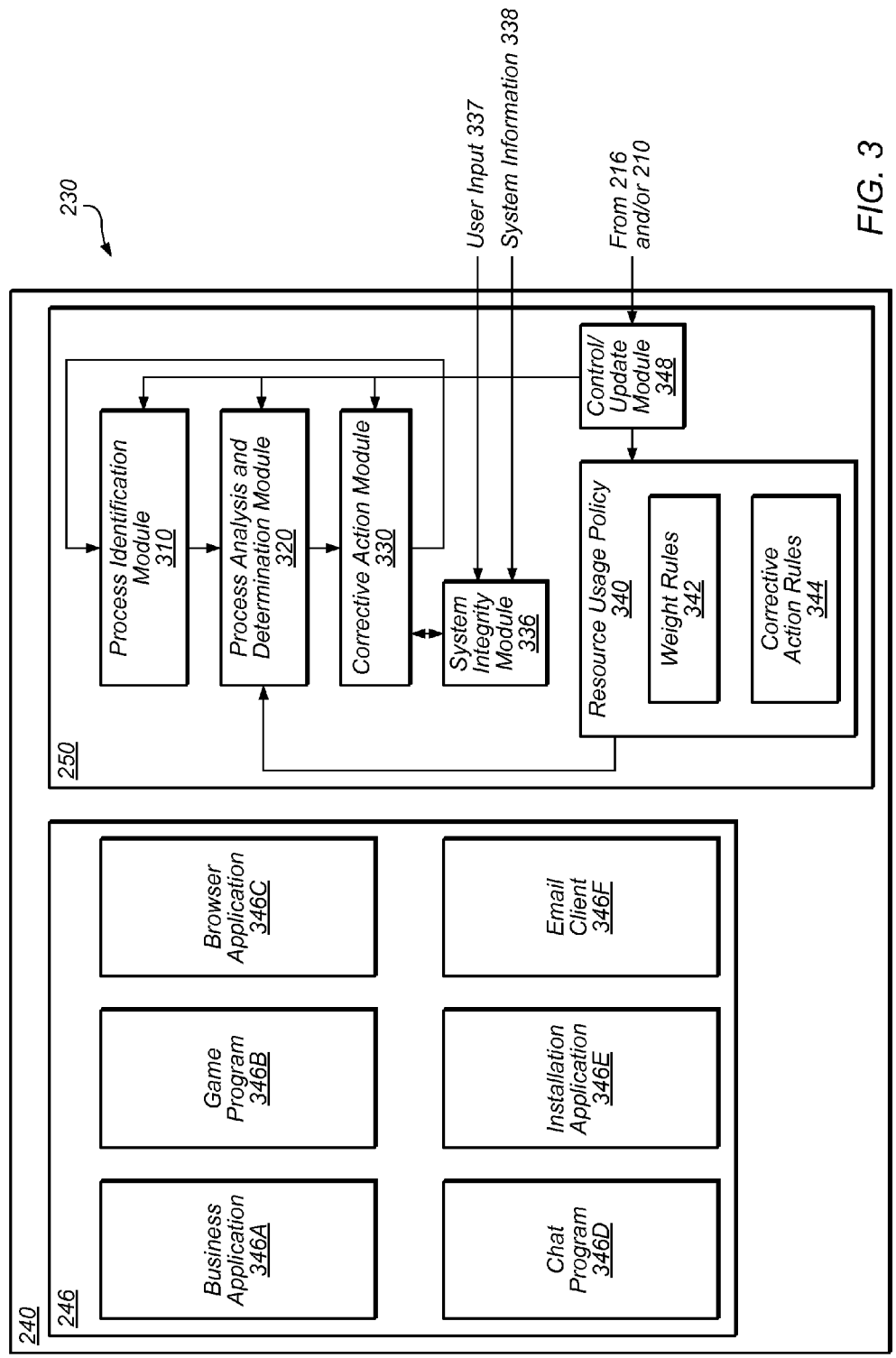
FIG. 3 is a block diagram of processes and a resource usage analysis client according to one embodiment of the present disclosure.

Turning now to FIG. 3, one embodiment of information stored in a main memory 240 of a computer system 230 is depicted. In one embodiment, memory 240 includes random access memory of system 230, and stores various processes being executed on processor subsystem 234. Examples of non-malicious processes are shown in FIG. 3 within element 246: business application 346A (e.g., an office suite or enterprise application), game 346B, browser application 346C, chat program 346D, installation application 346E, and email client 346F. Different numbers of process types are possible.

Main memory 240 also, in one embodiment, stores program instructions and data executable to implement client 250. Client 250 is shown as having various "modules," or groups of program instructions, as well as information (data) defining resource usage policy 340. In various embodiments, policy 340 may be defined by an entity other than the user of system 230. For example, policy 340 may be established by a body setting criteria for efficient client resource management and could be a corporate entity for users of its systems, a regulatory body, an industry council, an industry standards group, a trade association in a particular sector, etc. Note that the various modules shown in FIG. 3 are grouped for sake of explanation and can be arranged differently in various embodiments (in some embodiments, certain modules may not be present).

Module 310 includes program instructions executable to identify processes executing on system 230. Module 310 may be performed, in various embodiments, by various calls (e.g., via an application programming interface API such as the WINDOWS Management Instrumentation (WMI) API) to an operating system (not shown) of system 230. In certain embodiments, module 310 may identify all processes executing at a given time; alternately, certain processes may be excluded from such analysis (e.g., through a safe list or through determined disqualifying attributes). Module 310 may also collect various types of information about identified processes by using sensor instrumentation (e.g., via making API calls to WMI or other instrument APIs) for usage by module 320. In some embodiments, this information may include process identifiers (PIDs), accessed shared libraries, identifiers of parent processes, image metadata, operating system API calls, registry information, executable binary information, file system information, memory usage information, object handles, accessed dynamically linked libraries (DLLs), etc. Note that security software may preemptively terminate certain malicious processes in certain embodiments, meaning that such processes are not identified by module 310.

Module 320, in one embodiment, may use various techniques to analyze the processes and determine whether corrective action is to be taken. In various embodiments, modules 320 computes one or more scores (e.g., numeric values from weighted attributes or resource usage metrics) as part of its analysis, and determines corresponding corrective actions to be taken based on the scores. In one embodiment, module 320 determines a first score for each analyzed process. This score may be considered to reflect a correspondence between the nature of the process and the objectives/goals of the entity implementing resource usage policy 340. In other words, policy 340, as will be described below, includes certain information describing what types of process attributes are valued/ not valued for a particular environment or for a particular user/system. For example, certain gaming applications may be scored "low" within a corporate computing environment. (In a gaming company, however, such applications may have a high importance.) Module 320 may further compute a second score/value for each process that reflects the (current, past, future) resource usage of that process—e.g., how much of the computing resources (processor, network, etc.) of system 230 the process is occupying. Finally, module 320 may use the first and second scores/values to determine whether the current resource usage of each analyzed process (as indicated by the second score/value) is justified given the importance of the process (as indicated by the first score/value). Thus, a process deemed as having low importance (e.g., a game) may not merit corrective action if its resource usage is minimal. In various embodiments, the determination of whether corrective action is warranted may be based on criteria defined in resource usage policy 340. Such a policy may be implemented using a sliding scale—for example, a process having a high importance value may not be subject to corrective action regardless of its resource usage, or only if its resource usage is extremely high. Conversely, a process having a low importance value may be subject to corrective action even if it has minimal resource usage. Module 320 is described in further detail in conjunction with FIGS. 7-18.

Corrective action module 330, in one embodiment, is executable to implement corrective actions determined by module 320. In various embodiments, module 330 causes various actions to be taken by making API calls to an operating system on client system 230. These calls may instruct the operating system to terminate a particular process, lower or raise a priority of a process, adjust memory allocated to a process, idle or awaken a process, etc. In some embodiments, module 330 may implement actions by providing instructions to hardware (e.g., network devices) via one or more driver APIs. Various types of corrective actions (i.e., remediation) are discussed in further detail below.

In certain embodiments, a client 250 includes system integrity module 336. Module 336, in certain embodiments, permits a client 250 to self correct when presented with information indicating that a particular remediation action has created a harmful or undesired situation on a system 230. Thus, module 336 may perform "before and after" checks to ensure system functionality (e.g., keyboard and mouse operation, network functionality, indicated by system information 338). In certain embodiments, client 250 also looks for user activities (such as repeated key pressing, mouse clicking, selection of a system tray icon, etc., indicated by user input 337) to detect or infer that a user is frustrated or unhappy at the results of a particular remediation in order to unlock the system and "undo" recent remediations to maintain the integrity of the user's experience. Client 250 may also, in certain embodiments, avoid problems in an enterprise environment that arise from potentially harmful rule misapplications. This problem may be ameliorated by selectively rolling out rule updates to initially small and progressively larger samples of machines, until stability of the rule is established (rule stability may be indicated from information received via input 338 in one embodiment). This approach mitigates the risk of false positive detections or inappropriate rule actions, which are a potential hazard with statistically-based heuristics engines. System integrity module 336 is described in further detail in conjunction with FIGS. 19 and 20.

Resource usage policy 340 includes, in one embodiment, any set of information that is usable to facilitate process analysis, classification, and remediation. In the illustrated embodiment, policy 340 includes weight rules 342 and corrective action rules 344. In one embodiment, weight rules 342 dictate how a particular feature of a process should be scored. For example, a rule 342 may specify a weight value to be added to a total score of a process if that process has that particular feature. In one embodiment, corrective action rules 344 dictate corrective actions to be taken when certain conditions are satisfied. For example, a rule 344 may have the format if <condition terms> then <action steps>. In this format, a <condition term> may be a score satisfying a threshold, and <action steps> are corresponding corrective actions. A <condition term> may also be a non-score related attribute. For example, a rule 344 may dictate that a particular set of actions for a process be taken if that process has a particular feature regardless of any score determined for that process. Note that various <condition steps> may be static (unchanging for the process—e.g., its genre) or dynamic (e.g., resource usage, which may fluctuate). Corrective actions can comprise a variety of methods including, but not limited to, generating a report, performing further analysis, restricting/suspending/terminating a process, removing an autostart method of the process (e.g., by modifying a system registry key, startup folder, etc.), quarantining the process image on disk (e.g., by taking it out of path, changing the extension, renaming it, placing it in an encrypted container, etc.), deleting of backing image, disabling the image in memory, deleting associated files, and/or uninstalling the application. Corrective actions may also include increasing a process's resource usage—for example, when a particular process is determined to be a particularly important one, yet its resource usage is low. Potential actions in such a situation may include increasing memory allocation, increasing network bandwidth, increasing storage bandwidth, increasing share of processor time, etc. Conversely, corrective actions may also include decreasing a process's resource usage—for example when a particular process is determined to be of lesser value than competing higher-value processes. These actions are performed automatically in response to observed process behavior and/or characteristics.

Control/update module 348 refers generally to any program instructions that perform governing functions for client 250. For example, module 348 may handle communication with server program 216 or another entity in network 210. Thus, module 348 may handle updates to resource usage policy 340 that are received from these sources. In certain embodiments, module 348 may update policy 340 based solely or partially on information obtained from within system 230. Module 348 may also provide statistical information about client 250 to server 220. As will be described in conjunction with FIG. 5, server 220 may process this information to generate and disseminate new policies 340 to clients 250.

Figure 4:
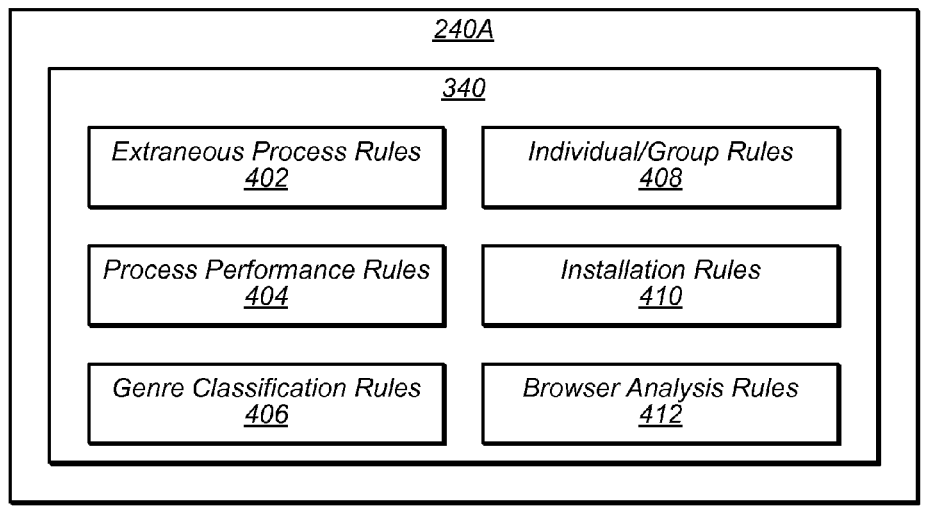
FIG. 4 is a block diagram of information defining rules within a resource usage policy according to one embodiment of the present disclosure.

Turning now to FIG. 4, one embodiment of information defining rules 342 and 344 within resource usage policy 340 is depicted. As shown, policy 340 may include extraneous process rules 402, process performance rules 404, genre classification rules 406, individual/group rules 408, installation rules 410, and browser analysis rules 412. Of course, the depicted sets of rules are merely illustrative and can be combined in various embodiments; in other embodiments greater or fewer of these types of rules may be present. As used herein, a "rule" is a set of information defining a condition and (in some cases) an action. In some embodiments, rules 342 and 344 may differ within different modes of computer system 230.

Extraneous process rules 402 refer to information used to determine the set of conditions that specify whether a particular process being analyzed has "no to low" importance, and thus may not present functionality that a user system 230 needs to complete their computing session. In one embodiment, rules 402 may cause observation of hundreds of properties of a running process to determine its importance, or utility. In one embodiment, process attributes may be weighed in a scoring system that can be used to detect, according to some predetermined criteria, whether a process is in fact extraneous. Whether a process is extraneous is, however, a matter of a particular resource usage policy. Thus, what may be considered an extraneous process in one setting may not be considered so in another setting.

The extraneous process rules may be specified by or on behalf of an entity (e.g., by a regulatory entity that establishes a standardized set of extraneous process rules for one or more different computing platforms). It is thus contemplated, for example, that an entity could establish a default set of extraneous process rules for WINDOWS-based computer systems. This default set of criteria could be used by entities to determine extraneous processes on their WINDOWS desktops; alternately, such entities could modify or establish their own set of extraneous process rules.

In one embodiment process rules 402 may be used to identify a process as extraneous by positively identifying and scoring preconfigured attributes such as whether the process is not represented in a task bar of the operating system, whether the process has an icon in an operating-system menu that displays executing background processes (e.g., a system tray), whether the process (or program including the process) has an entry in an operating-system installation assistant (e.g., add/remove programs feature of the operating system), whether the process is running HTTP service traffic, whether the process is launching new executable code, or whether the process is spawning new processes, whether the process is controlling a device driver through system commands, etc.

In certain embodiments, client 250 may employ a safe list to eliminate applications from consideration of rules 402 by specifying particular applications that are of high value to an entity maintaining resource usage policy 340. Thus, in one embodiment, a company may define certain mission-critical business applications on a safe list, such that such processes need not be analyzed by rules module 402, and instead can be excluded from consideration. Note that in some embodiments certain users of system 230 may not be able to add to the safe list, which would permit users to safe list programs (e.g., games) that do not align with the business goals of the entity that provides the computing environment in which computing system 203 is situated. In some embodiments, a client 250 may heuristically determine to add processes to a safe list instead of only relying on an enterprise to specify processes.

Rules 402 may also vary depending on whether the process is loaded automatically by the operating system during a system startup sequence (i.e., an "autostart" process), is started by an application, or is started by a user. When a process is determined to be automatically started (e.g., by an operating system of computer system 230), this determination may provide an indication that the process was initiated without user engagement, and thus may not be desired or needed by the user. If a process is determined to have been started by an application (particularly where the application was started by the user), the process may be necessary for operation of that application. Thus, in some embodiments, such a process may inherit the score of its parent application (absent other specific information). Similarly, if a process is determined to have been started by the user, this determination is an indication that the user affirmatively desired the process to run. Thus, in some embodiments, application-started and user-started processes may score higher (from an importance or criticality standpoint) than processes determined to have been autostarted, such as during boot up or log on procedures.

Note that one typical corrective action for an extraneous process is to terminate the process and remove its load point (i.e., a mechanism which causes a process to load for execution). Such actions may, in certain embodiments, occur regardless of resource usage.

Figure 7:
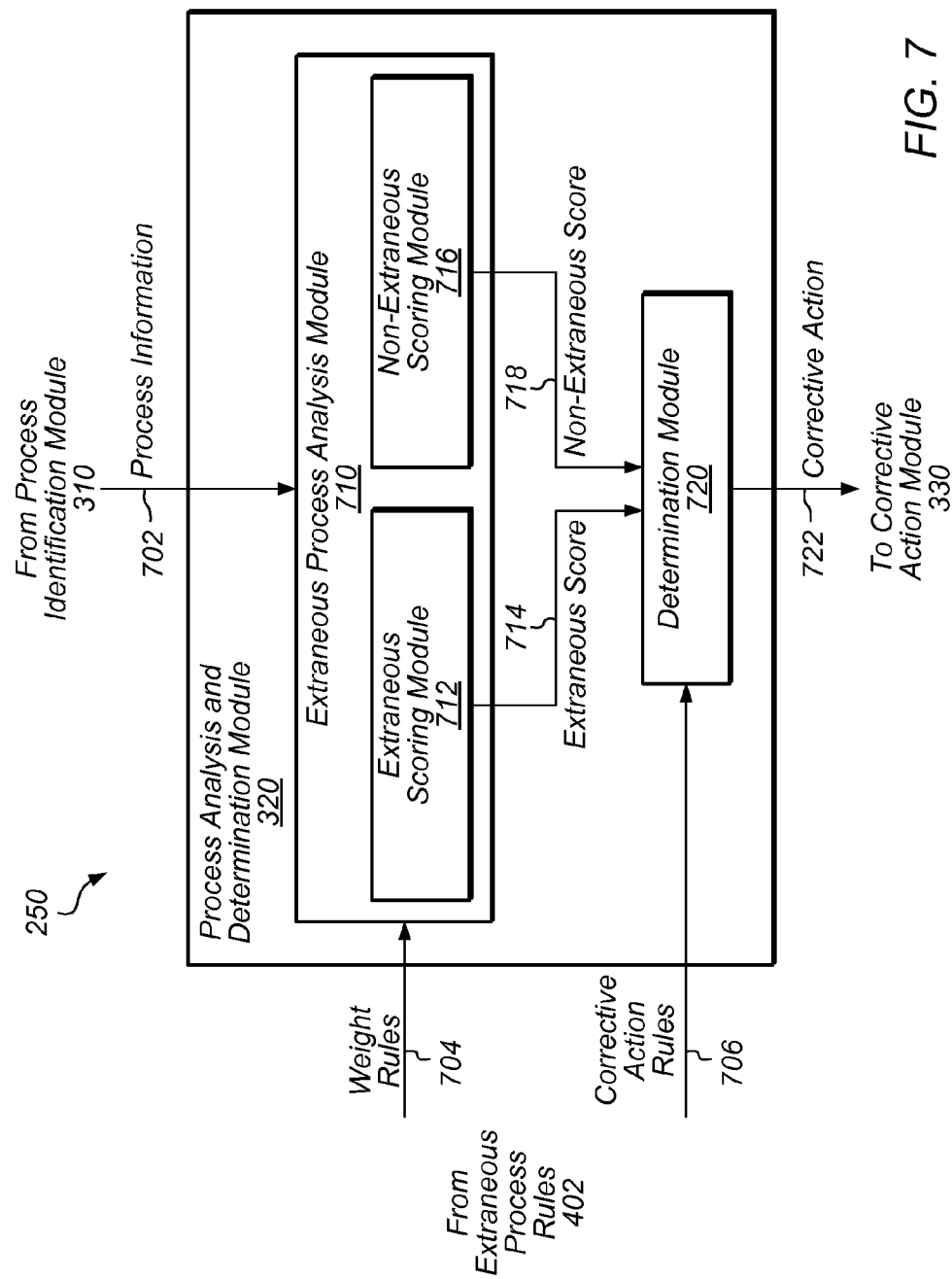
FIG. 7 is a block diagram depicting an extraneous process analysis module according to one embodiment of the present disclosure.
Figure 8:
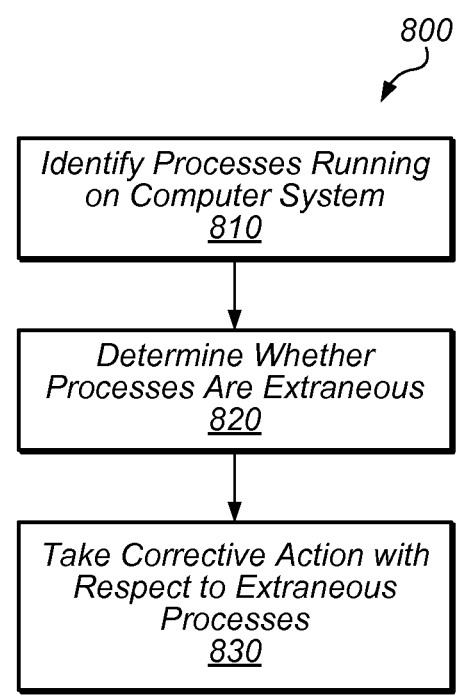
FIG. 8 is a flow chart of a method for analyzing extraneous processes according to one embodiment of the present disclosure.

Usage of rules 402 is described in further detail in conjunction with FIGS. 7 and 8.

Process performance rules 404 govern those applications that cannot be terminated outright, but which must remain on the system. This set of rules may differ depending on the state of system 230. Rules 404 may have a first set of rules for an idle machine (e.g., when x number of keystrokes or mouse events are not detected for a designated period of time). Rules 404 may have a second set of rules for background processes (i.e., an application that is not the "in focus" application). Still further, rules 404 may have a third set of rules for an "in focus" application. In the third set of rules, the standard for what constitutes "underperforming" may be elevated relative to the first or second set of rules; because an in-focus application exhibits user engagement, it may not be desirable to unduly restrict the application at that time. In one embodiment, since these processes cannot be terminated, they may be restricted via script blocking, processor priority governance, suspension, blocking network access, etc. As one example, a rarely invoked update application (e.g., one that only sits and waits for a software vendor to update an application) may be put to sleep for extended periods and awakened only periodically. Further, some applications may run, whether in foreground or background, in a manner that disproportionately consumes resources relative to other executing programs on the system. These algorithms may regulate those applications' disproportionate consumption in a fashion that is most advantageous to the user, system, or entity. Usage of rules 404 is described in further detail in conjunction with FIGS. 9-10.

Genre classification rules 406, in one embodiment, focus not on efficiency but on categorizing programs by type. In various embodiments, rules 406 are applicable to one or more of the following classification-types (i.e., genres) of processes:

Chat (e.g., aim.exe—AOL instance messenger; skype.exe—a VOIP application from SKYPE; etc.)

Base System (e.g., csrss.exe—WINDOWS client/server runt-time subsystem application; lsass.exe—local security authentication server; etc.)

Systems Management (e.g., winlogon.exe—WINDOWS logon application; taskmgr.exe—WINDOWS task manager; etc.)

Data Management (e.g., uphclean.exe—a user profile hive cleanup service; mozybackup.exe—MOZY remote backup manager; etc.)

Security Software (e.g., rtvscan.exe—NORTON antivirus scanner; mcshield.exe—MCAFEE antivirus scanner; etc.)

Browsers (e.g., firefox.exe—FIREFOX browser application; iexplorer.exe—MICROSOFT internet explorer; etc.)

Updaters (e.g., realupdate.exe-REAL player update application; etc.)

Hardware Utilities (e.g., ati2evxx.exe—ATI display adapter driver application; etc.)

Mobility Applications (e.g., hotsync.exe—PALM manager program; sprintsv.exe—SPRINT Smartview; etc.)

Office Suites (e.g., winword.exe—MICROSOFT Word application; etc.)

Remote Controls (e.g., putty.exe—an SSH client; logmein.exe—a remote desktop application; etc.)

Desktop Widgets (e.g. ding.exe—SOUTHWEST AIRLINES advertisement application; weather.exe—an application that provides daily forecasts; etc.)

Email Clients (e.g., outlook.exe—MICROSOFT Outlook application; etc.)

Games

These examples are merely illustrative and are not meant to be all-encompassing. In one embodiment, client 250 is able to perform this classification by use of program attributes and not by maintaining exhaustive lists of every possible piece of application software (a virtually impossible task). For example, certain security software providers and "white list companies" have attempted to compile exhaustive lists of all benign software to use as a security white list (or safe list). However, such an endeavor is too complex to be practical. Accordingly, approaches such as the behavioral/characteristic/heuristic approaches described herein provide an advantageous alternative to these white lists. Various rules 406 may be used (possibly in conjunction with other sets of rules) to determine corrective actions for processes. Accordingly, rules 406 may be inclusive relative to a specific set of one or more application genres (i.e., applicable to processes having application genres in that set) or exclusive relative to a specific set (i.e., applicable to processes having application genres not in that set). Usage of rules 406 is described in further detail in conjunction with FIGS. 13 and 14.

Individual/Group rules 408, in one embodiment, may be used to vary process determinations that might otherwise be made by specifying that certain users/groups of users may need more latitude for the existence of certain processes. In certain embodiments, rules 408 may override rules within other rule modules by specifying that certain individuals or groups be excluded from such rules or that different weights be used to produce scores with such rules. Alternately, rules 408 indicate that certain user/groups (e.g., as identified by the presence of certain IT or development tools) may be a candidate to be excluded from remediation activity. Still further, client 250 can use heuristics to behaviorally classify groups of users into types (e.g., accounting, engineering, support, etc.). This approach is different from that of systems management tools that identify user types by formally linking with an employee database. Instead, client 250 may be used to dynamically identify and classify users as one of a set of user types based upon client system process inventories, usage patterns, network connections, etc. Usage of rules 408 is described in further detail in conjunction with FIGS. 15 and 16.

Installation rules 410, in one embodiment, focus on reducing effects of "image drift." In a computing environment such as an enterprise environment, clients 250 may be configured using a "golden image," a known image starting point, which in one embodiment includes an operating system and a known, core set of applications. This configuration is typically optimized by an entity for those clients and should exhibit performance characteristics that are acceptable to the entity. As time progresses, a user may install additional software, knowingly or unknowingly, and installed software may auto-update and auto-install additional applications, which may slow the performance of a client 250. Image drift is the change of the software installed on a client over time from its initial configuration based on the golden image. As will be described below, in various embodiments, client 250 may track installations of processes to subsequently determine whether processes are part of an initial system configuration (e.g., software included on the golden image). Accordingly, rules 410 may specify weights and actions for processes depending upon whether those processes were installed as part of the initial system configuration. Usage of rules 410 is described in further detail in conjunction with FIGS. 17 and 18.

Browser analysis rules 412 may, in one embodiment, provide additional information usable to analyze browser activity (e.g., beyond a genre classification rule 406 that identifies a process as a browser session—as used herein, a "browser session" refers to the execution of a set of instructions to display the content of an individual webpage. Accordingly, a browser application may initiate a browser session each time a new window (or new tab) is created to display a new webpage. In some embodiments, each browser session may be handled by a separate respective process associated with a respective process identifier PID—the GOOGLE CHROME browser is one example of a browser that handles multiple browser sessions in this manner.). Rules 412 may be used to obtain attributes that aid in decomposing and dynamically classifying activity within a browser. Such classification is particularly useful since many applications (especially enterprise applications) are now browser-based (for example applications hosted "in the cloud" or software as a service—"SaaS") rather than being installed locally. Rules 412 may be used to determine whether a browser session includes the retrieval of content (including both advertising and non-advertising content) that is not aligned with business objectives of the entity establishing rules 342 and 344. Thus, rules 412 may be used to determine whether page content/elements retrieved by a browser correspond to enterprise data center-hosted URL's, as opposed, for example, to content from various common websites (e.g., ESPN.com, FACEBOOK, TWITTER) that may not be critical to the mission of the entity for which policy 340 has been established. The dynamic nature of rules 412 permits, for example, an entity to determine that an employee is downloading a video. Such information may be supplied to server 216. If an email with a link to that video is distributed by the employee to other employees, hundreds of employees in an entity may be downloading the video at the same time. By identifying this browser content as extraneous, a client 250 can supply this information to server 216, which can then, perhaps based on system-wide network activity, establish a new rule stating that the particular bandwidth allocated to that video content is to be throttled or cut off. Thus, a client 250 can selectively and dynamically prioritize higher-value browser sessions over lower-value browser sessions. This approach is different from network optimization products that seek to boost Internet or intranet hosted enterprise web applications. Note that browser analysis rules may be implemented to analyze browser usage at the page level (that is, what specific pages or URL's are visited), the page element level (that is, what elements are present on an accessed page, distinguishing elements by their relative values), or a combination thereof. Usage of rules 412 is described in further detail in conjunction with FIGS. 21 and 22.

Figure 5:
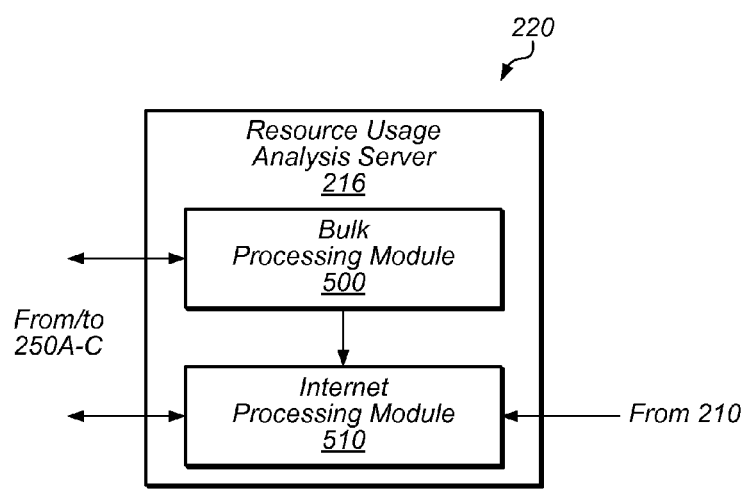
FIG. 5 is a block diagram depicting program instructions executed by a resource usage analysis server according to one embodiment of the present disclosure.

Turning now to FIG. 5, a block diagram of administrative computer system 220 is depicted. As discussed above, modules 110-130 may use information collected from a knowledge base 140 and behavioral analysis 150. As will be described below, in various embodiments, administrative computer system 220 may process information from sources 140 and 150 to generate and update resource usage policy 340.

Although not shown, system 220 may include similar components to computer system 230. Similarly, server 216 may include similar components to client 250, although server 216 may be focused less on the particular processes running on system 220, and more on receiving and aggregating information received from various clients 250 on systems 230.

Bulk processing module 500, in one embodiment, receives process information from clients 250 (e.g., behavioral analysis information). Module 500 may use the aggregation of such information to establish and disseminate new rules/policies to clients 250. Additionally, Internet processing module 510 may receive process information (e.g., knowledge base information) from one or more Internet or other wide-area network sources (e.g., discussion groups) in network 210. In one embodiment, information from client 250 is supplied to module 500, which generates system-wide rules. The output of module 500 is then supplied to module 510, which receives Internet information and uses one or more of the data sources (client, server, Internet) to perform a high-level algorithm that can be used to update resource usage policy 340 for dissemination to all or part of the installed user base.

In one embodiment, program 216 may automatically establish a proposed safe list of processes for an entity. For example, if program 216 determines that a high percentage of computer systems 230 in an entity are running a particular process, that process may be placed on a proposed safe list. A proposed safe list may also be automatically created based at least in part on processes running on computer systems of a select set of users (e.g., users known to exhibit good practices with respect to software maintenance). (In general, any of the various processes described herein can be used to establish this proposed safe list.) Once established, the proposed safe list may be approved and/or altered (e.g., by an individual on behalf of the entity), and then disseminated for inclusion in policy 340.

Figure 6A:
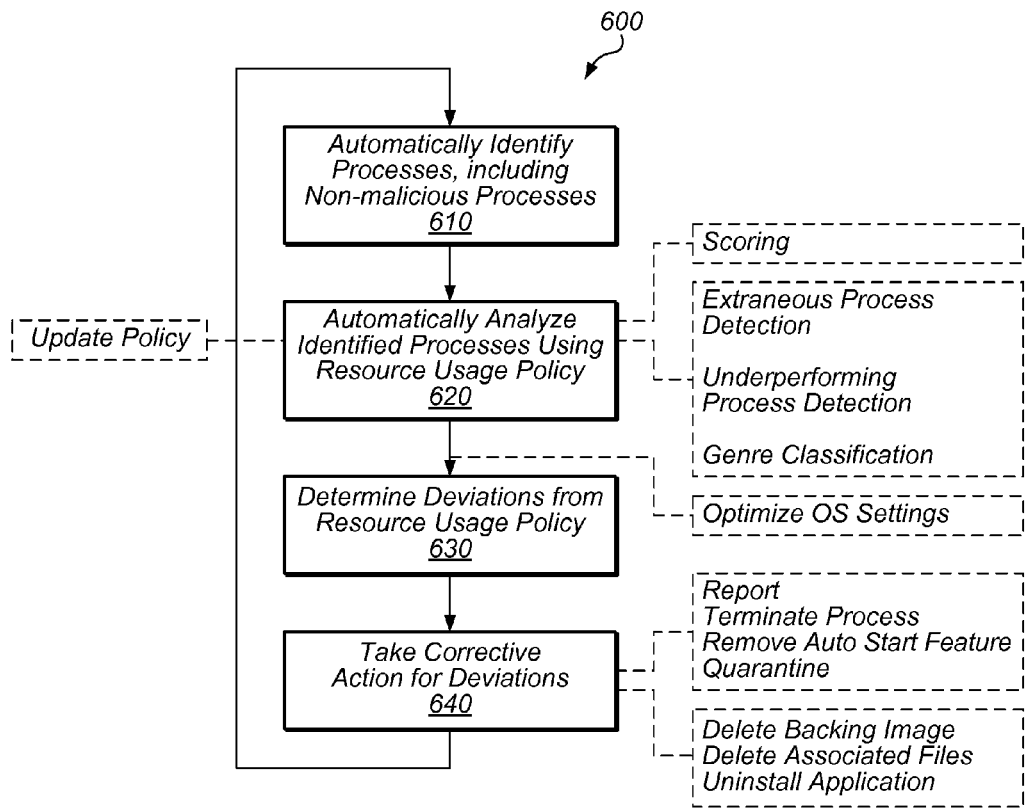
FIG. 6A is a flow chart of one method of process analysis according to one embodiment of the present disclosure.

Turning now to FIG. 6A, a flow chart of a method 600 for performing process identification, classification, and remediation is depicted. As shown, method 600 includes steps 610, 620, 630 and 640. Various elements/steps that may be present in other embodiments are shown in FIG. 6A using dotted boxes.

In step 610, a computer program such as a client 250 automatically identifies processes executing a computer system 230. This identification, as discussed above, may include identification only of non-malicious processes (that is processes that have not been flagged by security software or which are not designed to harm system 230). In other embodiments, step 610 may include identifying all processes, including malicious processes that are executing on system 230. Step 610 may be performed in one embodiment by process identification module 310.

In step 620, client system 250 automatically analyzes the processes identified in step 610 using resource usage policy 340. This step has been described in detail above, and may include computation of one or more scores for each process. For example, for a given process, a first score/value may be computed, where the first score/value is indicative of the importance of the process as established by one or more rules/information within resource usage policy 340. Then, a second score/value may be established, wherein the second score/value indicates the amount of current resource usage of the process on computer system 230. Step 620 can permit an entity to manage/prioritize processes according to a scheme other than a paradigm (commonly employed by operating systems) in which "best efforts" are guaranteed to all processes. Step 620 can thus be used to prioritize certain processes relative to other processes based on a desired resource usage policy of an entity.

In other embodiments the first score/value may have two components, one of which indicates attributes of important processes, while a second component indicates attributes of low-value processes. These two components may, in some embodiments, be used to determine whether a given process is above an importance threshold. In general, any suitable type of scoring algorithm may be used. Thus, weights may be assigned to each observed attributes and summed accordingly. In one embodiment, step 620 may be performed by process analysis and determination module 320 in conjunction with information in resource usage policy 340. As stated above, various types of process identification techniques can be implemented within step 620. For example, step 620 can include extraneous process detection, underperforming or overperforming process detection, genre classification, etc.

In step 630, client 250 determines whether one or more of the analyzed processes observed in step 620 deviates from resource usage policy 340. (The term "deviate" implies both a determination of a violation of policy 340, and/or some measurement of difference from a set of criteria.) In one embodiment, step 630 is performed by process analysis and determination module 320. As described above, the determination in step 630 may be performed by comparing or analyzing a first score/value indicating process importance with a second score/value indicating resource consumption. Thus, step 630 may, in one embodiment, allow an entity to determine whether a currently running process's value justifies its current resource consumption (a value/cost reconciliation).

In step 640, in one embodiment, client 250 takes corrective actions for processes determined to deviate from resource usage policy 340. Various types of corrective actions that are possible have been described above, and have also been listed within FIG. 6A. Note that, in some instances, a "violation" of resource usage policy 340 may include a particular process not currently being allocated sufficient computing resources. Thus, step 640 may include, in one embodiment, a corrective action that increases the system resources dedicated to a particular process. In one embodiment, step 640 is performed by corrective action module 330. FIG. 6A also illustrates that method 600 is iterative; accordingly, after corrective actions are taken in one embodiment, method 600 may repeat.

FIG. 6A also illustrates other features that may be included in various embodiments. For example, in addition to automatically analyzing identified processes using a resource usage policy, client 250 may dynamically optimize certain OS settings (e.g., dynamically updating a system registry). Additionally, resource usage policy 340 may be dynamically updated, in response to information from server 216 or an Internet source and network 210.

Figure 6B:
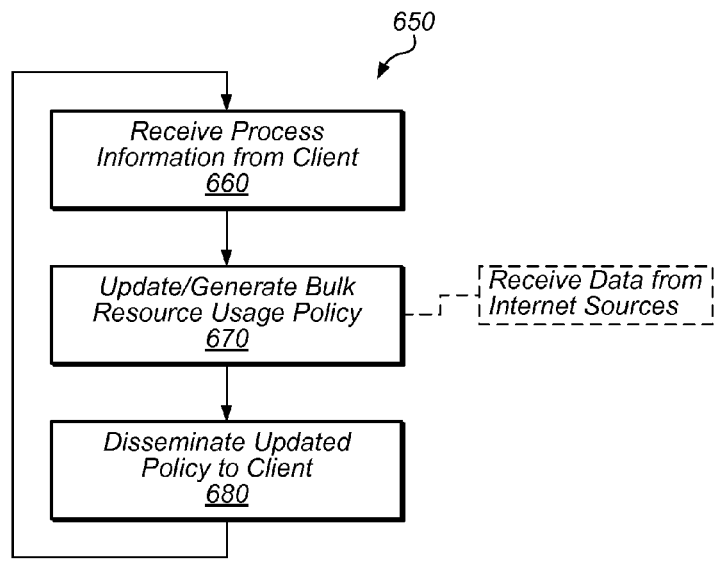
FIG. 6B is a flow chart of a method executed by a resource usage analysis server according to one embodiment of the present disclosure.

Turning now to FIG. 6B, a flow chart of a method 650 is depicted. As shown, method 650 includes steps 660, 670 and 680. As has been described with reference to FIG. 6B, method 650 is performed in one embodiment, by resource usage analysis server 216 executing on administrative computer system 220.

In step 660, server 216 receives process information from client system 250. This information may include results of process identification and classification performed by various client programs 250. In one embodiment step 660 is performed by bulk processing module 500. Next, in step 670, server 216 performs an update or generation of a bulk resource usage policy. Thus, based on system-wide activity, module 500 may create or update rules that are to be disseminated to one or more systems within an entity. In one embodiment, step 670 is also performed by bulk processing module 500. Note that, as shown in FIG. 6B, step 670 may include the use of data received from Internet or other wide-area network sources (which may be performed by module 510 in some embodiments). Thus, the client-level, server-level, and Internet-level approaches may be combined and orchestrated within administrative computer system 220. Next, in step 680, any updates to resource usage policy may be disseminated to systems 230. In one embodiment, method 650 may repeat as shown.

Various embodiments of systems and methods for automatically analyzing processes are contemplated based on the preceding description, including, but not limited to, the embodiments listed below.

1. A method, comprising:
 a computer system of an entity executing a resource usage agent program, wherein the executing includes:
  identifying a plurality of processes running on the computer system; and
  automatically prioritizing one or more of the identified processes according to a set of information defining a resource usage policy of the entity.

2. A method, comprising:
 a computer system of an entity executing a resource usage agent program, wherein the executing includes:
  determining a respective indication of importance for a plurality of processes running on the computer system, wherein importance is determined relative to a resource usage policy of the entity; and
  controlling computer resource usage of the plurality of processes according to the determined importance scores for the processes.

3. The method of embodiment 2, wherein the plurality of processes includes one or more non-malicious processes, and wherein the controlling prioritizes processes with a relatively higher importance score.

4. The method of embodiment 2, wherein the controlling is performed according to a resource consumption of the plurality of processes.

5. A method, comprising:
 automatically controlling resource usage of a plurality of processes operating on a computer system of an entity according to a non-best-efforts paradigm that prioritizes processes according to a resource usage policy of the entity.

6. A method, comprising:
 a computer system of an entity categorizing a plurality of processes executing on the computer system;
 the computer system terminating those ones of the plurality of processes categorized as being extraneous to the entity;
 the computer system boosting performance of non-extraneous ones of the plurality of processes categorized as satisfying a resource usage policy of the entity; and
 the computer system restricting performance of non-extraneous ones of the plurality of processes categorized as deviating from the resource usage policy of the entity.

7. The method of embodiment 6, further comprising:
 automatically optimizing settings and parameters relating to an operating system of the computer system.

The embodiments described above may be combined in any suitable manner including being combined with embodiments described in other sections. Furthermore, non-transitory computer readable media that include program instructions executable to implement any of the methods described in this section are also contemplated. Additionally, computer systems or computing devices that are configured to implement any of the disclosed methods are also contemplated. Such methods, computer-readable media, and systems may be implemented at a client level or a server level (either within an entity or external to multiple entities, as with a regulatory body).

Extraneous Process Analysis

Turning now to FIG. 7, one embodiment of an extraneous process analysis module 710 is depicted. As discussed above, an "extraneous" process is a process that satisfies a set of extraneous process criteria. This set of criteria may be established for a particular entity (e.g., a company) and/or a particular client computer system according to the needs or mission of that entity. In the illustrated embodiment, module 710 is executable to identify such processes. As shown, module 710 includes extraneous scoring module 712 and non-extraneous scoring module 716. Module 710 may be included within process analysis and determination module 320, which also includes a determination module 720.

Extraneous process analysis module 710, in one embodiment, is executable to identify extraneous processes on a system 230 from process information 702 received from module 310 (in other embodiments, information 702 may be received from other sources). Information 702 may include any of a variety of information about a process including, in some embodiments, whether the process is present on a corporate-standard image (e.g., golden image); has a registry entry (e.g., a registry autostart key) that causes an operating system to load the process during a startup sequence (as opposed to being started by a user or another process); has an icon in an operating-system menu that displays executing background processes (e.g., a system tray icon); has an entry in an operating-system installation assistant (e.g., add/remove programs feature of the operating system); is running HTTP service traffic, is launching execution of code, is spawning new processes, is calling particular APIs (e.g., the Windows Internet (WinINet) application programming interface (API) to interact with FTP, and HTTP protocols to access Internet resources, or the DeviceIoControl function for sending control codes to a device driver), is accessing particular DLLs (for example the WINDOWS winsock.dll for communicating over network sockets), is produced by a particular vendor, has a particular path (e.g., being stored in an operating-system directory), has an entry in an operating-system installation assistant (e.g., add/remove programs feature of the operating system); is indicated by the operating system as being seldom used; has an installation that relies on input from a user (as opposed to automatic installation such as an update of an application); is installed before a particular date; is associated with a vendor that has a reputation of producing software with a marginal value (e.g., a known vendor of adware software); uses data files that are known to have a non-business value; is typically prevalent in an enterprise setting (e.g., as specified by a binary value indicating low- or high-enterprise prevalence); is not a current version; has a particular resource consumption profile; increases boot time by more than a particular amount; does not receive input (or receives little input) from a user interface; has no user interface interaction; etc. These attributes may be determined by collecting information from any of a variety of sources including accessing files on system 230 (e.g., directory files, registry files, etc.), an enterprise server database (e.g., containing information on the attributes of processes seen across multiple client systems 230) on server 220, etc.

In various embodiments, module 710 analyzes this information 702 by testing it against weight rules 704 to produce one or more scores (e.g., an extraneous score 714 and a non-extraneous score 718, in the illustrated embodiment) indicative of whether a process is likely extraneous. In one embodiment, module 710 determines a score by using the formula $C_1*D_1+C_2*D_2+C_3*D_3+ \ldots +C_N*D_N$, where $C_i$ is indicative of whether a process has an attribute (e.g., is a one or a zero) and $D_i$ is a weight for having that attribute. In some embodiments, weights Di are determined by randomly generating several sets of weights (a set being $D_1$-$D_N$ and also referred to, herein, as a genome) and selecting a particular one or more sets based on the number of false positives and false negatives produced by using those sets. In one embodiment, multiple selected sets (e.g., the top performers) may be combined to produce the set used by rules 704.

Extraneous scoring module 712, in one embodiment, is executable to determine an extraneous score 714, which is indicative of the likelihood that a process is extraneous. To generate a score 714, module 712, in various embodiments, tests a variety of process attributes (which can number in the thousands, in some instances) by using rules 704 and summing results of the tests. In some embodiments, module 712 uses rules 704 that attempt to identify known extraneous processes. These rules 704 may specify scores for processes that have identifiable features such as a process's executable name, the size of the executable, or some other unique identifier. In some instances, these rules may be generated using information collected from knowledge base 140—e.g., based on a black list of commonly known extraneous processes. In other embodiments, module 712 may use rules 704 that attempt to identify a process as extraneous based on its behavioral attributes. In some instance, these rules 704 may be able to identify processes that are not previously known to be extraneous. In some embodiments, these rules 704 may indicate that a process is more likely extraneous if that process has particular attributes such as those described above. In various embodiments, various attributes may be weighted differently based on the likelihood that those attributes are associated with extraneous processes. In some instances, these rules 704 may be generated based on behavioral analysis 150.

Non-extraneous scoring module 716, in one embodiment, is executable to determine the non-extraneous score 718, which is indicative of the likelihood that a process is important and unlikely to be extraneous. To generate a score 718, module 716, in various embodiments, tests a variety of process attributes by using rules 704 and summing results of the tests. In some embodiments, module 716 may use rules 704 that attempt to identify known non-extraneous processes. In some embodiments, these processes may be identified by a customer—e.g., processes of important office suites, tools, from a particular enterprise share drive, etc. In other embodiments, module 716 may use rules 704 that identify a process as non-extraneous based on its behavioral attributes. Such rules 704 may indicate that a process is non-extraneous based on any of variety of attributes. In some embodiments, module 716 may test attributes similar to those tested by module 712 (e.g., using similar or different weights); in other embodiments, module 716 tests different attributes.

One example of scores 714 and 718 generated for the executable igfxtray.exe (a user interface program for the INTEL chipset i810) is as follows:
Extraneous Score=105
('HasRegAutoStart', '15')//Process has an autostart registry key.
('InSystem32', '20')//Process is stored in an operating system folder.
('IsAutostartChild', '30')//Process is a child of an auto start process.
('IsLikelyTrayIcon', '20')//Process has a system tray icon.
('IsOnPath', '10')//Process is in an operating system execution path, which allows a user to load a process by typing its name in a command prompt.
('IsTrayName', '10')//Process has the word "tray" in its name, which indicates that it is likely present in the system tray.
Non-Extraneous Score=55
('FileCatalogSigned', '10')//Process has a signed file catalog
('HasFileDescription', '5')//Process has a file description
('IsHighImports', '30')//Process imports support for a higher-than-average number of APIs and makes a higher-than-average number of API calls.
('UsesOLE32', '10')//Process uses OLE32.dll.

In this example, an extraneous score (shown as 105) is generated for the process igfxtray.exe by applying a set of rules 704 that dictate weights (shown on the right) for having particular attributes (shown on the left). In this embodiment, the weights are summed to produce the total extraneous score. A non-extraneous score (shown as 55) is generated in a similar manner. In one embodiment, a process may be determined to be extraneous if, for example, it has an extraneous score above a threshold (e.g., a value of 100).

Determination module 720, in one embodiment, is executable to determine one or more corrective actions 722 based on corrective action rules 706. As noted above, corrective action rules may dictate actions to be taken based on scores or responsive to a process having specific features. Corrective actions 722 for an extraneous process may include any of a variety of actions such as terminating a process, removing a process's ability to load during a startup sequence (e.g., by modifying a system registry key, startup folder, etc.), quarantining the process image on a disk (e.g., by taking it out of path, changing the extension, renaming it, placing it in an encrypted container, etc.), deleting of backing image, disabling the image in memory, deleting associated files, and/or uninstalling the application.

In various embodiments, determination module 720 treats a process as likely being extraneous if an extraneous score 714 indicates that a process has attributes of extraneous processes and non-extraneous score 718 indicates that the process does not have attributes of non-extraneous processes. For example, in some embodiments, module 720 may compare score 714 with a particular extraneous threshold and score 718 with a particular non-extraneous threshold. If score 714 exceeds the extraneous threshold and score 718 does not exceed the non-extraneous threshold, module 720 may treat that process as extraneous. In some instances, treating processes in this manner may reduce the number of false positives, which would cause corrective actions to be taken for non-extraneous processes. In another embodiment, determination module 720 determines whether a process is likely extraneous based on a comparison of extraneous score 714 and non-extraneous score 718. If the extraneous score 714 is greater than non-extraneous score 718, module 720 may treat the process as an extraneous process. If, on the other hand, score 718 is greater, module 720 may treat the process as a non-extraneous process. In some embodiments, module 720 may determine whether to take more aggressive actions based on the severity of scores 714 and 718. For example, if scores 714 and 718 indicate a strong likelihood that a process is extraneous, module 720 may cause that process to not only be terminated but also have its load points removed.

Turning now to FIG. 8, a flow diagram of a method 800 for analyzing extraneous processes is depicted. Method 800 is one embodiment of a method that may be performed using a computer program executing on a computer system such as client 250 executing on computer system 230. (A similar method is also contemplated, which includes portions of method 800 being performed by a server system such as server system 220.) In many instances, performance of method 800 can improve resource allocation on a computer system.

In step 810, client system 230 (e.g., using module 310) identifies processes that it is executing. In various embodiments, this identifying may include collecting information about processes such as information 702 described above. In some embodiments, step 810 may be performed in a similar manner as step 610.

In step 820, client system 230 (e.g., using modules 710 and 720) determines whether the plurality of executing processes includes one or more extraneous processes. As discussed above, in various embodiments, client system 230 may determine an extraneous score and a non-extraneous using rules 704. Client system 230 may then compare the scores with threshold values specified by rules 706 in usage policy 340 to determine whether processes are extraneous. More generally, client system 230 may use one or both of the scores to determine whether a given process is associated with a computer resource usage that is desired by an entity (e.g., is aligned with a business goal of an entity), or conversely whether the given process is not associated with a computer resource usage desired by the entity (and thus extraneous). In some embodiments, client system 230 may classify a process as extraneous in response to not being able to validate that the process is performing an activity approved by the entity. In one embodiment, step 820, unlike a security software program, may classify various non-malicious processes as extraneous, including agents that run periodically on clients to search for updates from an Internet server. Examples of non-malicious, extraneous processes include hardware-helper applications (e.g., ituneshelper.exe, which assists ITUNES in syncing an IPOD; igfxtray.exe, which provides quick access to a control panel for the INTEL i810 graphics processor), debug-assistant applications (e.g. mdm.exe—a machine debug manager for WINDOWS NT, which provides support for application debugging), etc.

In step 830, client system 230 (e.g., using module 320) takes a corrective action with respect to the one or more extraneous processes. As discussed above, this action may include terminating a process and, in some embodiments, removing its load point by removing its autostart ability, quarantining the process image on a disk, deleting of backing image, disabling the image in memory, deleting associated files, uninstalling the application, and the like.

Various embodiments of systems and methods for analyzing extraneous processes are contemplated based on the preceding description, including, but not limited to, the embodiments listed below.

1. A method, comprising:
   a computer system identifying a plurality of non-malicious processes;
   the computer system determining whether the plurality of non-malicious processes includes one or more extraneous processes; and
   the computer system taking a corrective action with respect to the one or more extraneous processes.

2. The method of embodiment 1, wherein the determining includes computing a first score indicative of a process being extraneous and a different second score indicative of a process being non-extraneous.

3. The method of embodiment 1, wherein the determining includes reading a file that stores directory information.

4. The method of embodiment 1, wherein the determining includes collecting information by making one or more application programming interface (API) calls to an operating system.

5. The method of embodiment 1, wherein the determining includes accessing an enterprise server database storing information on attributes of processes executing on a plurality of client systems.

6. The method of embodiment 1, wherein the determining includes determining a manner in which a process was initiated.

7. The method of embodiment 6, wherein the manner includes being initiated by another process, being manually initiated by a user, or being initiated by an operating system during a startup sequence.

8. The method of embodiment 1, wherein the one or more extraneous processes are non-malicious processes.

9. The method of embodiment 1, wherein the determining includes determining one or more of the following process attributes: whether a process is indicated in a taskbar, whether a process is indicated in a system tray, whether a process has an add/remove programs entry, whether a process is running HTTP traffic, whether a process is spawning new processes, whether a process is controlling a device driver.

10. The method of embodiment 1, wherein the corrective action includes one or more of the following actions: generate a report, process termination, removal of autostart method, quarantine of image process on disk, deletion of backup image, disabling of an image in memory, deletion of files, uninstallation of an application.

11. The method of embodiment 1, further comprises:
   generating a plurality of genomes having different scoring weights;
   selecting one or more genomes based on produced false positives or produced false negatives; and
   using the selected one or more genomes to generate one or more scores indicative of whether a process is extraneous.

12. A method, comprising:
   receiving, at a computer system executing a resource usage analysis control program, process information from a plurality of resource usage analysis client programs executing on a plurality of client computer systems of an entity, wherein the received process information identifies the respective set of processes running on ones of the plurality of client computer systems;
   automatically establishing, from the received process information, a proposed safe list, wherein the proposed safe list identifies a plurality of processes that are to be classified as safe and thus permitted to execute on the plurality of client computer systems, and wherein the proposed safe list is providable to ones of the plurality of client computer systems to facilitate classifying processes on the provided safe list as safe processes.

13. The method of embodiment 12, wherein the proposed safe list is established based at least in part on process prevalence across computer systems of the entity, the method further comprising:
   receiving approval of the proposed safe list from the entity; and
   providing the approved safe list to one or more of the plurality of client computer systems, wherein the provided safe list is usable by the resource usage analysis client programs to exclude processes on the provided safe list from further analysis relative to an entity resource usage policy.

14. The method of embodiment 12, wherein the establishing is based in part on identifying processes running on client computer systems of a select group users within the entity.

15. A method, comprising:

a computer system of an entity identifying a non-malicious process executing on the computer system;

the computer system computing an extraneous score for the non-malicious process, wherein the extraneous score is indicative of a likelihood that the non-malicious process is not related to a computer resource usage desired by the entity;

the computer system computing a non-extraneous score for the non-malicious process wherein the non-extraneous score is indicative of a likelihood that the non-malicious process is related to a computer resource usage desired by the entity;

the computer system classifying the non-malicious process as extraneous based on either or both the of the extraneous and non-extraneous scores; and the computer system taking a corrective action with respect to the classified extraneous process.

16. The method of embodiment 15, wherein the non-malicious process is an update agent for an application loaded on the computer system.

17. The method of embodiment 15, wherein the non-malicious process is a hardware-helper application for hardware on the computer system.

18. The method of embodiment 15, wherein the non-malicious process is a debug-assistant application.

19. A method, comprising:

a computer system analyzing a process running on a computer system of an entity to determine whether the process is performing an activity approved by the entity;

the computer system classifying the process as extraneous in response to not being able to validate that the process is performing an activity approved by the entity; and the computer system taking a corrective action with respect to the extraneous process.

The embodiments described above may be combined in any suitable manner including being combined with embodiments described in other sections. Furthermore, non-transitory computer readable media that include program instructions executable to implement any of the methods described in this section are also contemplated. Additionally, computer systems or computing devices that are configured to implement any of the disclosed methods are also contemplated. Such methods, computer-readable media, and systems may be implemented at a client level or a server level (either within an entity or external to multiple entities, as with a regulatory body).

Process Performance Analysis

Figure 9:
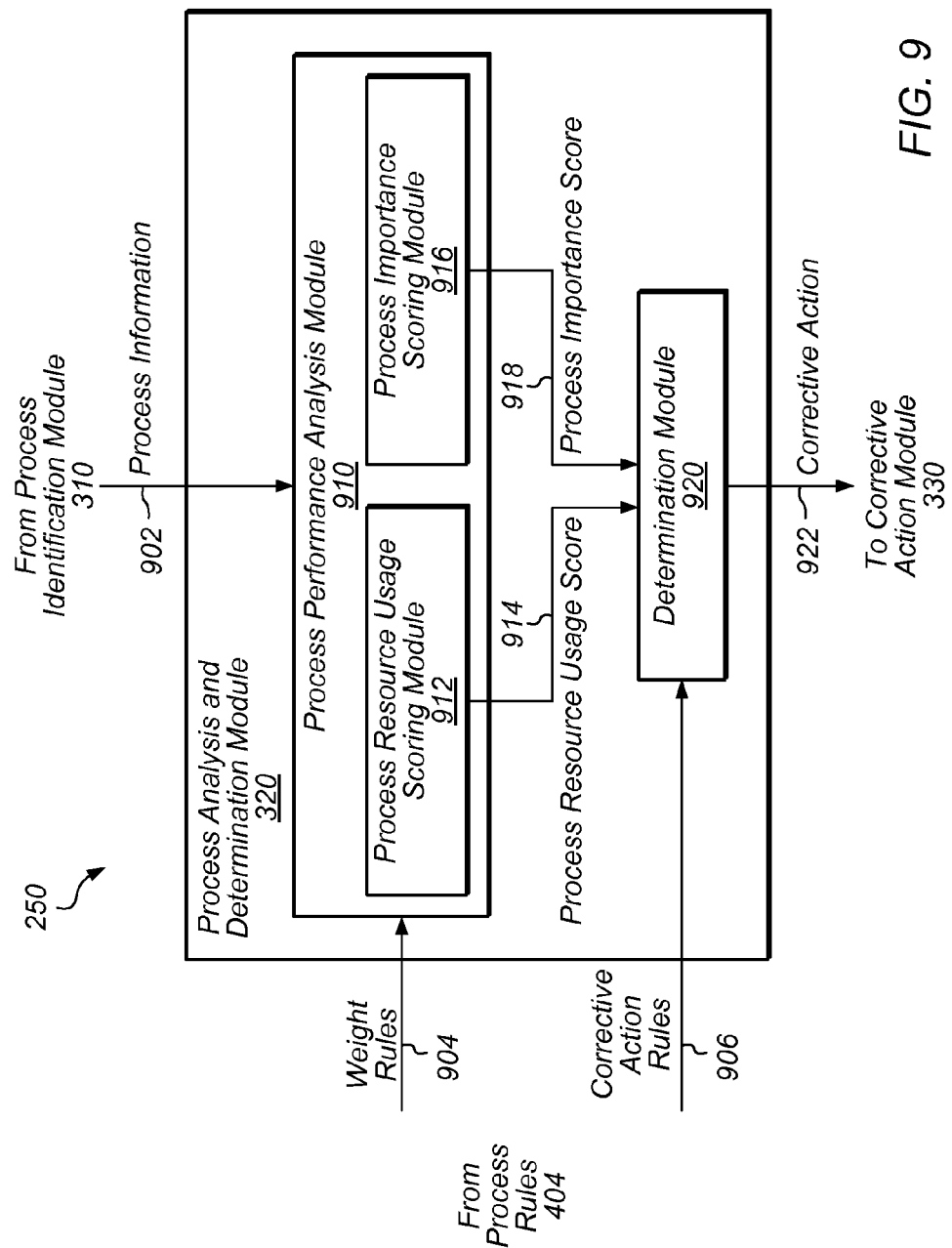
FIG. 9 is a block diagram depicting a process performance analysis module according to one embodiment of the present disclosure.

Turning now to FIG. 9, one embodiment of a process performance analysis module 910 is depicted. As discussed above, a computer system may include processes that cannot be terminated outright (e.g., because they have some necessary function) yet provide little present value. A computer system may also include processes that are valuable but are currently underperforming (i.e., not receiving adequate resources of the computer). In the illustrated embodiment, module 910 is executable to identify such processes. As shown, module 910 includes process resource usage scoring module 912 and process importance scoring module 916. Module 910 is included within process analysis and determination module 320 in one embodiment, which also includes a determination module 920.

Process performance analysis module 910, in one embodiment, is executable to identify underperforming processes from process information 902 received from identification module 310 (in other embodiments, information 902 may be received from other sources). Information 902 may include any of a variety of information about a process, including the information described below. In various embodiments, module 910 analyzes this information 902 by using weight rules 904 to produce one or more scores (e.g., process resource usage score 914 and process importance score 918) indicative of whether a process is underperforming. In some embodiments, weights for these scores may be determined by generating and selecting genomes (as described above). As discussed above, in some embodiments, module 910 may use different sets of rules 904 (e.g., rules 904 with different weights) depending upon the state of a system 230, such as whether client 250 is idling, executing background processes, or executing active processes. Thus, a process having a particular resource consumption may be identified as underperforming, for example, if it is tested using rules 904 for an idle state, but may be identified as not underperforming if it is tested using rules 904 for an executing-active-processes state.

Process resource usage scoring module 912, in the illustrated embodiment, is executable to determine a process resource usage score 914. In some embodiments, score 914 is indicative of a process's current resource consumption. To generate such a score 914, module 912 may use rules 904 that test various attributes associated with current usage and sum their results. In various embodiments, such rules 904 specify scores for various behavioral attributes such as a process's processing usage including central processing unit (CPU) usage, specific core usage within a CPU, graphic processing unit (GPU) usage; its memory usage including memory (e.g., RAM) consumption, available memory capacity, page-fault rates; its network usage including bandwidth demand, socket connectivity; its storage usage including bandwidth demand, page-file activity, etc; its system/kernel usage including user- and kernel-mode handle counts; etc. In other embodiments, module 914 may use rules 904 that attempt to identify processes that have known resource usages. For example, such rules 904 may specify that a process be given a particular score 914 if it has an executable name (or some other unique identifier) of a known process.

In other embodiments, score 914 is indicative of a process's potential future resource consumption. To generate such a score in one embodiment, module 912 may use rules 904 that test various attributes indicative of future usage and sum their results. In various embodiments, these rules 904 specify scores for various behavioral attributes such as particular API calls that may be made by a process, the size of files that may be accessed by a process, particular DLLs known to be accessed by a process, particular functionality supported by a process, past resource consumption information (such as described above) including historical trends and repetitive patterns, etc. Accordingly, even if a process is not currently using undue system resources (e.g., too much processor time or memory space), module 912 may nevertheless identify the process as having significant potential future consumption—for example, based on the number of related processes, past usage patterns, etc. Such information may be used to take a corrective action with respect to such a process before a resource usage issue actually occurs.

Process importance scoring module 916, in one embodiment, is executable to determine a process importance score 918 indicative of the likelihood that a process is important. In some embodiments, module 916 may use rules 904 that attempt to identify known important processes—e.g., those indicated as being important by an entity. In other embodiments, module 916 may use rules 904 that attempt to identify a process as important based on behavioral attributes such as described above. In some embodiments, module 916 may use rules that have different weights depending upon the state of system 230 (such as described above). Accordingly, such rules 904 may specify, in one embodiment, a better (e.g., higher) importance score 918 for a process (e.g., an antivirus program, backup program, search-indexing program, etc.) if a system 230 is idle than a score 918 if the system 230 is active.

In some embodiments, module 916 may identify importance of underperforming processes based on process attributes that are more dynamic (i.e., attributes that are more subject to change over time) than those used by module 716 to identify importance of extraneous processes. The importance of an extraneous process does not typically change since it is either extraneous or not. In various embodiments, a process that is underperforming is classified as non-extraneous, but its importance may fluctuate more over time depending upon current system state, such as whether a user is present, whether a system scan is overdue, whether the system is lightly or heavily loaded, etc. This importance may also vary with the current resource behavior of the process being analyzed and, in some embodiments, its behavior relative to other active processes' resource behaviors.

Determination module 920, in one embodiment, is executable to determine one or more corrective actions 922 based on rules 906. (As noted above, corrective action rules may dictate actions to be taken based on scores or responsive to a process having specific features.) In various embodiments, module 920 determines different corrective actions for a process dependent upon its resource usage (as indicated by score 914) and importance (as indicated by score 918). In one embodiment, if a process is not important (e.g., as indicated by score 918 not satisfying a particular threshold or thresholds), module 920 may determine to reduce its performance regardless of its resource usage, by lowering its process priority, trimming its allocated memory, restricting I/O for that process, etc. In some instances, these corrective actions may be performed for background processes such as realupdate-.exe described above. In one embodiment, if a process has some importance in other states of system 230 but not the present state (e.g., when system 230 is idle and no user activity is detected), module 920 may determine to idle or alternatively to accelerate the process until the state of system 230 changes. In some instances, this action may be performed for backup programs, search-index programs, antivirus programs, etc. In one embodiment, if a process is important and has a higher-than-average resource usage, module 920 may determine to improve its performance by boosting its priority, increasing its allocated memory, etc. In some instances, module 920 may also determine to not take any corrective actions for a process.

An exemplary list of possible corrective actions for underperforming processes having particular features is presented below:

Example 1

Exclusions: Do Not Modify

Corrective Action: Do Not Touch
Until: Forever
When Process: IsAntiDebug (i.e., is designed to prevent a debugger from debugging this process); InWindowsFileProtection (i.e., has files protected by an operating system); IsSystemProcess (i.e., is identified as a system process) AND InSystem32 (i.e., is included with a file path of the operating system).

In example 1, no corrective action is taken if a process has the above-noted actions. Such a process is likely an operating system related process.

Example 2

Boost AV/Backup when Idle

Corrective Action: Boost Process Priority
Until: UserActivityDetected
When Process: IsAntiVirusVendor (i.e., has a vendor such as SYMANTEC, MCAFEE, etc.) AND NoActiveUser (i.e., no user is presently interacting with the computer system; the system is idle); IsBackup (i.e., has a backup-software application genre) AND NoActiveUser; IsSearchIndexer (i.e., has a search-indexer application genre) AND NoActiveUser
In example 2, a process is given additional resources if it has one of the above-noted application genres and the computer system is idle.

Example 3

Accelerate Active Applications

Do Action: Boost Process Priority
Until: NOT IsActiveProcess (i.e., is not interacting with a user)
When Process: IsOfficeSuite (i.e., has an office-suite application genre) AND IsActiveProcess (i.e., is interacting with a user); IsHttpProtocolHandler (i.e., handles HTTP traffic) AND IsActiveProcess
In example 3, a process is given additional resources while it is interacting with a user if it has the above-noted features.

Example 4

Background Underperforming Applications

Do Action: Lower Process Priority; Trim Memory; Restrict I/O
Until: NoActiveUser
When Process: IsAntiVirusVendor AND NOT UserActivityDetected (i.e., a user is not interacting with a computer system); IsBackup AND NOT UserActivityDetected; IsSearchIndexer AND NOT UserActivityDetected
In example 4, the processes given more resources in example 2 are now given fewer resources when user activity is detected.

Figure 10:
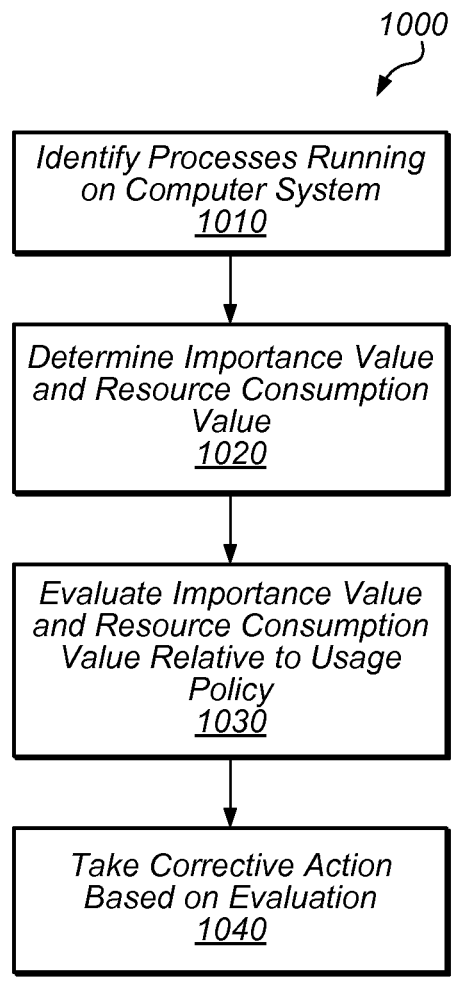
FIG. 10 is a flow chart of a method for analyzing process performance according to one embodiment of the present disclosure.

Turning now to FIG. 10, a flow diagram of a method 1000 for analyzing process performance is depicted. Method 1000 is one embodiment of a method that may be performed using a computer program executing on a computer system such as client 250 executing on computer system 230. (A similar method is also contemplated, which includes portions of method 1000 being performed by a server system such as server system 220.) In many instances, performance of method 1000 can improve resource allocation on a computer system.

In step 1010, client system 230 identifies processes that it is running. In various embodiments, step 1010 may include collecting any of variety of information about processes such as information described above. In some embodiments, step 1010 may be performed in a similar manner as steps 610 and 810.

In step 1020, client system 230 (e.g., using module 910) determines an importance value (e.g., score 918) indicative of an importance of an identified process and a resource consumption value (e.g., score 914) indicative of a resource consumption of the identified process. Client system 230 may generate the importance value using any of the techniques described above. Accordingly, in one embodiment, the importance value is determined based on whether the identified process is relevant to a current activity of a user of the computer system (e.g., does the process relate to a spreadsheet on which the user is currently working?) In various embodiments, the importance value is determined based on indications of whether the identified process is performing activities, e.g., approved by the entity or a regulatory body. Client system 230 may also generate the resource consumption value using any of the techniques described above. As noted above, the resource consumption value, in one embodiment, is indicative of a process's potential future resource consumption.

In step 1030, client system 230 (e.g., using module 920) evaluates the importance value and the resource consumption value relative to a usage policy. As discussed above, in various embodiments, client system 230 evaluates these values by comparing them with threshold values specified by a usage policy established by an entity to determine whether a process's resource consumption is justified relative to its importance to the entity. As has been described above, this evaluation may determine violations of a usage policy, deviations from the usage policy, etc.

In step 1040, client system 230 (e.g., using module 330) takes a corrective action with respect to the identified process based on the evaluating. This action may include any of the actions described above, including temporarily suspending execution of a process, reducing resource consumption of a process, allocating additional resources to a process, modifying priorities of a process (e.g. processor, memory, or I/O priorities) etc.

Various embodiments of systems and methods for analyzing process performance are contemplated based on the preceding description, including, but not limited to, the embodiments listed below.

1. A method, comprising:
   a computer system of an entity determining, for a process running on the computer system, an importance value and a resource consumption value, wherein the importance value is indicative of an importance of the process to the entity, and wherein the resource consumption value is indicative of a resource consumption of the process;
   the computer system evaluating the importance value and the resource consumption value relative to a usage policy; and
   the computer system taking a corrective action with respect to the process based on the evaluating.
2. The method of embodiment 1, wherein the importance value is determined based on whether the process relates to a current activity of a user of the computer system.
3. The method of embodiment 1, wherein the importance value is determined based on indications of whether the process relates to an activity approved by the entity.
4. The method of embodiment 1, wherein the importance value is determined based on indications of whether the process relates to an application identified as important to the entity within the usage policy.
5. The method of embodiment 1, wherein the importance value is determined based on indications of whether the identified process is performing activities approved by a regulatory body distinct from the entity.
6. The method of embodiment 1, wherein determining the resource consumption value includes analyzing one or more of the following types of usage:

processing usage, including central processing unit (CPU) usage, specific core usage within a CPU, graphic processing unit (GPU) usage;

memory usage, including memory consumption, available memory capacity, page-fault rates;

network usage, including bandwidth demand, socket connectivity;

storage usage, including bandwidth demand, page-file activity;

kernel usage, including user- and kernel-mode handle counts.
7. The method of embodiment 1, wherein the corrective action includes automatically enhancing the performance of a selected non-malicious process.
8. The method of embodiment 7, wherein the enhancing includes elevating the execution priority of the selected process, elevating the memory allocation of the selected process, or elevating the share of network or storage bandwidth of the selected process.
9. The method of embodiment 1, wherein the evaluating includes determining that the identified process is underperforming.
10. The method of embodiment 1, wherein the usage policy is received from a regulatory body.
11. The method of embodiment 1, wherein the evaluating includes comparing the importance value and a resource consumption value with threshold values specified by the usage policy.
12. A method, comprising:
   a resource usage analysis program analyzing a plurality of processes running on a computer system to determine a set of processes that satisfy a set of importance criteria; and
   the resource usage analysis program determining, only for the set of processes, whether to adjust an amount of computing resources on the computer system that are available for use by the set of processes, wherein the determining is based on a usage policy of an entity.

Various embodiments of systems and methods for analyzing extraneous processes and analyzing process performance are contemplated based on the preceding descriptions, including, but not limited to, the embodiments listed below.

1. A method, comprising:
   a resource usage analysis program identifying a plurality of processes running on a computer system, including a plurality of non-malicious processes;
   the resource usage analysis program analyzing at least two of the identified plurality of non-malicious processes, wherein the analyzing is performed using a set of information defining a resource usage policy;
   the resource usage analysis program determining, based on at least two attributes, that at least one of the analyzed non-malicious processes deviates from the resource usage policy; and
   the resource usage analysis program taking a corrective action with respect to at least one of the non-malicious processes determined to be deviating from the resource usage policy.
2. The method of embodiment 1, wherein the computer system is one of a plurality of computer systems of an entity, and wherein the analyzing includes removing processes from further analysis based on a safe list established by the entity.
3. The method of embodiment 1, further comprising sending results of the analyzing to a resource usage analysis server.
4. The method of embodiment 1, further comprising receiving updates to the resource usage policy from a resource usage analysis server.

5. The method of embodiment 4, wherein the computer system is a computer system of an entity, and wherein the updates include updates determined by the resource usage analysis server using process analysis results from one or more other computer systems of the entity.

6. The method of embodiment 1, wherein the computer system is a computer system of an entity, and wherein the analyzing is based on process information obtained from a resource usage analysis server configured to use process analysis results from one or more other computer systems of the entity.

7. The method of embodiment 1, wherein the analyzing is based on process information obtained from one or more Internet sources.

8. The method of embodiment 1, wherein the corrective action includes causing an analysis to be made by a resource usage analysis server based on process information received from a plurality of other computer systems, and wherein the analysis includes statistics relating to processes being executed within a plurality of users within a geographically distributed domain.

9. The method of embodiment 1, wherein the analyzing is based at least in part on dynamic process attributes.

10. The method of embodiment 1, wherein the plurality of non-malicious processes have not been identified as being malicious by a security program.

11. The method of embodiment 1, wherein the analyzing includes determining a respective score for each of the identified non-malicious processes.

12. The method of embodiment 11, wherein each respective score includes a first component indicative of the presence of attributes indicating that a process that does not deviate from the resource usage policy, and wherein each respective score includes a second component indicative of the presence of attributes indicating that a process does deviate from the resource usage policy, and wherein the determining that at least one of the analyzed non-malicious processes deviates from the resource usage policy is based on one or both of the respective first and second score components.

13. A method, comprising:

a resource usage analysis program classifying one or more of a plurality of non-malicious processes running on a computer system as extraneous processes;

the resource usage analysis program causing the extraneous non-malicious processes to be terminated from running on the computer system;

the resource usage analysis program determining, for one or more of the processes not determined to be extraneous, whether to adjust performance of those processes on the computer system.

Various embodiments of server and client systems and methods for such systems are contemplated based on the preceding descriptions, including, but not limited to, the embodiments listed below.

1. A method, comprising:

receiving, at a computer system executing a resource usage analysis control program, process information from a plurality of resource usage analysis client programs executing on a plurality of client computer systems of an entity, wherein the received process information identifies the respective set of processes running on ones of the plurality of client computer systems, wherein the received process information includes information classifying processes running on ones of the client computer system based on a set of information defining a resource usage policy;

aggregating, on the computer system, information about the respective set of processes running on ones of the plurality of client computer systems; and providing a report based on the aggregated information.

2. A method, comprising:

receiving, at a computer system executing a resource usage analysis control program, process information from a plurality of resource usage analysis client programs executing on a plurality of client computer systems of an entity, wherein the received process information identifies the respective set of processes running on ones of the plurality of client computer systems, wherein the received process information includes information classifying processes running on ones of the client computer system based on a set of information defining a resource usage policy;

aggregating, on the computer system, information about the respective set of processes running on ones of the plurality of client computer systems; and taking a corrective action based on the aggregated information.

3. The method of embodiment 2, wherein the corrective action includes providing an updated resource usage policy to ones of the plurality of client computer systems.

4. The method of embodiment 3, wherein the updated resource usage policy is incrementally provided to successively larger portions of the plurality of client computer systems.

5. The method of embodiment 2, wherein the computer system is controlled by the entity.

6. The method of embodiment 2, wherein the computer system is controlled by a regulatory body distinct from the entity.

The embodiments described above may be combined in any suitable manner including being combined with embodiments described in other sections. Furthermore, non-transitory computer readable media that include program instructions executable to implement any of the methods described in this section are also contemplated. Additionally, computer systems or computing devices that are configured to implement any of the disclosed methods are also contemplated.

Configuration Analysis

Figure 11:
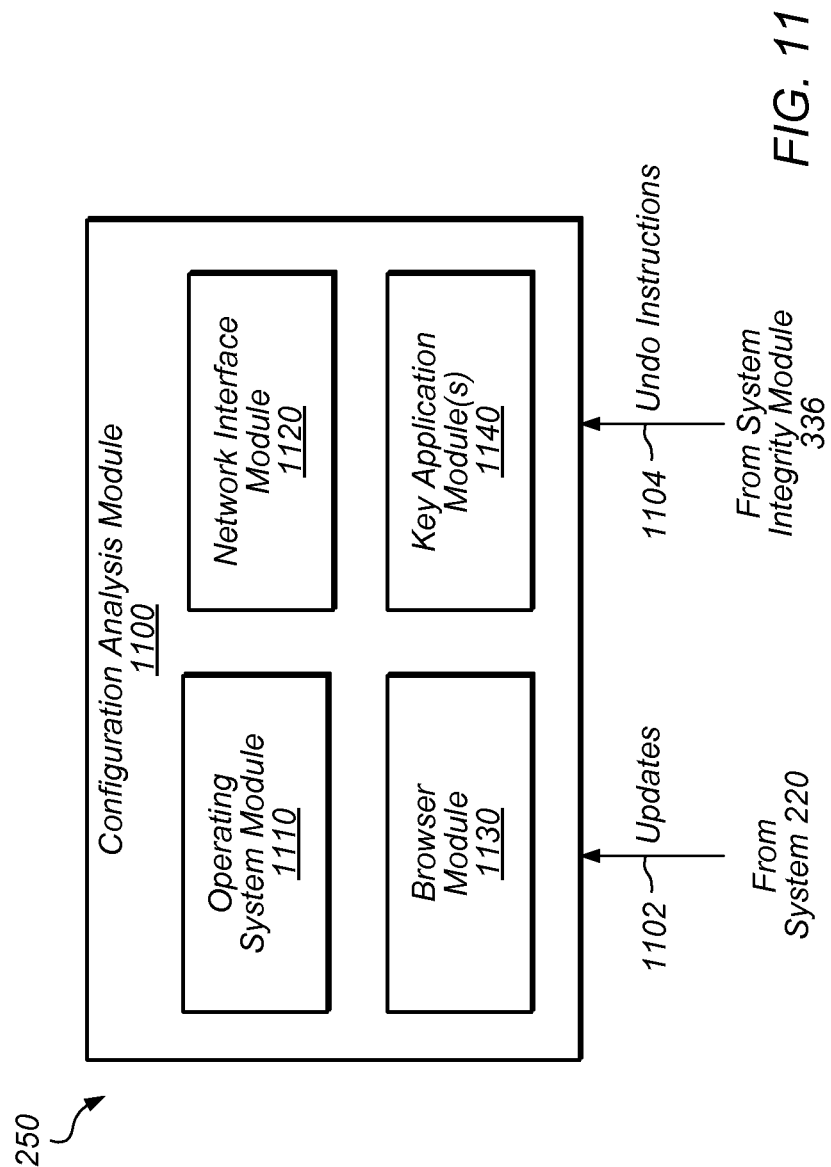
FIG. 11 is a block diagram of a configuration analysis module according to one embodiment of the present disclosure.

Turning now to FIG. 11, one embodiment of a configuration analysis module 1100 is depicted. As discussed above, a computer system (such as system 230) may have configuration settings that may not have been optimally configured. Module 1100 is one embodiment of system configuration module 130 (described above) and is executable to perform various operations to improve the configuration settings of system 230. In one embodiment, module 1100 may automatically change configuration settings without specific interaction from a user of system 230 (e.g., a user providing input to system 230). In various embodiments, these changes are configured to the needs of a specific entity (as opposed to "one-size-fits-all" system registry tuner products), and may include one or more dynamic components to provide configuration adaptation responsive to changing workload, time of day, user presence, network response, or other dynamic factors.

In the illustrated embodiment, configuration analysis module 1100 is included within client 250 (in other embodiments, module 1100 may be independent of client 250). Module 1100 includes operating system module 1110, network interface module 1120, browser module 1130, and one or more key application modules 1140.

Operating system module 1110, in one embodiment, is executable to change operating system (OS) configurations. In many instances, various operating-system settings (such as in WINDOWS) are not geared for efficiency "out of the box" or even with enterprise systems management software running on it. Module 1110 may thus be used to optimize the OS. Module 1110 may use any of a variety of techniques to optimize settings in accordance with entity policy. In one embodiment, module 1110 decreases a default operating-system delay (i.e., a "Menu Show" delay) specifying when to display a menu after receiving an input from a user—this change can improve desktop responsiveness by lowering the delay before the start menu appears and is accessible to the user. In one embodiment, module 1110 decreases a default operating-system timeout threshold (e.g., a "Wait-to-kill App," "Wait-to-kill Service," or "Hung App" timeout) specifying a minimum permissible delay before a process can be killed after system shutdown has been initiated—this changes can improve shutdown and reboot times. In one embodiment, module 1110 causes the operating system to selectively defragment the most commonly accessed files and applications and place them at an optimal location on the disk to improve application load times and responsiveness. In one embodiment, module 1110 disables balloon tips and unused or unneeded graphic effects to reduce CPU cycles and load. In one embodiment, module 1110 disables unused performance counters, which waste finite system resources and are unneeded unless the system is being monitored or debugged. In one embodiment, module 1110 removes unused fonts to increase application load and response times by reducing the number of directories and registry keys that are enumerated. In another embodiment, module 1110 removes legacy filename renaming (e.g., to prevent translation of modern file name formats into legacy Windows/DOS 8.3 style unnecessarily). In some embodiments, module 1110 may correct registry errors, reconfigure screen-saver settings, etc.

Network interface module 1120, in one embodiment, is executable to change hardware configuration settings. In some embodiments, module 1120 changes network interface settings. In some instances, system 230 may be using slower (and/or higher power-consuming) network interface than other available interfaces. In one embodiment, module 1120 may detect that system 230 is using a lesser optimal connection (e.g., a wireless wide-area-network (WWAN) connection) and cause system 230 to begin using a better available connection (e.g., a WIFI connection). In some embodiments, module 1120 changes I/O port settings. Accordingly, in one embodiment, module 1120 detects hardware ports (such as parallel, serial, and USB ports) that are not being used and disables these ports, freeing resources associated with the ports for the operating system to use otherwise.

Browser module 1130, in one embodiment, is executable to change configuration settings of a browser application. Accordingly, in one embodiment, module 1130 optimizes browser settings for cache size, location, and hygiene to improve application response time and browsing speed. In one embodiment, module 1130 increases the maximum permissible number of server connections so that the browser application can establish more connections in parallel with a single server. In one embodiment, module 1130 increases the maximum permissible number of half-open TCP/IP sockets (i.e., a socket associated with a connection in which a host at one end has crashed, or has otherwise removed the socket without notifying the other end) to allow the browser application to hold more open sockets (modern servers have a greater capacity to handle more open sockets). In one embodiment, module 1130 decreases the maximum permissible number of DNS Cache Misses to decrease the number of tries to obtain a resource after the resource is found to be missing. Decreasing this number may improve browser responsiveness. In one embodiment, module 1130 reduces a network timeout threshold specifying a maximum permissible waiting period for responses from wired/wireless network connections.

Key application modules 1140, in one embodiment, are executable to change configurations settings for a respective application (other than a browser application), which may be important to an entity. In some embodiments, a module 1140 may optimize configurations for an office suite application such as MICROSOFT Word. In some embodiments, another module 1140 may optimize configuration for database software such as SQL software.

In one embodiment, module 1100 receives updates 1102 from administrative system 220 (e.g., via control update module 348). These updates may include program instructions for new techniques or for improvements to existing techniques being performed. In some embodiments, these techniques may be developed based on information collected from knowledge base 140 and/or behavioral analysis 150.

In one embodiment, module 1100 receives undo instructions 1104 from system integrity module 336. As discussed above, in one embodiment, system integrity module 336 permits a client 250 to undo corrective actions that result in negative consequences. Various criteria for determining that a corrective action has had some negative consequences are contemplated. These negative consequences may be detected, in one embodiment, based on user input that does not directly specify an undo operation (e.g., detection of repeated mouse clicks may be used to infer user frustration with a recent corrective action). In another embodiment, module 336 may determine that a corrective action resulted in network connectivity loss. In one embodiment, if module 1100 performs an action (e.g., a registry update) that results in such a consequence, module 336 may instruct module 1100 via an undo instruction 1104 to back out or undo that action. Module 336 is described further below in conjunction with FIGS. 19 and 20.

Figure 12:
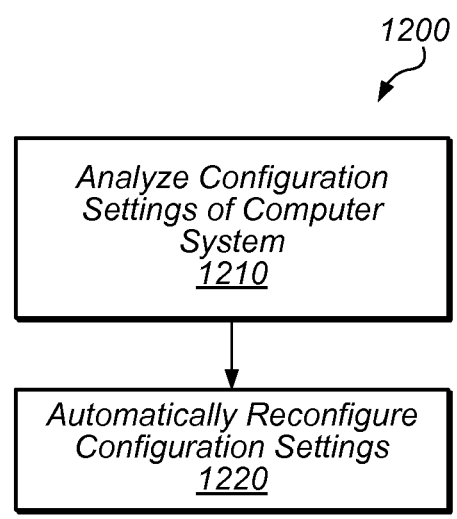
FIG. 12 is a flow chart of a method for optimizing a system configuration according to one embodiment of the present disclosure.

Turning now to FIG. 12, a flow chart of a method 1200 for optimizing a system configuration is depicted. Method 1200 is one embodiment of a method that may be performed using a computer program executing on a computer system such as client 250 executing on computer system 230. In many instances, performance of method 1200 can improve computer system performance. In step 1210, client system 230 analyzes its configuration settings. These settings may include various ones of the settings relating to the operating system, hardware, application, or others such as described above. Client system 230 may collect information about settings from various locations including an operating system registry, task manager, configuration files, etc. In various embodiments, client system 230 compares previous settings (e.g., default settings) with a set of optimized settings to determine if changes should be made based on the configuration of system 230. In step 1220, client system 230 automatically reconfigures ones of the configuration settings.

Various embodiments of systems and methods for improving configuration settings are contemplated based on the preceding description, including, but not limited to, the embodiments listed below.

1. A method, comprising:
   detecting whether I/O ports are unused by a computer system; and
   automatically disabling at least one of the unused ports.
2. The method of embodiment 1, wherein the ports are parallel, serial, or USB ports.

3. A method, comprising:

analyzing a default operating-system delay specifying when to display an operating system menu after receiving an input from a user;

automatically reconfiguring one or more settings of an operating system of the computer system to decrease the delay.

4. A method, comprising:

analyzing a default operating-system timeout threshold specifying a minimum permissible delay before a process can be terminated after system shutdown has been initiated; and automatically reconfiguring one or more settings of an operating system of the computer system to decrease the timeout value.

5. A method, comprising:

identifying fonts that are not being used on a computer system; and automatically removing one or more of the identified fonts to prevent use by the computer system.

6. A method, comprising:

analyzing a network timeout threshold specifying a maximum permissible waiting period of a browser application for a response to a network connection; and reconfiguring one or more settings of the browser application to decrease the timeout threshold.

7. A method, comprising:

analyzing a retry value specifying a maximum number of permissible retries a browser application can attempt to acquire a resource; and reconfiguring one or more settings of the browser application to decrease the retry value.

8. A method, comprising:

analyzing a connection threshold specifying a maximum permissible number of network connections that a browser application can open in parallel; and reconfiguring one or more settings of the browser application to increase the connections threshold.

The embodiments described above may be combined in any suitable manner including being combined with embodiments described in other sections. Furthermore, non-transitory computer readable media that include program instructions executable to implement any of the methods described in this section are also contemplated. Additionally, computer systems or computing devices that are configured to implement any of the disclosed methods are also contemplated.

Application Genre Classification

Figure 13:
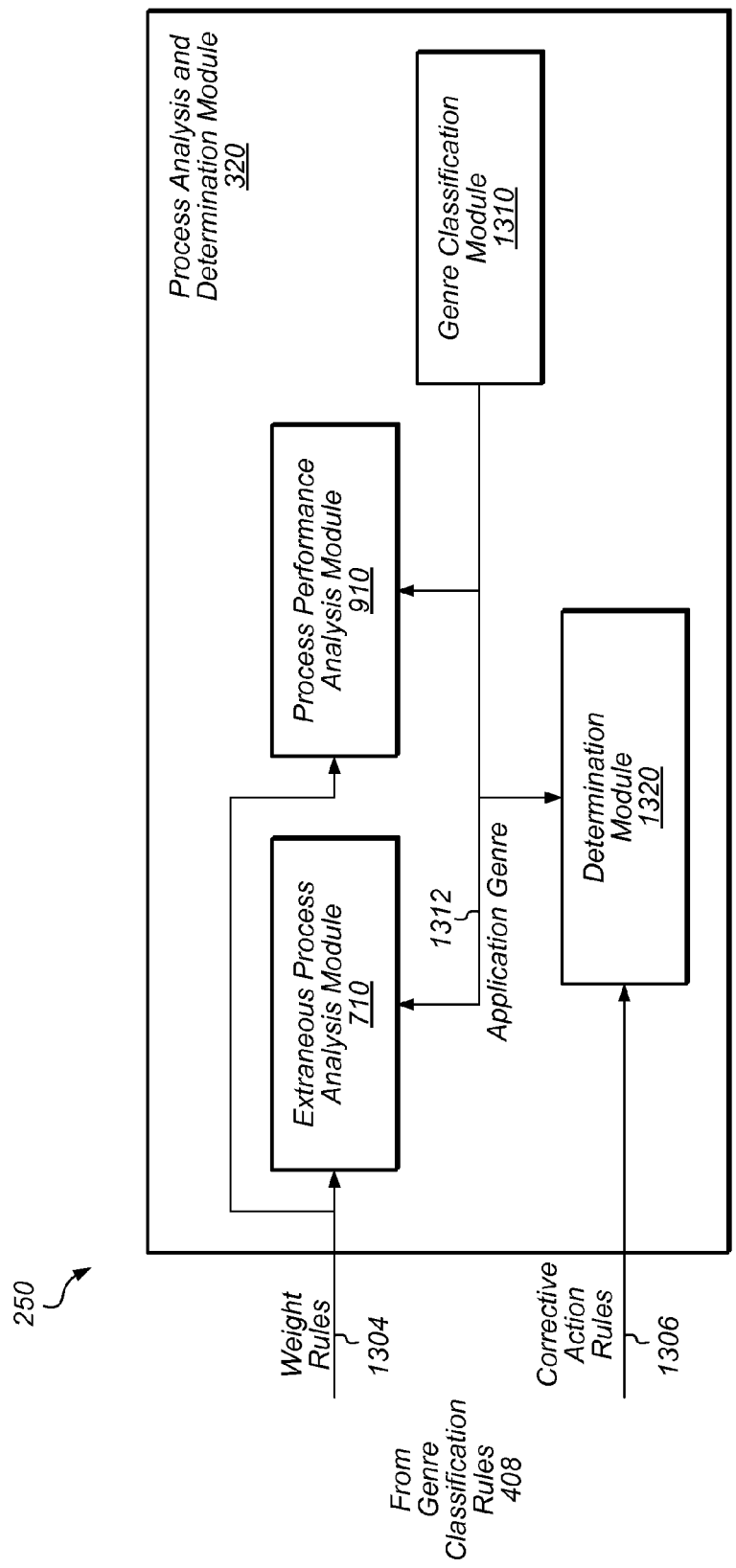
FIG. 13 is a block diagram depicting a genre classification module according to one embodiment of the present disclosure.

Turning now to FIG. 13, one embodiment of a genre classification module 1310 is depicted. As discussed above, a usage policy 340 may include genre classification rules 406 for specific application genres (or types of programs). In some embodiments, process analysis and determination module 320 may use rules 406 to determine corrective actions for those processes. In one embodiment, module 320 includes module 1310 that identifies application genres. In the illustrated embodiment, module 320 also includes module 710, module 910, and determination module 1320.

Genre classification module 1310 may classify processes into a variety of application genres 1312. In one embodiment, the application genres 1312 are predetermined—that is, module 1310 is executable to classify processes into one or more of a predefined set of groups. Genres 1312 may include a number of non-malicious application genres—that is, genres or classes of programs that are not viruses, malware, etc. In some embodiments, all of the genres 1312 are non-malicious (such a configuration might be useful where classification is applied after extraneous processes, including malicious software, have already been culled). In other embodiments, a single one of the genres 1312 may be reserved for malicious software.

Module 1310 may also classify processes using a variety of techniques. In some embodiments, module 1310 classifies processes by identifying known processes (e.g., based on an executable name) and then determining the application genre of the identified process (e.g. by using an extensive lookup table). In other embodiments, module 1310 classifies processes based on behavioral/characteristic/heuristic approaches without attempting to first identify the processes. Accordingly, module 1310 may classify processes based on network traffic of processes (e.g., opened transmission control protocol (TCP) or user datagram protocol (UDP) ports), hardware devices being used by processes (e.g., a graphical processor unit (GPU), I/O devices, etc.), application programming interface (API) calls of processes, application genres of parent processes, etc.

In some embodiments, module 1310 may further determine proliferation information about processes within an application genre. As used herein, proliferation information refers to the differences in versions of processes across client systems 230 of an entity. This term may refer to different versions of the same process (e.g., FIREFOX version 3 and FIREFOX version 4) or to different processes of the same application genre (e.g., AOL instant messenger and SKYPE). In one embodiment, client 250 may provide proliferation information in a report to a user such as a system administrator of an entity. For example, in one embodiment, a report may specify that client systems are executing three different chat programs and that, for one of the chat programs, client systems are executing four different versions, three of which are out of date. System-wide reports that provide insight into the types and versions of software residing on an aggregate user desktop pool can be very useful in making system resource allocation decisions.

In one embodiment, modules 710 and 910 use application genres information 1312 in conjunction with weight rules 1304 (and other rules described above, in some embodiments) to identify extraneous processes and underperforming processes. In one embodiment, weight rules 1304 may specify weights for processes having particular application genres. Rules 1304 may be inclusive (i.e., applicable to processes having application genres in a specific set) or exclusive (i.e., applicable to processes having application genres not in the specific set). Rules 1304 may also be applicable to one specific application genre (e.g., "Games") or multiple application genres (e.g., "Office Suites" and "Email Clients"). In some embodiments, modules 710 and 910 may use rules 1304 to generate scores (such as scores 714, 718, 914, and 918). Accordingly, module 710 may use rules 1304 that identify particular application genres that are more likely (or less likely) to have extraneous processes. For example, in one embodiment, module 710 may assign a stronger (e.g., higher) extraneous score 714 for processes having the application genre "updates," the application genre of realupdate.exe. Module 910 may use rules 1304 that identify particular application genres that are more likely (or less likely) to have underperforming processes.

In one embodiment, determination module 1320 (which may implement various features of modules 720 and/or 920) uses application genres 1312 in conjunction with corrective action rules 1306 (or other rules described above, in some embodiments) to determine corrective actions for processes. In various embodiments, rules 1306 may specify conditions dependent on particular application genres—accordingly, if a process has this application genre, take (or do not take) these actions. In some embodiments, rules 1306 may specify conditions dependent on scores as well as particular application genres—accordingly, if a process has one of these application genres and its scores satisfy these thresholds, take (or do not take) these actions. As with rules 1304, rules 1306 may be applicable to one specific application genre or multiple application genres. Rules 1306 may also be inclusive (e.g., perform (or do not perform) these corrective actions for processes having these application genres) or exclusive (e.g., perform (or do not perform) these corrective actions for processes not having these application genres). In some embodiment, rules 1306 may override other rules (such as described) that are not specific to particular application genres.

Figure 14:
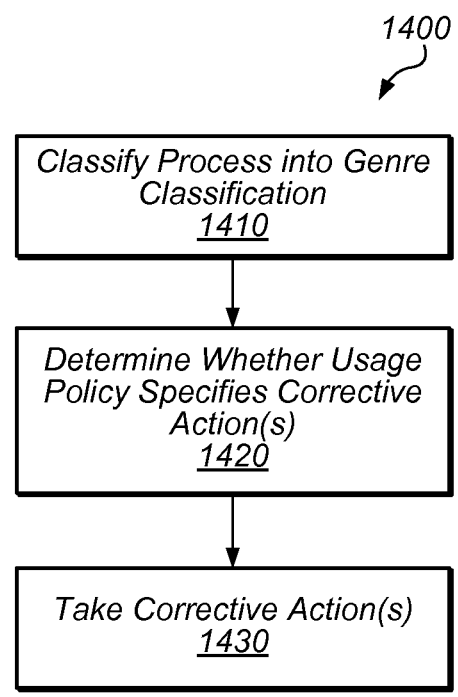
FIG. 14 is a flow chart of a method for analyzing processes based on application genre according to one embodiment of the present disclosure.

Turning now to FIG. 14, a flow diagram of a method 1400 for analyzing processes based on application genre is depicted. Method 1400 is one embodiment of a method that may be performed using a computer program executing on a computer system such as client 250 executing on computer system 230. In various embodiments, method 1400 may be performed for each process executing on a computer system. In some instances, performance of method 1400 may permit an entity to better manage processes by tailoring a usage policy for specific application genres.

In step 1410, client system 230 (e.g., using module 1310) classifies an executable process into one of a set of predetermined application genres. This set, as discussed above, may include various application genres such as "Games," "Office Suites," "Email Clients," etc. In various embodiments, client 250 classifies the process without determining the name and version of an application from a catalog of applications. In some embodiments, this classification is based on information gathered dynamically from the computer system on which the application is running—for example, network traffic, the hardware devices in use by the system, and API calls made by the system, may be considered.

In step 1420, client system 230 (e.g., using modules 710, 910, and/or 1320) determines whether a usage policy 340 specifies one or more corrective actions for processes having the application genre. In various embodiments, step 1420 may include applying weight rules 1304 specific to the application genre determined in step 1410 to generate one or more scores indicative of whether a process is extraneous and/or underperforming. In various embodiments, client 250 may also use corrective action rules 1306 (or other rules described above) to determine corrective actions in accordance with usage policy 340.

In step 1430, client system 230 takes a corrective action for the process based on the determining. This action may include any of the corrective actions described above. Accordingly, client 250 may terminate the process and removing its load point if it is determined to be extraneous. Client 250 may control the process's resource consumption if it is determined to be underperforming.

Various embodiments of systems and methods for analyzing processes based on genre are contemplated based on the preceding description, including, but not limited to, the embodiments listed below.

1. A method, comprising:
a computer system classifying an executing process into a first of a plurality of predetermined application genres, wherein the plurality of predetermined application genres includes a plurality of non-malicious application genres;
the computer system determining whether a usage policy specifies one or more corrective actions for processes having the first predetermined application genre; and the computer system taking a corrective action for the process based on the determining.

2. The method of embodiment 1, wherein the process is classified based on its function and without determining the name and version of an application from a catalog of applications.

3. The method of embodiment 1, wherein the plurality of predetermined genres classifications include one or more of the following: chat programs, systems management programs, data management programs, security software, browser programs, updaters, office suites, remote controls, desktop widgets, email clients, games.

4. The method of embodiment 1, wherein the classifying includes analyzing network traffic of the executable process.

5. The method of embodiment 4, wherein analyzing the network traffic includes determining transmission control protocol (TCP) or user datagram protocol (UDP) ports opened and used by the process.

6. The method of embodiment 1, wherein the classifying includes identifying hardware devices being used by the process.

7. The method of embodiment 6, wherein the identifying includes determining whether and to what degree the process is using a graphical processor unit (GPU) of the computer system.

8. The method of embodiment 1, wherein the classifying includes identifying an application genre of a parent process of the executable process.

9. The method of embodiment 1, further comprising:
the computer system determining, for a desktop pool within an entity, proliferation information within an application genre, wherein the proliferation information specifies a number of different applications within the genre that are running on systems in the desktop pool.

10. The method of embodiment 9, further comprising generating a report that includes an application consolidation recommendation to the entity.

11. A method, comprising:
a computer system of an entity classifying a process executing on a computer system into one of a plurality of predefined application types; and
the computer system using the predefined application type into which the process is classified to determine whether the process deviates from a resource usage policy of the entity.

12. The method of embodiment 11, further comprising taking a corrective action with respect to the process based on determining whether the process deviates from the resource usage policy of the entity.

13. The method of embodiment 11, wherein the predefined application type into which the process is classified is one of a plurality of attributes used to classify the process.

14. The method of embodiment 11, wherein all of the predefined application types are non-malicious application types.

15. A method, comprising:
a computer system classifying a process executing on a computer system into one of a plurality of predefined application types, wherein the plurality of predefined application types includes a security software application type, a browser application type, and a data management application type.

16. A method, comprising:
a computer system classifying a process executing on a computer system into one of a plurality of predefined application types, wherein the plurality of predefined application types includes a games application type and an software updater application type.

The embodiments described above may be combined in any suitable manner including being combined with embodiments described in other sections. Furthermore, non-transi-

User Classification

Figure 15:
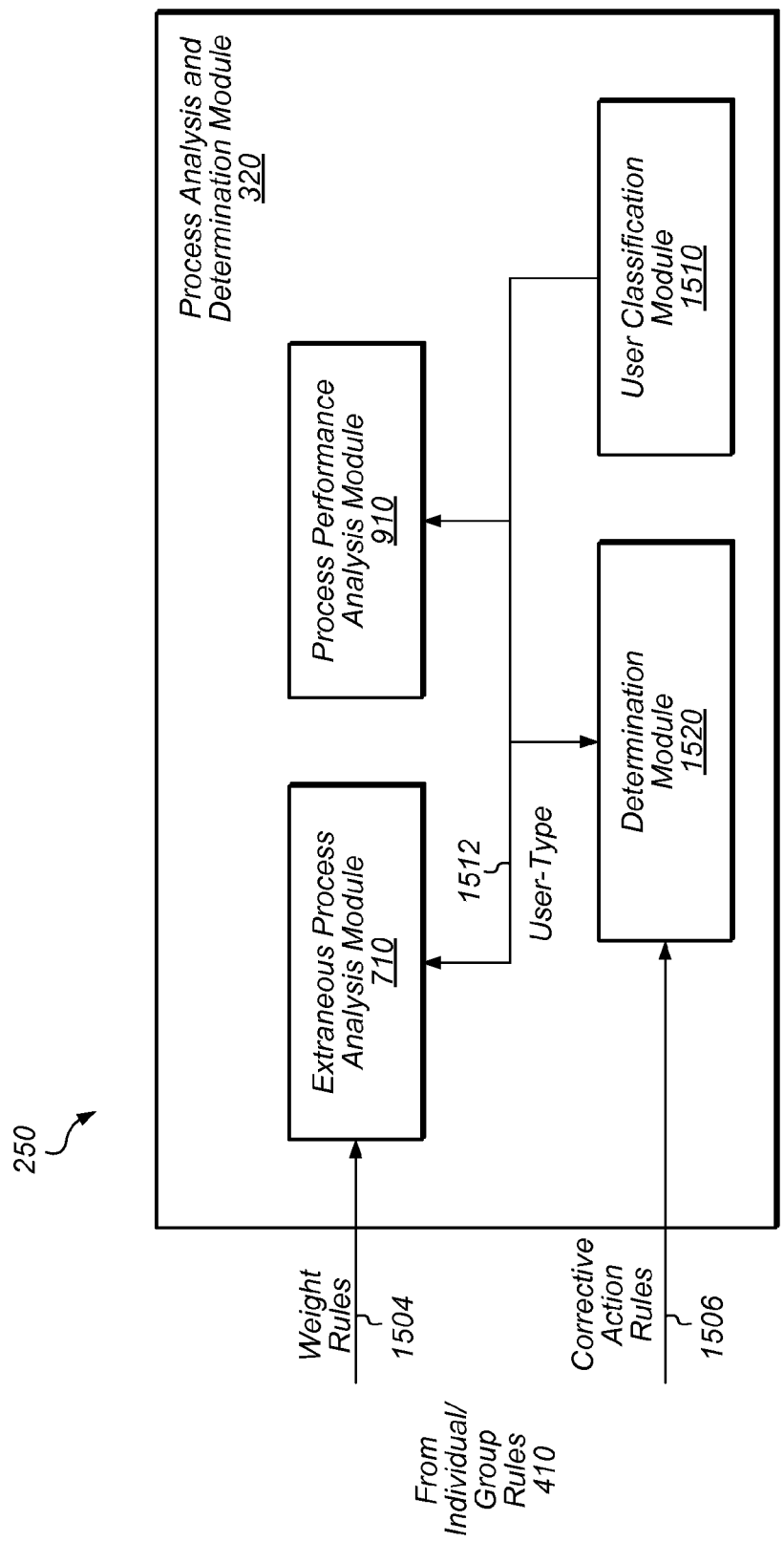
FIG. 15 is a block diagram depicting a user classification module according to one embodiment of the present disclosure.

Turning now to FIG. 15, one embodiment of user classification module 1510 is depicted. As discussed above, a usage policy 340 may include individual/group rules 408 for certain users or groups of users. In some instances, these rules 408 may permit more latitude for processes executing on clients 230 having particular users/groups. In some embodiments, process analysis and determination module 320 uses rules 408 to determine corrective actions for a process executing on the computer system of an individual or group. These corrective actions may be determined based on an individual's or group's role (e.g., job function) in an enterprise. In one embodiment, module 320 includes module 1510 to classify a user into of a set of predetermined user types (e.g., accounting, engineering, technical support, etc.) based on these roles. In the illustrated embodiment, module 320 also includes module 710, module 910, and determination module 1520.

User classification module 1510, in one embodiment, is executable to classify a user or group of users into one or more user types 1512. Module 1510 may support any of variety of types 1512 such as those described above. In some embodiments, module 1510 determines a type 1512 by referencing a database such as a directory service. Accordingly, module 1510 may look up a user's job function based on an input such as a user's name. In other embodiments, module 1510 uses heuristics to dynamically determine a user type 1512. Accordingly, module 1510 may determine a user type 1512 for a system based solely or in part on the processes present on that system 230. For example, the presence of certain programs on a user's computer system may indicate that the user has a job function as an information technology (IT) professional and thus should be classified as an IT user type. In some embodiments, module 1510 may also analyze usage patterns (e.g., communication patterns), network connections, as factors in this determination.

In one embodiment, modules 710 and 910 use user types 1512 in conjunction with weight rules 1504 (or other rules described above, in some embodiments) to identify extraneous processes and underperforming processes. In various embodiments, weight rules 1504 may specify different weights for processes depending upon the particular user type. Accordingly, in some embodiments, certain rules 1504 may be more or less likely to score a process as extraneous depending upon a user type (e.g., an IT user type versus an accounting user type). In some embodiments, certain rules 1504 may assign a higher (or lower) importance score for a process depending on user type—e.g., scoring accounting software more highly if the user has an accounting user type. Some processes may be considered to be extraneous for one user type and important for another user type. In one example, a program debugger would be considered extraneous for an accounting type but important for a software developer type.

In one embodiment, determination module 1520 (which may implement various features of modules 720, 920, and/or 1320) uses user types 1512 in conjunction with corrective action rules 1506 (or other rules described above, in some embodiments) to determine corrective actions for processes. In various embodiments, rules 1506 may specify conditions dependent on particular user types—accordingly, if a user/group has this user type, take (or do not take) these actions. In some embodiments, rules 1506 may specify condition-dependent scores as well as particular user types—accordingly, if a user/group has one of these user types and a process's score satisfies particular thresholds, take (or do not take) particular actions. In some embodiment, rules 1506 may override other rules (such as those described) that are not specific to particular user types.

Figure 16:
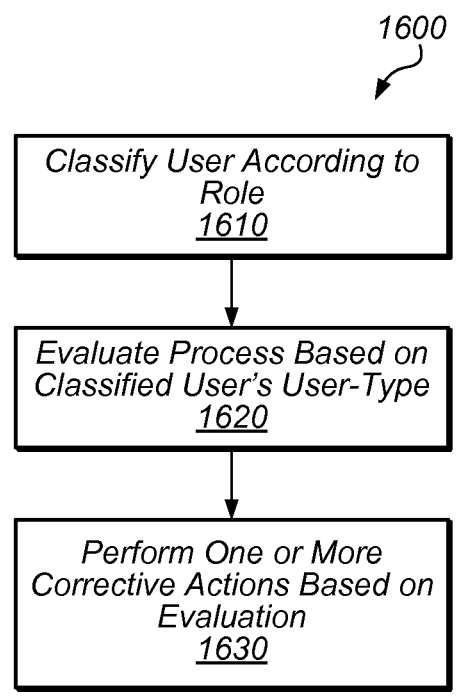
FIG. 16 is a flow chart of a method for analyzing processes based on user classifications according to one embodiment of the present disclosure.

Turning now to FIG. 16, a flow chart of a method 1600 for analyzing processes based on user classifications is depicted. Method 1600 is one embodiment of a method that may be performed using a computer program executing on a computer system such as client 250 executing on computer system 230. In various embodiments, method 1600 may be performed for each process executing on a computer system; however, step 1610 may not be repeated for subsequent performances of method 1600. In some instances, performance of method 1600 may permit an entity to better manage processes by tailoring a usage policy for specific individuals or groups.

In step 1610, client system 230 (e.g., using module 1510) classifies a user in an enterprise as one of a set of user types according to the user's role in the enterprise. As discussed above, in various embodiments, these user types may correspond to various job functions within an enterprise. For example, a user that manages payroll may be classified as an accounting user type. In some embodiments, client 250 may determine a user type by referencing a database such as a directory service. Alternatively, in other embodiments, client 250 determines a user type based on an analysis of executing processes, usage patterns, network connections, etc.

In step 1620, client system 230 (e.g., using module 710, 910, and/or 1510) evaluates a process relative to a resource usage policy of the computer system based on the classified user's user type. In various embodiments, step 1620 may include applying weight rules 1504 specific to the user type determined in step 1610 to generate one or more scores indicative of whether a process is extraneous and/or underperforming. In various embodiments, client 250 may also apply corrective action rules 1506 (or other rules described above) to determine corrective actions in accordance with usage policy 340.

In step 1630, client system 230 performs one or more corrective actions based on the evaluating. This action may include any of the corrective actions described above including those described for extraneous processes and those described for underperforming processes.

Various embodiments of systems and methods for analyzing processes based on user role are contemplated based on the preceding description, including, but not limited to, the embodiments listed below.

1. A method, comprising:

a computer system classifying a user in an enterprise as one of a plurality of user types according the user's role in the enterprise;

the computer system evaluating a process relative to a resource usage policy of the computer system based on the classified user's user type; and the computer system performing one or more corrective actions based on the evaluating.

2. The method of embodiment 1, wherein the classifying include querying a directory service to determine the user's role in the enterprise.

3. The method of embodiment 1, wherein the classifying includes identifying processes present on the computer system that are associated with a particular one or more of the plurality of user types.

4. The method of embodiment 3, wherein the classifying includes:
   identifying a process as being associated with a finance user type; and
   classifying the user as the finance user type.
5. The method of embodiment 3, wherein the classifying includes:
   identifying a process as a system administrative tool associated with information technology (IT) user type; and
   classifying the user as the IT user type.
6. The method of embodiment 1, wherein the resource usage policy includes rules specific to individuals or groups of individuals within the enterprise.
7. The method of embodiment 1, wherein the user is classified based on communication patterns of the user.
8. A method, comprising:
   a computer system classifying a user according to job function within an enterprise based on specific processes present on a computing device of the user; and
   the computer system managing processes on the computing device based on the classifying.

The embodiments described above may be combined in any suitable manner including being combined with embodiments described in other sections. Furthermore, non-transitory computer readable media that include program instructions executable to implement any of the methods described in this section are also contemplated. Additionally, computer systems or computing devices that are configured to implement any of the disclosed methods are also contemplated.

Installation Monitoring

Figure 17:
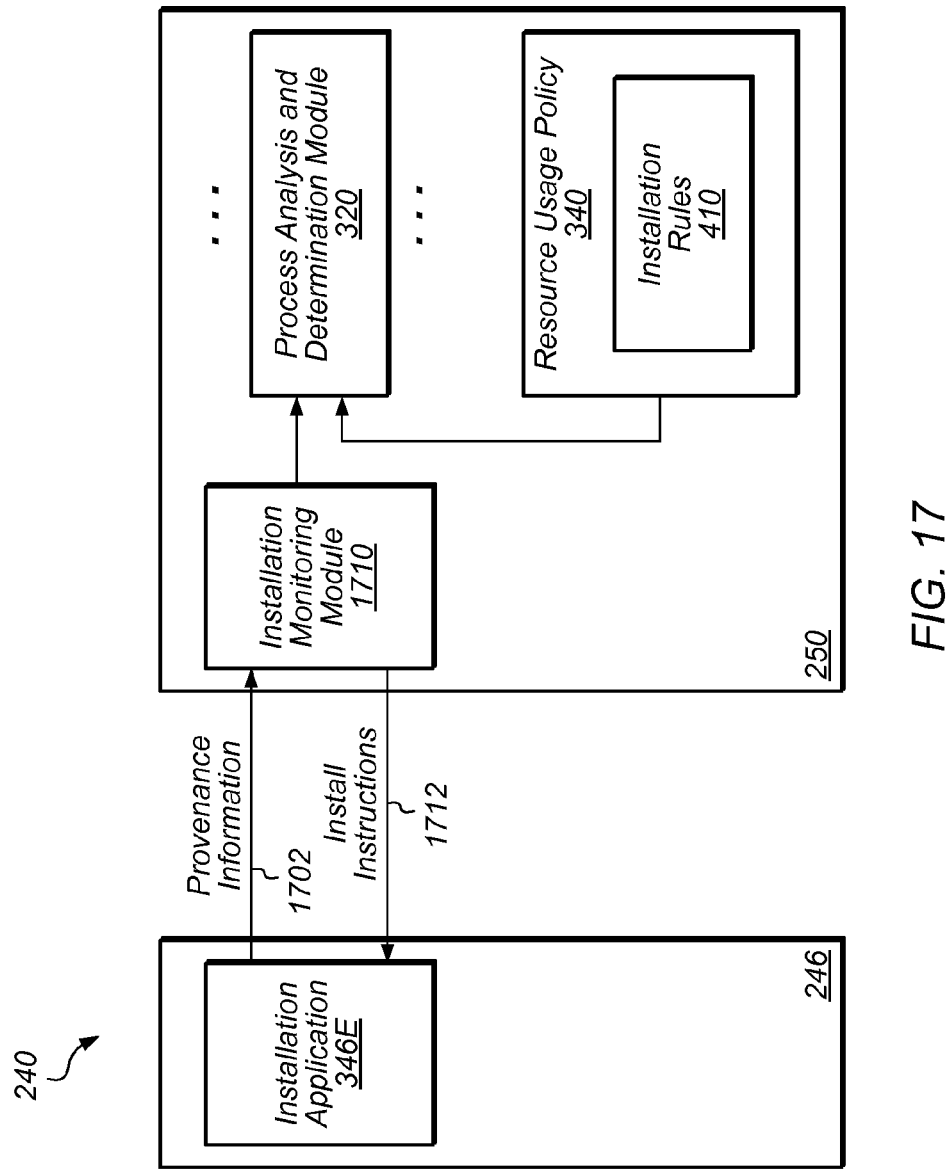
FIG. 17 is a block diagram depicting an installation monitoring module according to one embodiment of the present disclosure.

Turning now to FIG. 17, one embodiment of an installation monitoring module 1710 is depicted. As discussed above, a usage policy 340 may include installation rules 410, which may be usable to reduce the effects of image drift, as that term is described above. As will be described below, client 250 may take both reactive and proactive approaches to reducing image drift. In the reactive approach, client 250, in one embodiment, uses rules 410 to determine corrective actions for already-installed processes based on whether those processes were installed after a system 230's initial configuration (e.g., based on a golden image). In the proactive approach, client 250 may prevent or restrict the installations of new processes. In the illustrated embodiment, client 250 includes an installation monitoring module 1710 to facilitate these approaches.

In one embodiment, module 1710 is executable to monitor the installation of processes, as part of the reactive approach, to identify whether those processes were apart of the golden image. Module 1710 may track the installation of processes using any of variety of techniques. In one embodiment, module 1710 analyzes an install application 346E in real time and records provenance information 1702 about an installation. In various embodiments, provenance information 1702 may include installation information such as the names and paths of installed processes, registry keys updated by application installation 346E, add/remove information, installed DLLs, etc. Information 1702 may identify who installed an application (e.g., a user of a client system 230, the IT department, automatic update agent, unintended web download, etc.) Information 1702 may include dates when applications were installed and whether the installation was user-attended or unattended. Information 1702 may also identify whether an application was installed as an optional feature and whether the optional feature was default opt-in or opt-out.

In one embodiment, module 320 uses provenance information 1702 in conjunction with rules 410 (or other rules described above, in some embodiments) to identify extraneous processes and underperforming processes. In some embodiments, rules 410 may specify weights based on information 1702 to determine how a process is to be scored (e.g., using scores 714, 718, 914, 918). For example, in one embodiment, rules 410 may specify that particular processes be assigned lower importance scores if those processes were not installed using the golden image. In one embodiment, rules 410 may specify that particular processes be assigned higher extraneous scores if those processes were optional processes in an installation, especially if they were default opt-out (i.e., the user would have had to manually unmark a checkbox to opt out of the optional installation). In some embodiments, rules 410 may specify corrective actions based on information 1702. For example, if a process is installed after a particular date and is determined to be of little importance, a rule 410, in one embodiment, may specify that the process be given less resources or even removed as a corrective action.

In one embodiment, module 1710 also monitors the installation of processes and provides instructions 1712, as part of the proactive approach, to restrict or prevent the installation of certain processes or the performance of certain activities. In some embodiments, module 1710 may restrict activities outside of a recognized "installation time window"—for example to prevent malware from performing code injection or DLL modification, writing to certain parts of the registry, etc. to further compromise an attacked system. In some embodiments, module 1710 may use certain criteria set for constituting a recognized installation, such as entity delivery of new software via the entity's software push-out mechanism, user explicit download of an application, an approved automatic update, etc. In many instances, using these criteria defeats the common malware technique of secretly injecting malicious code onto a system after an exploit has gained control of the system. In some embodiments, module 1710 may detect the installation of "optional" parts and provide instructions 1712 to prohibit their installation.

Figure 18:
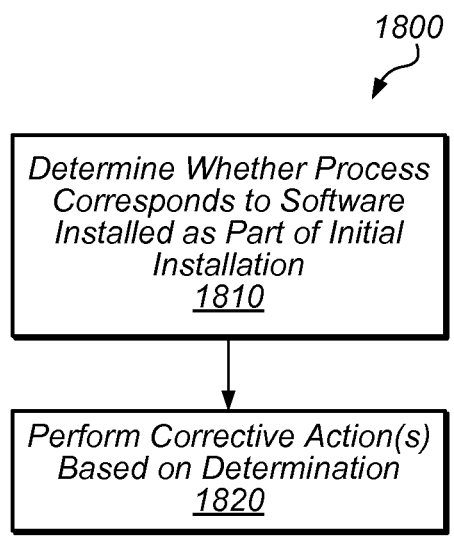
FIG. 18 is a flow chart of a method for managing installed processes according to one embodiment of the present disclosure.

Turning now to FIG. 18, a flow chart of a method 1800 for managing installed processes is depicted. Method 1800 is one embodiment of a method that may be performed by a computer program executing on a computer system such as client 250 executing on computer system 230. In various embodiments, method 1800 may be performed for each process executing on a computer system. In some instances, performance of method 1800 may permit an entity to reduce image drift on its systems. In other instances, performance of method 1800 may facilitate evolution or refinement of a golden image to include additional high value software that had been subsequently installed by a plurality of users. In one embodiment, this refinement is done at the server tier by aggregating information on image drift across clients and analyzing this data to extract information on high value applications installed with high prevalence. This may interact with the user role recognition aspect, so that it would be recognized if particular high value applications were installed by users with particular roles. This may prompt the entity management staff to differentiate the golden image into organization-specific versions to better meet the needs of particular user roles in particular organizational groupings.

In step 1810, client system 230 determines whether one or more processes on computer system 230 correspond to software installed as part of an initial installation for system 230. As discussed above, client 250 may determine this, in various embodiments, by tracking the installation of software on system 230 and storing information about installed processes. In some embodiments, this stored information may include names and paths of installed processes, registry keys updated by an install application, add/remove information, installed DLLs, dates of installations, etc.

In step 1820, client system 230 performs a corrective action for one or more of the processes based on the determination in step 1810. This action may include any of the corrective actions described above. For example, in some embodiments, the corrective action may give fewer resources to the process if it was not a part of the initial installation. Alternately, the corrective action may even remove it (e.g., by reversing the installation steps or by invoking the uninstall function for the application).

Various embodiments of systems and methods for analyzing extraneous processes are contemplated based on the preceding description, including, but not limited to, the embodiments listed below.

1. A method, comprising:
   a computer system determining whether one or more of a plurality of executing processes correspond to software installed as part of an initial installation for the computer system; and
   the computer system performing a corrective action for one or more of the plurality of processes based on the determining.

2. The method of embodiment 1, wherein the initial installation is performed using a golden image.

3. The method of embodiment 1, wherein the determining includes monitoring software installations to identify processes installed subsequent to the initial installation.

4. The method of embodiment 3, wherein the determining further includes storing names and paths of identified processes.

5. The method of embodiment 3, wherein the determining further includes storing an information identifying registry keys updated by the software installations.

6. A method, comprising:
   monitoring software installations to identify processes installed subsequent to an initial installation for the computer system; and
   the computer system performing a corrective action for one or more of the plurality of processes based on the determining.

The embodiments described above may be combined in any suitable manner including being combined with embodiments described in other sections. Furthermore, non-transitory computer readable media that include program instructions executable to implement any of the methods described in this section are also contemplated. Additionally, computer systems or computing devices that are configured to implement any of the disclosed methods are also contemplated.

System Integrity Analysis

Figure 19:
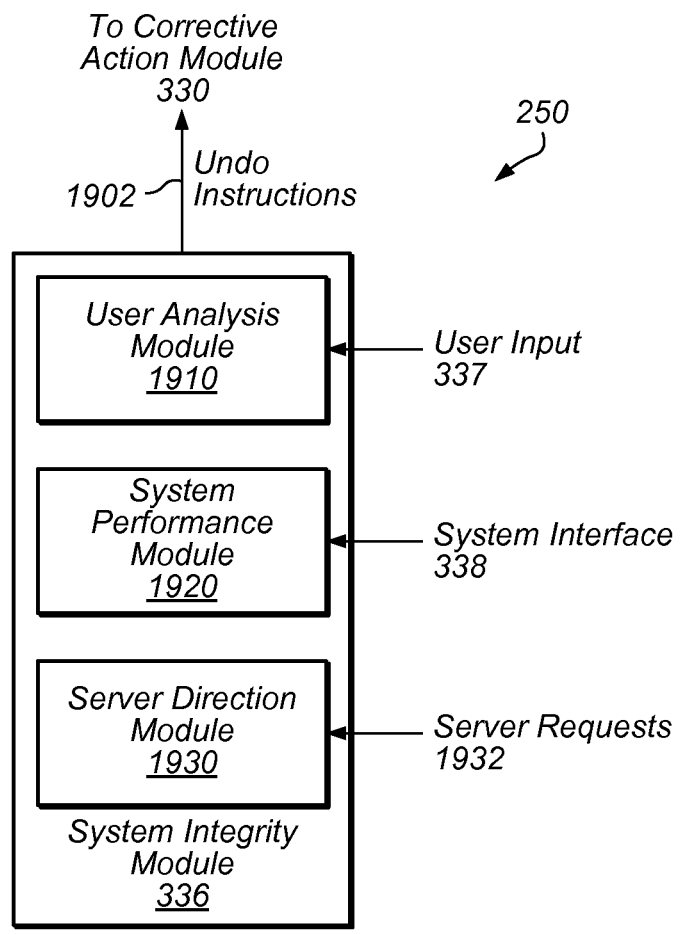
FIG. 19 is a block diagram of a system integrity module according to one embodiment of the present disclosure.

Turning now to FIG. 19, one embodiment of system integrity module 336 is depicted. As discussed above, client 250 may take a variety of corrective actions for various processes executing on system 230. In some instances, corrective actions may produce unwanted or negative consequences from the perspective of a user of client 250. For example, if a corrective action terminates a process, the negative consequence may be the termination of the process itself (which may have been deemed important by the user). Other examples of negative consequences resulting form a corrective action include loss of a network connection and causing a process to consume more resources than the resources that it normally uses. In various embodiments, system integrity module 336 is configured to automatically undo the corrective actions that created these negative consequences.

Accordingly, module 336 may "self-heal," unremediating a corrective action without explicit instructions from the user to do so.

In the illustrated embodiment, module 336 includes user analysis module 1910, system performance module 1920, and server direction module 1930. As will be described below, modules 1910 and 1920, in one embodiment, may be used to facilitate performance of a local/client-level self-healing (i.e., a detection and correction of a problematic remediation by system 230 without receiving a request from an external system such as a system 220). Module 1930, in one embodiment, may be used to facilitate a server-directed self-healing (i.e., a detection of a problematic remediation by system 220, which provides a request to a system 230 to undo a corrective action).

User analysis module 1910, in one embodiment, is executable to identify remediations that may be problematic by analyzing user input 337 on a system 230. Accordingly, in one embodiment, module 1910 may analyze the rate at which a user performs various input operations. For example, module 1910 may determine the number of times a user presses keys, clicks or moves a mouse (or other input device such as a touch screen), selects system tray icons, etc., within a certain time period. If the input rate is above some threshold or has some predefined increase after a remediation is performed, this may indicate that the remediation caused a negative effect (the increase in user input operations may infer that the user is frustrated, for example). In such an embodiment, module 1910, in response to detection of some indication of post-corrective action negative consequences such as those described above, may instruct correction module 330 to undo the remediation via one or more undo instructions 1902.

System performance module 1920, in one embodiment, is executable to identify problematic remediations by analyzing system information 338 on a system 230. In some embodiments, module 1920 may instruct module 330 to undo a remediation in response to information 338 indicating a loss of network connectivity, to information indicating that certain devices have become inoperable, to information indicating that certain processes are hanging, to activation of system error reporting, etc.

Server direction module 1930, in one embodiment, is executable to provide undo instructions 1902 to module 330 in response to receiving requests 1932 from system 220 instructing module 336 to undo particular remediations. In a computing environment such as computing environment 200, corrective actions may be rolled out in a series of phases throughout environment 200 to reduce the chances that particular remediations will cause problems on several systems 230. For example, in one embodiment, five remediations (e.g., terminate process A, give more memory to process B, schedule process C to execute when system 230 is idle, give process D a higher interrupt propriety, and reduce process E's processor usage) may be rolled out per day (e.g. all at once or one at a time) to approximately 50 selected ones of systems 230 for testing. (These selected systems can be referred to informally as "sacrificial lambs.") After this initial testing, remediations may be rolled out to a much broader group of systems 230 (in some embodiments, this roll-out may still be graduated since the sacrificial-lamb systems may not reflect all possible production configurations). In the event that a deployed remediation does cause problems, system 220, in one embodiment, may be able to detect a problem based on information provided by one or more clients 250 (e.g., via respective modules 348). In the event of determining such negative consequences, system 220 may then request (e.g., via a request 1932) that module 336, in one embodiment, undo the remediation that created a harmful or undesired situation on one or more systems 230.

System 220 may determine to stop rolling out remediations and begin sending requests to undo remediations in response to detecting any of variety of problems. In one embodiment, system 220 may detect problems with a remediation in response to detecting that one or more client system 230 stress metrics (i.e., indications of how hard a system is working such as processor utilization, memory and I/O utilizations, processor and I/O queue depths, context switch rates, page fault rates, etc.) have worsened. Accordingly, system 220 may conclude problems exist if an average system stress for one or more client systems 230 (e.g., 5% of systems 230) has increased by a particular amount following remediation (e.g., an increase of 20% immediately following remediation). In one embodiment, system 220 may detect problems with a remediation in response to detecting that a number of non-extraneous processes on the plurality of client systems has fallen by a particular amount following remediation. Accordingly, system 220 may conclude problems exist if the prevalence of any important process (on more than a few machines) compared immediately before and immediately after remediation falls by some predefined amount, e.g., 30%. For example, a rule may be in place for an entity that 25% of machines in a certain department (e.g., engineering) should typically be executing a mission-critical design application during business hours. If, after a corrective action applied to machines in the department, information is reported to system 220 that, after aggregation, indicates that the number of machines running the process in the department has dropped below 25%, system 220 may instruct the machines to undo the corrective action. In this manner, corrective actions may be managed without manual intervention by IT staff. Numerous variations of this one specific example are contemplated.

For example, in one embodiment, system 220 may detect problems with a remediation in response to detecting that resource consumption for one or more processes executing on systems 230 has changed by a particular amount following remediation. Accordingly, system 220 may conclude problems exist if important process (e.g., on at 25% of machines within an entity) experience more-than-average resource consumption change (e.g., at least a +/−30% change). For example, system 230 may conclude a problem exists if a process begins consuming 30% more memory. In one embodiment, system 220 may detect problems with a remediation in response to detecting that a number of trouble reports (e.g., to an entity's computer help desk) has increased by a particular amount following remediation. Accordingly, system 220 may conclude problems exist if the number of trouble reports after remediation increased by more than two standard deviations from the average for a particular period (e.g., over the last hour).

System 220 may also determine to stop propagating a remediation in response to a variety of network problems. In one embodiment, system 220 may detect problems with a remediation in response to detecting that one or more client systems 230 fail to contact system 220 after a remediation. For example, in one embodiment, system 220 may repeatedly send echo requests (e.g., using Internet Control Message Protocol (ICMP)) to sacrificial-lamb systems (e.g., every 5 minutes). If the number of client systems 230 responding to the echo requests (e.g., within a 15-minute window) after a remediation is less than a particular threshold (e.g., the minimum number of client systems 230 contacting system 220 within any 15-minute block over the last two hours), system 220 may conclude that problems exist. In some embodiments, system 220 may detect problems with a remediation in response to detecting that one or more client systems 230 are in communication with system 220 (e.g., acknowledge the echo request) but fail to acknowledge a subsequent remediation request 1932. Accordingly, system 220 may detect problems if a particular number of client systems 230 (e.g., more than 0.1%) can communicate with system 220 but fail to acknowledge any subsequent request for a remediation. In some embodiments, system 220 may detect problems with a remediation in response to detecting that one or more client systems 230 contact system 220, acknowledge a remediation request, but still report problems. Accordingly, system 220 may conclude problems exist if a particular number of client systems 230 (e.g., more than 0.2%) providing an acknowledgment show problems in a remediation report (such as problems with particular hardware devices as indicated by an operating system device manager, which allows a user to manage hardware settings).

In some embodiments, system 220 may generate a report of performed self-healings for an administrator. In one embodiment, this report may show numbers of clients that locally self-healed, and list the particular machines and remediations affected. This report may also show what system initiated the undoing of a remediation (e.g., server system 220 or a client system 230) and what decision rule triggered the undoing (e.g., a client system 230 lost network connectivity).

Figure 20:
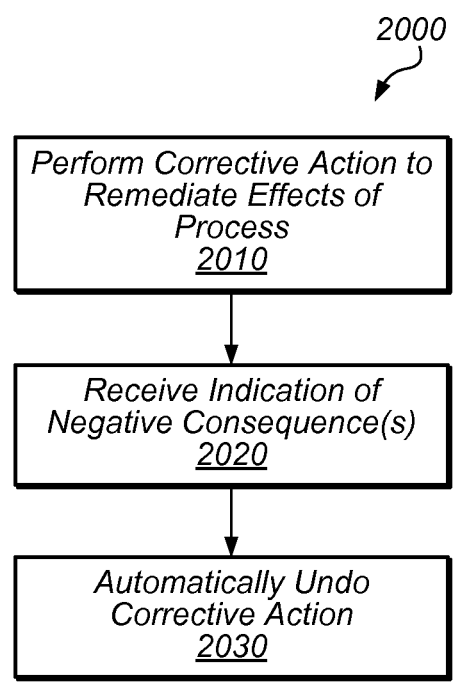
FIG. 20 is a flow chart of a method for undoing a corrective action according to one embodiment of the present disclosure.

Turning now to FIG. 20, a flow chart of a method 2000 for undoing a corrective action is depicted. Method 2000 is one embodiment of a method that may be performed using a computer program executing on a computer system such as client 250 executing on computer system 230. (A similar method is also contemplated, which includes portions of method 2000 being performed by a server system such as server system 220.) In various embodiments, performance of method 2000 may permit rollback of corrective actions that produce unwanted consequences.

In step 2010, client system 230 performs a corrective action to remediate effects of a process executing on the computer system. The corrective action may include any of the corrective actions described above. In some instance, client system 230 may perform the corrective action in response to detecting an extraneous or underperforming process. In other instances, client system 230 may perform the corrective action in response to a request from server 220.

In step 2020, client system 230 receives an indication of one or more negative consequences associated with the corrective action. As discussed above, this indication may include a variety of information. Accordingly, the indication may include information about a user's input such as a rate of mouse clicks or movements, keyboard presses, etc. This indication may include information collected from a system analysis such as a loss of network connectivity, certain devices that have become inoperable, a hanging of certain processes, an activation of system error reporting, etc. This indication may include a request from server 220 to undo a corrective action.

In step 2030, client system 230 automatically undoes the corrective action in response to the receiving the indication. Accordingly, client system 230 may reload a process that was terminated, allocate additional resources to a process that had its resource consumption restricted, lower a process's priority to its previous priority, etc.

Various embodiments of systems and methods for undoing corrective actions are contemplated based on the preceding description, including, but not limited to, the embodiments listed below.

1. A method, comprising:
    a computer system performing a corrective action with respect to a process executing on the computer system;
    the computer system receiving an indication of one or more negative consequences associated with the corrective action; and
    in response to receiving the indication, the computer system automatically undoing the corrective action.
2. The method of embodiment 1, wherein the received indication indicates a rate of user input to the computer system, and wherein the computer system automatically undoes the corrective action in response to the rate exceeding a particular threshold.
3. The method of embodiment 2, wherein the user input is received from a pointing device of the computer system.
4. The method of embodiment 2, wherein the user input is received from a keyboard of the computer system.
5. The method of embodiment 1, wherein the received indication is an indication that processes normally present on the computer system are missing.
6. The method of embodiment 1, wherein the received indication indicates a change in resource consumption for one or more processes.
7. The method of embodiment 1, wherein the received indication indicates a problem with a network connection of the computer system.
8. A method, comprising:
    a client system performing a corrective action for one or more processes executing on the client system; and
    the client system receiving a request from a server system to back out the corrective action, wherein the request is automatically generated by the server system based on feedback from one or more other client systems.
9. A method, comprising:
    a server system instructing a plurality of client systems to perform a corrective action relative to a process executing on each of the plurality of client systems;
    the server system receiving negative feedback regarding the corrective action from one or more of the plurality of client systems; and
    the server system instructing the plurality of client systems to back out the corrective action.
10. The method of embodiment 9, wherein the negative feedback indicates that an average system stress for one or more of the plurality of client systems has increased by a particular amount following remediation.
11. The method of embodiment 9, wherein the negative feedback indicates that a number of non-extraneous processes on the plurality of client systems has fallen by a particular amount following remediation.
12. The method of embodiment 9, wherein the negative feedback indicates that an average resource consumption for one or more processes executing on the plurality of client systems has changed by a particular amount following remediation.
13. The method of embodiment 9, wherein the negative feedback includes a loss of communication between the server system and one or more of the plurality of client systems following remediation.
14. The method of embodiment 9, wherein the negative feedback indicates that one or more of the plurality of client systems are experiencing a problem with one or more hardware devices following remediation.
15. The method of embodiment 9, wherein the negative feedback indicates that a number of help desk trouble reports has increased by a particular amount following remediation.
16. The method of embodiment 15, wherein the particular amount is an increase of more the than two standard deviations from an average number of trouble reports during a corresponding time period.
17. The method of embodiment 9, further comprising:
    providing a report to an administrator, wherein the report indicates a number of times that the server system instructed the plurality of client systems to back out corrective actions.

The embodiments described above may be combined in any suitable manner including being combined with embodiments described in other sections. Furthermore, non-transitory computer readable media that include program instructions executable to implement any of the methods described in this section are also contemplated. Additionally, computer systems or computing devices that are configured to implement any of the disclosed methods are also contemplated.

Browser Session Analysis

Figure 21:
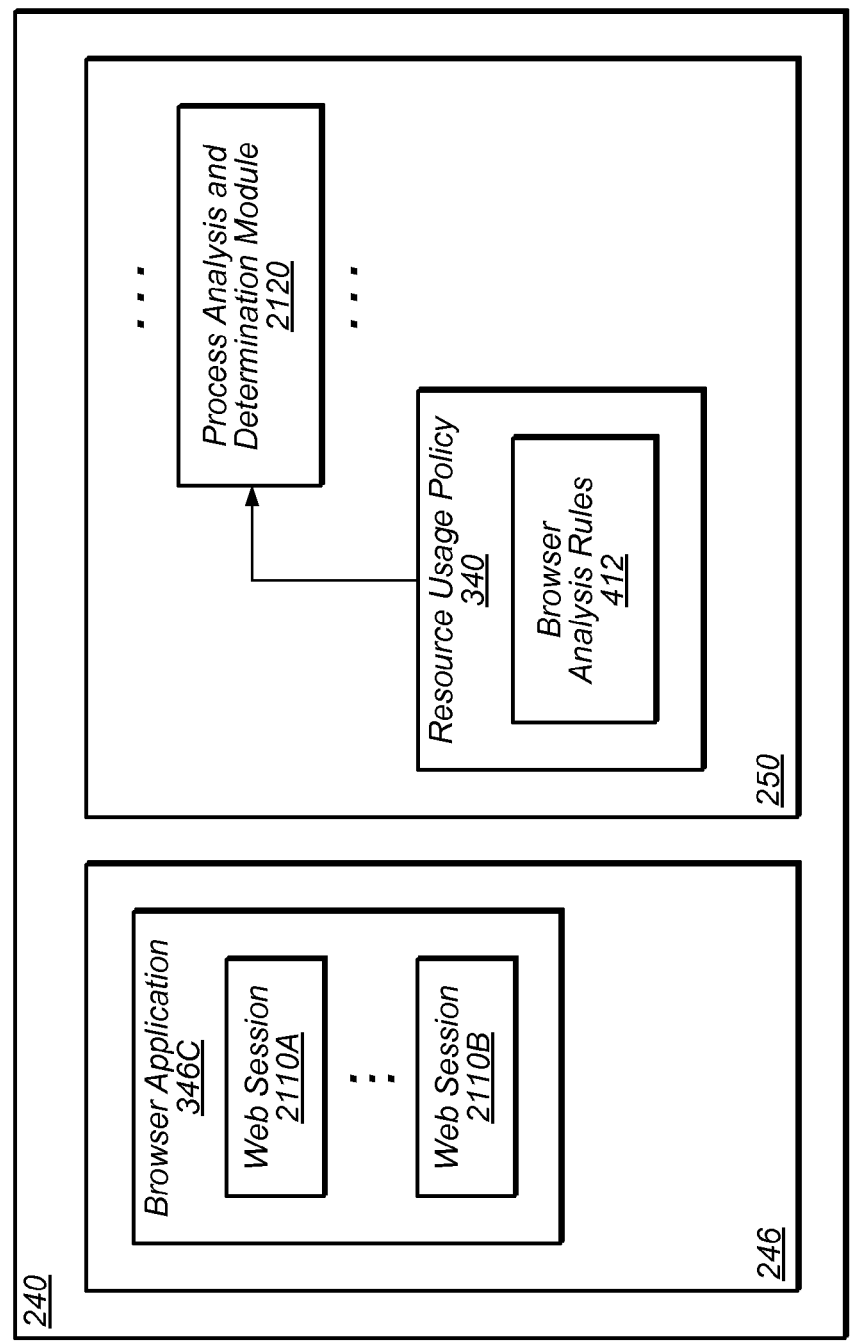
FIG. 21 is a block diagram of a resource usage analysis client that analyzes browser sessions according to one embodiment of the present disclosure.

Turning now to FIG. 21, one embodiment of a resource usage analysis client 250 that analyzes browser sessions 2110 is depicted. As discussed above, a browser application may initiate a browser session (e.g., handled by a new respective process) each time a new window or new tab is created to display a new webpage. A user may then provide input to a browser session to cause it to load new webpages—e.g., by selecting or typing in a URL. Each web page may also include multiple forms of content/elements (e.g., pictures, links, HTML formatting etc.), which may be provided from multiple sources (e.g., a web page from weather.com displaying not only the current forecast, but also one or more advertisements provided from an add-services domain). In various embodiments, a usage policy 340 may include browser analysis rules 412 for analyzing browser activity beyond merely classifying a process as being associated with a browser application. In the illustrated embodiment, client 250 uses rules 412 and a process analysis and determination module 2120 (which may be implemented using module 320, in some embodiments) to analyze browser sessions 2110A-B of browser application 346C. In some embodiments, client 250 may use other existing modules (e.g., modules 310-348) to analyze browser sessions 2110; in other embodiments, client 250 may include additional modules for analyzing browser sessions.

Process analysis and determination module 2120, in various embodiments, is executable to analyze information about sessions 2110 by using a multi-level approach of analysis. In some embodiments, this approach focuses on analyzing sessions 2110 at a session level, a page level, and an element level. In one embodiment, the session-level analysis focuses on information that enables it determine whether particular sessions 2110 should be allocated additional resources or fewer resources (e.g., in one embodiment, module 2120 may use this information to rank sessions and allocate resources based on rank). In various embodiments, this session information includes the resource consumption of a session 2110 (e.g., processor usage, memory usage, etc.), the activity being performed by a session 2110 (e.g., displaying a web page, running a web application, executing instructions from a scripting language, etc.), an indication of whether a particular session is in focus (e.g., the currently selected tab or displayed window), an indication of whether a user is providing input to a session, etc.

In one embodiment, browser activity can be prioritized/managed at a page-level. Thus, within a given session, activity can be prioritized according to information about a particular page being visited. Thus, even if a particular browser session is being given priority generally, a request for a particular page by an entity's client system (e.g., for a social media website) may be deprioritized if it is not in line with the entity's resource usage policy. This page-level analysis includes analyzing metadata about a page such as source link domain classification (indication of the source domain, which hosts the link being followed), target domain classification (indication of the target domain, which hosts the page the source link points to), target domain browse history (indication of whether a page has been visited before, how often, how recently, etc.), target page retrieval effort (indication of how much content requires transfer for a given page, which influences how much time is required to render the page, how much network bandwidth, etc.) target page content classification (e.g., information categorizing content in a web page into one of a number of predefined categories), target page rendering effort (e.g., indication of how much local system resource (central processor, graphics processor, video memory, main memory, storage bandwidth, etc.) is needed to render the page), target page maintenance effort (indication of how much effort is needed to maintain, once a page is rendered, for pages that have auto-updating content, like a stock ticker, scoreboard, traffic updates, Doppler weather radar, etc.), target page content/ad ratio (value indicative of amount of desired content to ad content on a page), browser tab focus intensity (indication of amount (e.g., percentage) of recent time that a given browser tab or window has been the in-focus user activity), browser tab real estate (indication of amount of screen that is occupied by the browser tab), browser hygiene (information indicating whether the browser version is up to date), system resource pressure (information indicating how hard a computer system is working to display a particular page as measured by processor, memory, and I—O utilizations; queue depths; etc.), etc.

In one embodiment, the element-level analysis focuses on session information at the various components of a particular page. It is typical for a web page to have a number of different components that are retrieved from different sources (e.g., various ad servers). Accordingly, even a web page that has content in keeping with an entity's resource usage policy may have page elements that are extraneous (ad content, ecommerce analytics, site tracking telemetry). Accordingly, the element-level analysis may analyze content within a page, including but not limited to, such attributes as element server domain classification (similar to the target domain attribute described above, but for page elements, which can be hosted by third parties), element page placement (e.g., is a page element in the middle of the page, where primary content is likely to appear, or is it in a top/bottom banner or left/right sidebar, where auxiliary or ad content is likely to appear), element relative page area (indication of amount of browser tab screen area occupied by an element), element page neighbor scores (because similar types of page content is likely to be located together, page element "neighbors" can influence each other's scores), element content type (e.g., is element an image, link, text, ad, etc.), parent page value (score for containing page—primary content thus influences page score, which in turn affects the score for auxiliary content), browser resource consumption pressure (indication of system resources used by the browser; may be more liberal in rendering content if system is idle), browser tab focus intensity (see above), page rendering performance (likely time to render a page; if a page takes a while to render, may cause a more conservative decision with regard to whether to render auxiliary elements), etc. The page-element analysis may block unneeded elements, saving both local resources and WAN bandwidth. Such blocking may be performed using a variety of techniques, including using importance/extraneous scoring as described above (as opposed to traditional ad blocking techniques).

In one embodiment, process analysis and determination module 2120 is further executable to determine one or more corresponding corrective actions. In various embodiments, this determination may include using rules 412 to determine whether sessions 2110 are extraneous. For example, in one embodiment, client 250 may identify sessions 2110 as extraneous if they access particular websites (e.g., ESPN.com, FACEBOOK, TWITTER) include certain content (e.g. video content, audio content, etc.). In one embodiment, module 2120 may determine to terminate or restrict sessions 2110 identified as extraneous. Module 2120 may also prevent browser application 346E from creating subsequent similar sessions. In various embodiments, this determination may include using rules 412 to determine whether sessions 2110 are underperforming based on the resource consumption and importance of those sessions 2110. Accordingly, in one embodiment, module 2120 may determine to restrict the performance of sessions 2110 if they have high resource consumption and/or low importance. In one embodiment, module 2120 may also improve the performance of sessions 2110 if they have a high importance and need additional resources. In some embodiments, module 2120 may generate scores for browser sessions similar to those described above—e.g., scores indicative of extraneousness, importance, and resource consumption.

In one embodiment, client 250 (e.g., using module 330) is further executable to take one or more corrective actions for sessions 2210 that deviate from usage policy 340. In various embodiments, client 250 implements corrective actions (such as terminating or restricting particular sessions 2110) by making calls to an API for browser application 346C. Client 250 may also implement various corrective actions by making calls to an operating system API (e.g., to improve the performance of particular sessions 2110 by allocating additional resources to those sessions.

Figure 22:
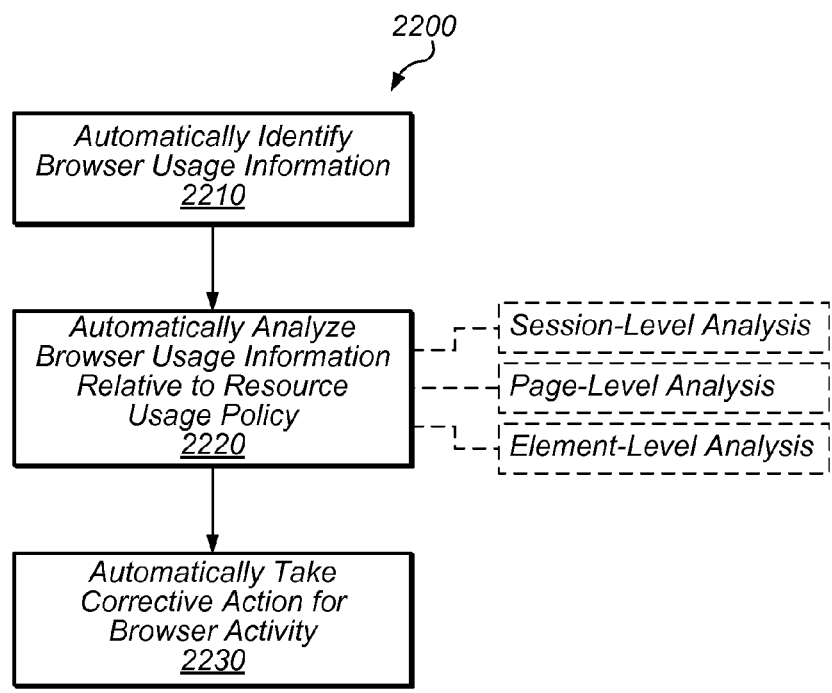
FIG. 22 is a flow chart of a method for analyzing browser sessions according to one embodiment of the present disclosure.

Turning now to FIG. 22, one embodiment of a method 2200 for identifying, classifying, and remediating browser usage is shown. Method 2200 is one embodiment of a method that may be performed by a computer program executing on a computer system such as client 250 executing on computer system 230. In various embodiments, method 2200 may be performed for each session of a browser application. In some instances, performance of method 2200 may improve the execution of browser sessions on a computer system. In step 2210, client system 230 automatically identifies browser usage information related to one or more browser sessions 2110. In various embodiments, step 2210 includes various forms of information such as described above. In step 2220, client system 230 automatically analyzes browser usage information relative to a resource usage policy. As discussed above, in one embodiment, client 230 may perform session-level analysis, page-level analysis, and page element-level analysis. In step 2230, client system 230 automatically takes a corrective action for the browser activity. This action may include any of the actions described above.

Various embodiments of systems and methods for analyzing browser sessions are contemplated based on the preceding description, including, but not limited to, the embodiments listed below.

1. A method, comprising:
    a resource usage analysis program automatically identifying a plurality of browser sessions running on a computer system;

the resource usage analysis program automatically analyzing at least two of the identified browser sessions using a set of information defining a resource usage policy;

the resource usage analysis program automatically determining that at least one of the analyzed browser sessions includes the use of content that deviates from the resource usage policy; and the resource usage analysis program automatically taking a corrective action with respect to at least one of the browser sessions determined to be deviating from the resource usage policy.

2. The method of embodiment 1, wherein the computer system is a computer system of an entity, and wherein the determining includes determining an importance of the at least one browser session to the entity.

3. A method, comprising:

receiving, at a computer system executing a resource usage analysis control program, browser activity information from a plurality of browser sessions executing on ones of a plurality of client computer systems within a domain, wherein the received browser activity information includes information classifying browser activity on ones of the client computer system based on a set of information defining a resource usage policy;

aggregating, on the computer system, the received browser activity information; and taking a corrective action based on the aggregated information.

4. A method, comprising:

a resource usage analysis program automatically identifying a browser session running on a computer system, including identifying one or more page-level visits within the browser session;

the resource usage analysis program automatically analyzing at least one of the one or more page-level visits using a set of information defining a resource usage policy;

the resource usage analysis program automatically determining that at least one page-level visit made within the browser session includes the use of content that deviates from the resource usage policy; and the resource usage analysis program automatically taking a corrective action with respect to the page-level visit determined to be deviating from the resource usage policy.

5. The method of embodiment 3, wherein the analyzing includes analyzing a page element within one of the analyzed page-level visits.

6. A method, comprising:

a resource usage analysis program automatically identifying a plurality of page elements within a page being accessed within a browser session;

the resource usage analysis program automatically analyzing the plurality of page elements using a set of information defining a resource usage policy;

the resource usage analysis program automatically determining that at least one of the plurality of analyzed page elements includes the use of content that deviates from the resource usage policy; and the resource usage analysis program automatically taking a corrective action with respect to at least one page that includes the page element determined to be deviating from the resource usage policy.

The embodiments described above may be combined in any suitable manner including being combined with embodiments described in other sections. Furthermore, non-transitory computer readable media that include program instructions executable to implement any of the methods described in this section are also contemplated. Additionally, computer systems or computing devices that are configured to implement any of the disclosed methods are also contemplated.

Network Session Analysis

Figure 23:
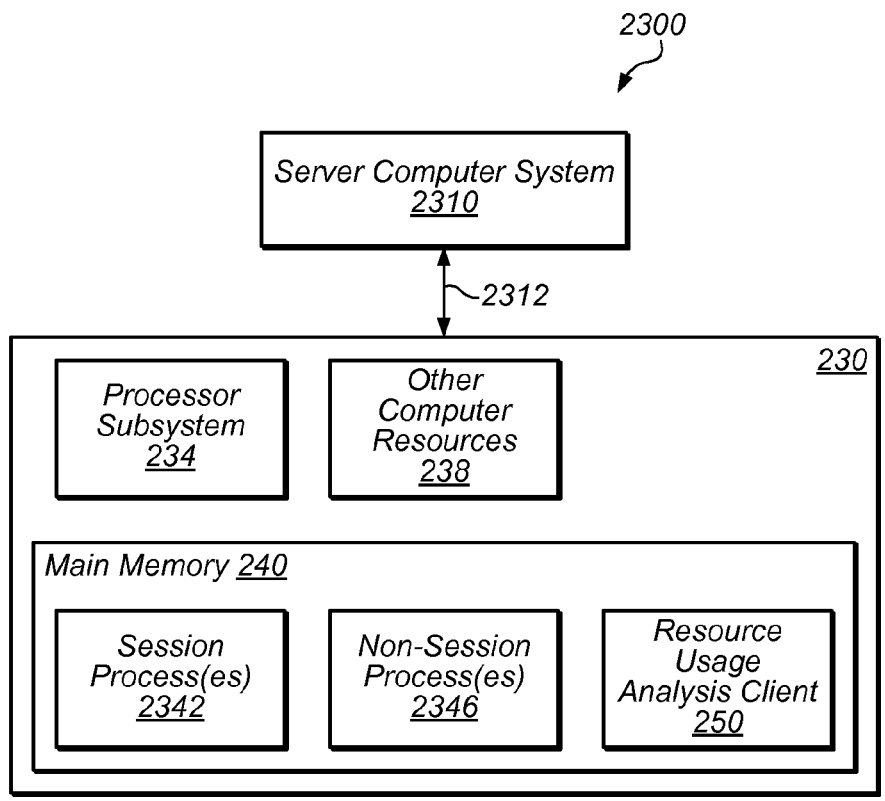
FIG. 23 is a block diagram of two computers communicating via a network session according to one embodiment of the present disclosure.

Turning now to FIG. 23, one embodiment of a network session 2312 in a computing environment 2300 is depicted. In the illustrated embodiment, a client system 230 initiates a network session 2312 with another computer system 2310 (e.g., a server computer system, which may implement features of system 220 described above) to facilitate an exchange of information. When client system 230 connects to system 2310, system 230 may be executing several processes. Some of these processes are relevant to/associated with the session while others are not. In some instances, non-relevant processes may reduce the performance of system 230 and impede communication with system 2310. Still further, certain non-relevant processes may be malicious and might comprise the integrity of system 2310. As will be described below, in one embodiment, client 250 classifies processes as session processes 2342 or non-session processes 2346 and enforces a usage policy 340 accordingly.

Network session 2312 may be associated with any of a variety of network traffic including secure-socket-layer (SSL) or thick-client virtual private networks (VPNs), web applications (proprietary or 3rd party), cloud-based applications, Software-as-a-Service (SaaS) applications, CITRIX or remote hosting, remote desktop applications, online media streaming (training, GOTOMEETING, webcasts, etc.), business-to-business (B2B) e-commerce portals, online web conferencing, etc.

Session processes 2342, in one embodiment, are processes relevant to network session 2312. Processes 2342 may include processes responsible for establishing or maintaining the session 2312 such as network drivers and the operating system network stack, VPN clients, etc. Processes 2342 may also include processes creating data for transmission during the session 2312 such as those associated with web browsers (e.g., browser helper objects (BHOs)), media-streaming applications, file-sharing applications, office suites, web conferencing agents, virtual network computing (VNC) applications, and other applications such as those noted above.

Non-session processes 2346, in one embodiment, are processes unrelated to the session 2312. Non-session processes 2346 may include various non-malicious processes that provide no value to the session 2312 such as games, update programs, background process, and others described above. Non-session processes 2346 can also include processes such as applications running locally (e.g., a word processor) that are not related to session 2312. Processes 2346 may also include malicious software such as viruses, worms, adware, keyloggers and screen scrapers, etc.

Client 250 may use a variety of techniques to classify processes as session processes 2342 or non-session processes 2346. In various embodiments, client 250 classifies a process based on its file size, its network traffic (e.g., particular TCP or UDP ports used by the process), whether it has (or is associated with) a digital signature, whether it is associated with an open window, etc. Client 250 may also use techniques such as those described above in other sections.

In some embodiments, client 250 classifies a process as a non-session process 2346 if it is unable to determine that a process is a session process 2342. In such a paradigm, a process is assumed to be not relevant to the session 2312 unless relevancy can be established by client 250. As will be described below, in one embodiment, if client 250 cannot establish relevancy for a process, then it is terminated, suspended, or restricted in one embodiment. In certain embodiments, a non-validated process may be suspended only while the session is still ongoing. The present paradigm thus allows an entity to apply some set of criteria to a process; if that set of criteria does not establish that the process is relevant to the session, a corrective action is taken (e.g., suspending the process until the session is over).

This paradigm is different from approaches taken in security software, which assume all processes to be legitimate until the software can determine that a process is malicious. Positive identification of all forms of malware is time-consuming and expensive. The present approach is significant in that it, in effect, shifts the "burden of proof" for processes. As opposed to an approach in which processes are deemed legitimate until proven non-legitimate, the present approach takes the approach of just not allowing certain processes to execute temporarily unless they can be identified as relevant to the current network session. This approach allows a much more lightweight set of criteria to be applied to effectuate session enforcement.

The paradigm assumes that some legitimate processes may be sidelined temporarily as a result of this process. Of course, the criteria for session enforcement can be modified over time dynamically or manually (e.g., to permit validation of additional processes).

In various embodiments, client 250 enforces a usage policy 340 for processes based on their classifications as session processes 2342 or non-session processes 2346. In one embodiment, this enforcement includes client 250 taking corrective actions to improve the performance of session processes 2342. These actions may include allocating additional processor usage, memory space, network bandwidth, or other action such as described above. In some embodiments, this enforcement further includes client 250 terminating non-session processes 2346. In other embodiments, client 250 may alternatively suspend such processes, reduce their performances (e.g., processes' processor usage, memory space, network bandwidth, etc.), or take other actions such as those described above.

By classifying processes and enforcing a usage policy in this manner, client 250 can improve the performance of a network session 2312. Still further, such techniques can protect the security of system 2310. For example, while client 250 may not attempt to classify a process as malicious, client 250, in one embodiment, may still terminate such a process when it is unable to determine that the process is relevant to a network session.

Figure 24:
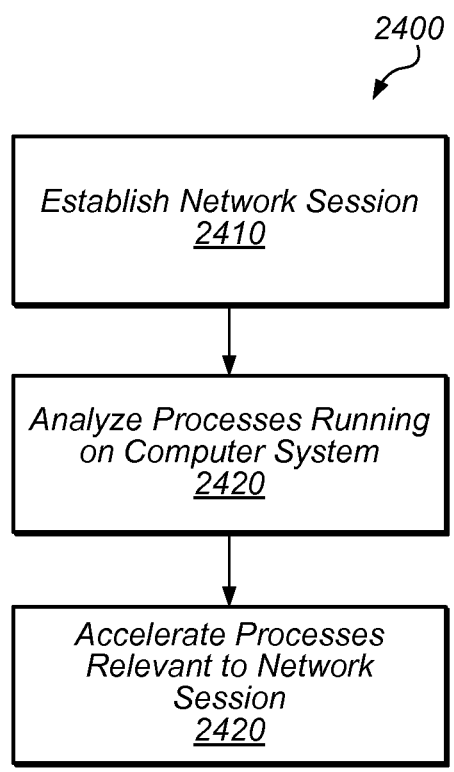
FIG. 24 is a flow chart of a method for analyzing processes during a network session according to one embodiment of the present disclosure.

Turning now to FIG. 24 a flow chart of a method 2400 for analyzing processes during a network session is depicted. Method 2400 is one embodiment of a method that may be performed using one or more computer programs executing on a computer system such as client 250 executing on computer system 230. In some embodiments, various ones of steps 2410-2430 may be performed in parallel or in a different order than shown.

In step 2410, client system 230 establishes a network session with another computer system (e.g., system 2310). This network session may include any of the types of sessions described above. In some embodiments, client 250 is executable to establish the session; in other embodiments, another program independent of client 250 handles session establishment.

In step 2420, client system 230 analyzes processes running on the computer system during the network session. As discussed above, client system 230 may analyze a variety of information and use a variety of techniques to classify a process as a session process or a non-session process. In various embodiments, client system 230 attempts to initially classify a process as a session process. If it cannot determine that a process is a session process, client system 230 classifies the process a non-session process.

In step 2430, client system 230 accelerates processes that are determined to be relevant to the network session (i.e., are session processes). In various embodiments, client system 230 may accelerate a process by assigning a higher priority to the process, allocating additional processor usage, memory space, or network bandwidth to process, or other actions such as those described previously.

Figure 25:
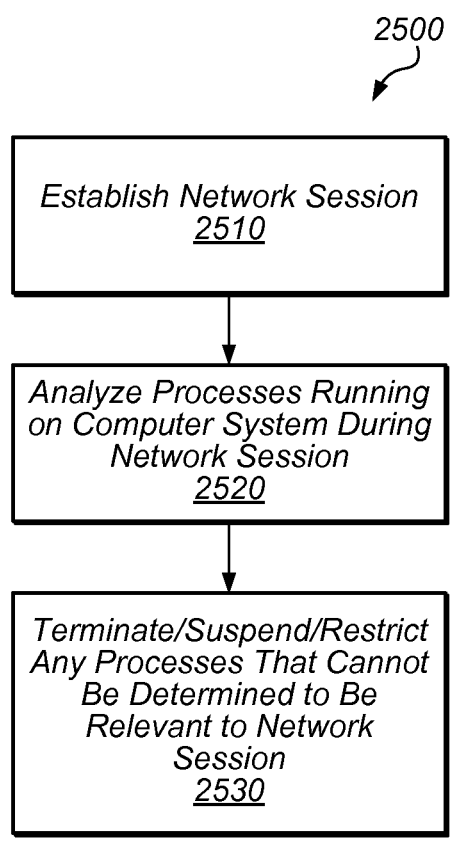
FIG. 25 is a flow chart of another method for analyzing processes during a network session according to one embodiment of the present disclosure.

Turning now to FIG. 25, a flow chart of another method 2500 for analyzing processes during a network session is depicted. Method 2500 is one embodiment of a method that may be performed using one or more computer programs executing on a computer system such as client 250 executing on computer system 230. In some embodiments, various ones of steps 2410-2430 may be performed in parallel or in a different order than shown.

In step 2510, client system 230 establishes a network session with another computer system. In various embodiments, step 2510 may be performed in a similar manner as step 2410 described above.

In step 2520, client system 230 analyzes processes running on the computer system during the network session. In various embodiments, step 2520 may be performed in a similar manner as step 2420 described above. As discussed above, client system 230 may classify a process as a non-session process if it is unable to determine that the process is relevant to the network session.

In step 2530, client system 230 terminates, suspends, or restricts any processes that cannot be determined to be relevant to the network session (i.e., non-session processes). This termination may include various processes such as those described above. In some embodiments, client system 230 may take other corrective actions such as actions to remove load points.

The techniques described above relating to session enforcement and acceleration can be generalized to apply to any "in focus" user activity. As described above, in one embodiment, the existence of a network session is assumed to be an important activity—one that is aligned with the goals or productivity of an entity associated with the session. The techniques described above are usable to allocate computing resources of the entity to enhance this activity. In the session enforcement embodiment, processes that are not able to be validated as relevant are terminated, suspended, etc. In the session acceleration embodiment, processes that are deemed as relevant to the network session are prioritized relative to other, non-session, processes. More generally, these techniques can be applied to any activity the user is currently focused on. For example, consider a situation in which a user is working with a finance application. (This determination may be made with various API calls in one embodiment.) In this situation, processes that are not relevant to the finance application may be terminated, suspended, or deprioritized as appropriate. In this manner, whatever activity the user is currently engaged in (which may change over time) may be accelerated, with other activities being de-accelerated or terminated completely. Of course, it is recognized that a user may be currently focused on more than one activity at a time; more than one in-focus activity may be prioritized at a time in various embodiments.

Various embodiments of systems and methods for analyzing session processes (or other in-focus user activities) are contemplated based on the preceding description, including, but not limited to, the embodiments listed below.

1. A method, comprising:
    a computer system establishing a network session with another computer system;
        the computer system analyzing processes running on the computer system during the network session; and
        the computer system accelerating processes that are determined to be relevant to the network session.
2. A method, comprising:
    a first computer system identifying processes executing on the first computer system that correspond to a network session established with a second computer system; and
    the first computer system allocating additional computing resources to the identified processes.
3. The method of embodiment 2, wherein the first computer system identifies a process as corresponding to the network session based on whether the process is associated with a digital signature.
4. The method of embodiment 2, wherein the first computer system identifies a process as corresponding to the network session based on the process's network traffic.
5. The method of embodiment 2, wherein the first computer system identifies a process as corresponding to the network session in response to determining that the process is associated with an open window.
6. The method of embodiment 2, wherein the first computer system identifies a process as corresponding to the network session in response to determining that the process was used to establish the network session.
7. The method of embodiment 2, wherein the first computer system identifies a process as corresponding to the network session in response to determining the process is a process of a web browser application.
8. The method of embodiment 2, wherein the network session is a secure-socket-layer (SSL) or thick-client virtual private network (VPN) session, web application session, cloud-based application session, Software-as-a-Service (SaaS) application session, Citrix or remote hosting session, remote desktop application session, online media streaming session, web conferencing session, or business-to-business (B2B) e-commerce portal session.
9. A method, comprising:
    a computer system establishing a network session with another computer system;
    the computer system analyzing processes running on the computer system during the network session; and
    the computer system terminating any processes that cannot be determined to be relevant to the network session.
10. A method, comprising:
    a first computer system establishing a network session with a second computer system, wherein the network session is associated with a resource usage policy;
    the first computer system determining whether processes executing on the first computers system deviate from the resource usage policy of the network session; and
    the computer system enforcing the resource usage policy for the duration of the network session including performing one or more corrective action for processes determined to deviate from the resource usage policy.
11. A method, comprising:
    applying a set of criteria to processes executing on a first computer system to determine which ones of the processes are relevant to a network session between the first computer system and a second computer system;
    the first computer system reducing resource consumption of processes determined to not be relevant for at least the duration of the network session.
12. A method, comprising:
    a first computer system identifying processes executing on the first computer system that correspond to a current user activity; and
    the first computer system allocating additional computing resources to the identified processes.
13. A method, comprising:
    a computer system identifying a current user activity on the computer system; and
    the computer system taking a corrective action with respect to any processes executing on the computer system that cannot be determined to be relevant to the current user activity.

The embodiments described above may be combined in any suitable manner including being combined with embodiments described in other sections. Furthermore, non-transitory computer readable media that include program instructions executable to implement any of the methods described in this section are also contemplated. Additionally, computer systems or computing devices that are configured to implement any of the disclosed methods are also contemplated.

Exemplary Computer System

Figure 26:
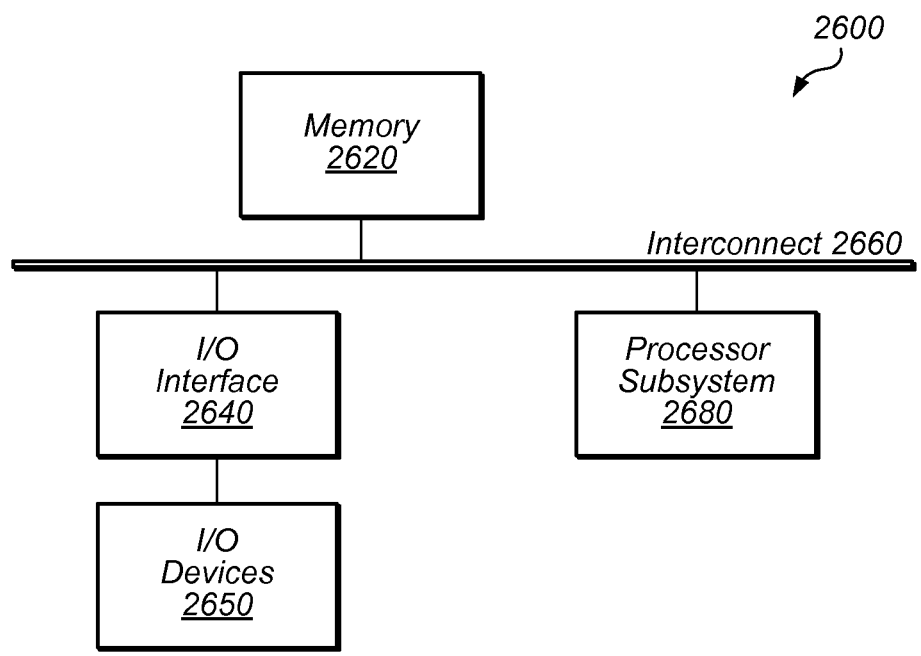
FIG. 26 is a block diagram of one embodiment of an exemplary computer system.

Turning now to FIG. 26, one embodiment of an exemplary computer system 2600, which may implement, for example, computer systems 120 and/or 130, is depicted. Computer system 2600 includes a processor subsystem 2680 that is coupled to a system memory 2620 and I/O interfaces(s) 2640 via an interconnect 2660 (e.g., a system bus). I/O interface(s) 2640 is coupled to one or more I/O devices 2650. Computer system 2600 may be any of various types of devices, including, but not limited to, a server system, personal computer system, desktop computer, laptop or notebook computer, mainframe computer system, tablet computer, handheld computer, workstation, network computer, a consumer device such as a mobile phone, pager, or personal data assistant (PDA). Computer system 2600 may also be any type of networked peripheral device such as storage devices, switches, modems, routers, etc. Although a single computer system 2600 is shown in FIG. 26 for convenience, system 2600 may also be implemented as two or more computer systems operating together.

Processor subsystem 2680 may include one or more processors or processing units. For example, processor subsystem 2680 may include one or more processing elements 2610 that are coupled to one or more resource control processing elements 2620. In various embodiments of computer system 2600, multiple instances of processor subsystem 2680 may be coupled to interconnect 2660. In various embodiments, processor subsystem 2680 (or each processor unit within 2680) may contain a cache or other form of on-board memory. In one embodiment, processor subsystem 2680 may include processor subsystem 130 described above.

System memory 2620 is usable by processor subsystem 2680, and may include main memory 140. System memory 2620 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 2600 is not limited to primary storage such as memory 2620. Rather, computer system 2600 may also include other forms of storage such as cache memory in processor subsystem 2680 and secondary storage on I/O Devices 2650 (e.g., a hard drive, storage array, etc.). In some embodiments, these other forms of storage may also store program instructions executable by processor subsystem 2680. In some embodiments, memory 140 described above may include (or be included within) system memory 2620.

I/O interfaces 2640 may be any of various types of interfaces configured to couple to and communicate with other devices, according to various embodiments. In one embodiment, I/O interface 2640 is a bridge chip (e.g., Southbridge) from a front-side to one or more back-side buses. I/O interfaces 2640 may be coupled to one or more I/O devices 2650 via one or more corresponding buses or other interfaces. Examples of I/O devices include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 2600 is coupled to a network via a network interface device.

Exemplary Computer Readable Media

Various non-transitory computer readable media are also contemplated. In one embodiment, the computer readable media may store instructions that are executable to perform the functions of clients 150 or server program 116. Computer readable media can be any of a variety of tangible (i.e., non-transitory) media that store program instructions and/or data used during execution. In one embodiment, computer-storage readable media may be implemented in various portions of a memory subsystem of a computer (e.g., memory 140 or 2620). In other embodiments, computer readable media may include storage media or memory media of a peripheral storage device 2620 such as magnetic (e.g., disk) or optical media (e.g., CD, DVD, and related technologies, etc.). Computer readable media may be either volatile or nonvolatile memory. For example, computer readable media may be (without limitation) FB-DIMM, DDR/DDR2/DDR3/DDR4 SDRAM, RDRAM®, flash memory, and of various types of ROM, etc. Note: as used herein, a computer readable medium refers to a non-transitory medium such as those enumerated above, and is not used to refer solely to an intangible medium such as a carrier wave.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer-readable medium having program instructions stored thereon, wherein the program instructions are executable to cause a computer system of an entity to perform:

accessing a process usage policy of the entity, wherein the process usage policy includes a set of information for determining an importance of a process to the entity, wherein the set of information includes a rule that indicates an importance of a process based on whether a process is associated with a digital signature;

identifying a plurality of processes running on the computer system;

determining an importance value and a resource consumption value for a particular one of the plurality of processes, wherein the importance value is indicative of an importance of the particular process and is determined using the process usage policy, wherein the resource consumption value is indicative of a resource consumption of the particular process, and wherein the importance value is determined without taking into account the resource consumption of the particular process;

evaluating the particular process using the importance value and the resource consumption value of the particular process; and taking a corrective action with respect to the particular process after the evaluating.

2. The non-transitory computer-readable medium of claim 1, wherein the evaluating includes generating information regarding the particular process, and wherein the taking the correction action includes generating a report that includes the generated information regarding the particular process.

3. The non-transitory computer-readable medium of claim 2, wherein the program instructions are further executable to cause the computer system to perform:

determining an importance value for a different one of the plurality of processes, and wherein the evaluating includes determining that the process usage policy indicates that the different process is extraneous to the entity regardless of its resource consumption.

4. The non-transitory computer-readable medium of claim 1, wherein determining the importance value includes:

classifying a user associated with the computer system into one of a plurality of user types according to a user's role within the entity;

wherein the importance value is based on the user type into which the user is classified.

5. The non-transitory computer-readable medium of claim 1, wherein determining the importance value includes:

obtaining provenance information relating to installation of the particular process;

wherein the importance value is determined based on the obtained provenance information.

6. The non-transitory computer-readable medium of claim 1, wherein the corrective action includes temporarily suspending execution of the particular process, reducing resource consumption of the particular process, or allocating additional resources to the particular process.

7. The non-transitory computer-readable medium of claim 1, wherein the program instructions are further executable to cause the computer system to perform:

analyzing processes running on the computer system during a network session with another computer system; and terminating, suspending, or restricting any processes that cannot be determined to be relevant to the network session.

8. A method, comprising:

a computer system of an entity identifying a plurality of processes running on the computer system;

the computer system determining an importance of a particular one of the plurality of processes to the entity and further determining a resource consumption of the particular process, wherein the importance is determined using a usage policy for processes executing on computer systems of the entity, wherein the usage policy includes a rule that indicates the importance of the particular process based on whether the particular process is associated with a foreground window, and wherein the importance of the particular process is determined without considering its resource consumption;

the computer system calculating a process score for the particular process based on the determined importance and the determined resource consumption; and the computer system taking a corrective action with respect to the particular process, wherein the corrective action includes use of the calculated process score.

9. The method of claim 8, wherein determining the importance of the particular process is based on whether the computer system loads the identified process during a startup sequence of the computer system.

10. The method of claim 8, wherein determining the resource consumption of the particular process is based on a potential future resource consumption of the particular process.

11. The method of claim 8, wherein determining the importance of the particular process is based on classifying the particular process into one of a plurality of application genres.

12. The method of claim 8, wherein the particular process is associated with one of a plurality of browser sessions of a web browser application, and wherein the importance of the particular process is determined based on the importance to the entity of the associated browser session.

13. The method of claim 8, further comprising:
the computer system establishing a network session with another computer system;
the computer system analyzing processes running on the computer system during the network session; and
the computer system accelerating processes that are determined to be relevant to the network session.

14. The method of claim 8, wherein determining the importance of the particular process includes determining whether the particular process is relevant to a current activity of a user of the computer system.

15. The method of claim 8, wherein taking the corrective action includes generating a report that includes information regarding the particular process, including the process score for the particular process.

16. A non-transitory computer-readable medium having program instructions stored thereon, wherein the program instructions are executable to cause a server computer system to perform:
receiving process information from a plurality of client computer systems of an entity, wherein the process information identifies a plurality of processes executing on ones of the plurality of client computer systems, wherein the received process information includes one or more scores for various ones of the plurality of processes, wherein at least one of the one or more scores for a particular process is based on an importance value and a resource consumption value determined by an agent program running on one of the plurality of client computer systems of the entity, wherein the importance value of a process is calculated by the agent program based on a usage policy and without regard to the resource consumption of that process, wherein the usage policy includes a rule that identifies an importance of a process based on whether the process has one or more files protected by an operating system; and taking a corrective action that uses received process information for various ones of the plurality of client computer systems, including scores for various ones of the plurality of processes.

17. The non-transitory computer-readable medium of claim 16, wherein the corrective action includes instructing two or more of the plurality of client computer systems to take the same action with respect to corresponding processes operating on those client computer systems.

18. The non-transitory computer-readable medium of claim 16, wherein the program instructions are further executable to cause the server computer system to perform:
providing an updated usage policy of the entity to ones of the plurality of client computer systems, wherein the updated usage policy is usable by the agent programs on ones of the plurality of client computer systems to evaluate processes running on those systems.

19. The non-transitory computer-readable medium of claim 18, wherein the updated usage policy is provided to successively larger portions of the plurality of client computer systems, wherein the program instructions are executable by the server system to perform:
monitoring effects of providing the updated usage policy to successively larger portions of the plurality of client computer systems; and
stopping the providing of the updated usage policy to successively larger portions of the plurality of client computer systems based on detected negative consequences associated with updates that have already been provided.

20. The non-transitory computer-readable medium of claim 16, wherein the taking the corrective action includes generating a report from the received process information, wherein the report includes information based on process scores for various ones of the plurality of processes.

* * * * *